United States Patent
Bian

(10) Patent No.: US 12,468,437 B2
(45) Date of Patent: Nov. 11, 2025

(54) GRAPHICAL INTERFACE DISPLAY METHOD, ELECTRONIC DEVICE, MEDIUM, AND PROGRAM PRODUCT

(71) Applicant: Huawei Technologies Co., Ltd., Shenzhen (CN)

(72) Inventor: Chao Bian, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 178 days.

(21) Appl. No.: 18/556,272

(22) PCT Filed: Apr. 13, 2022

(86) PCT No.: PCT/CN2022/086716
§ 371 (c)(1),
(2) Date: Oct. 19, 2023

(87) PCT Pub. No.: WO2022/222831
PCT Pub. Date: Oct. 27, 2022

(65) Prior Publication Data
US 2024/0231586 A1    Jul. 11, 2024

(30) Foreign Application Priority Data
Apr. 20, 2021    (CN) .......... 202110426769.X

(51) Int. Cl.
G06F 3/048        (2013.01)
G06F 3/04845    (2022.01)
G06F 3/0488      (2022.01)

(52) U.S. Cl.
CPC ...... *G06F 3/04845* (2013.01); *G06F 3/0488* (2013.01); *G06F 2203/04806* (2013.01)

(58) Field of Classification Search
CPC ............... G06F 3/04845; G06F 3/0488; F06F 2203/04806
See application file for complete search history.

(56) References Cited

U.S. PATENT DOCUMENTS 9,671,951 B2 *   6/2017  Chi .................... G06F 3/04883
10,503,380 B2 * 12/2019  Woo ...................... G06F 3/0481
10,649,580 B1 *  5/2020  Smith ................ G06F 3/04815
10,754,524 B2    8/2020  Leem
11,079,995 B1 *  8/2021  Hulbert ................ G06F 3/1423
(Continued)

FOREIGN PATENT DOCUMENTS

CN        112256165 A        1/2021
WO   WO-2014030456 A1 *  2/2014  ......... G06F 3/04842

*Primary Examiner* — Linh K Pham
(74) *Attorney, Agent, or Firm* — Slater Matsil, LLP

(57) ABSTRACT

M user interface UI elements are displayed on a screen of an electronic device, where M is a positive integer greater than 1. A touch that is performed on a first UI element of the M UI elements and that is held for specific duration is detected. Each of N UI elements on the screen is zoomed in response to the touch, where N is a positive integer ranging from 1 to M−1. The zooming N UI elements includes: determining a distance between the first UI element and a second UI element of the N UI elements; determining, based on the distance, a range by which the second UI element is to be zoomed; and zooming the second UI element based on the range to visually indicate the touch.

19 Claims, 54 Drawing Sheets

(56) References Cited

U.S. PATENT DOCUMENTS

| | | | |
|---|---|---|---|
| 2009/0153475 A1* | 6/2009 | Kerr | H04N 21/42224 345/157 |
| 2009/0315848 A1* | 12/2009 | Ku | G06F 3/044 715/810 |
| 2010/0289825 A1* | 11/2010 | Shin | G06F 3/04883 345/173 |
| 2011/0109581 A1* | 5/2011 | Ozawa | G06F 3/0481 345/173 |
| 2012/0194559 A1* | 8/2012 | Lim | G06F 3/04883 345/660 |
| 2013/0021381 A1* | 1/2013 | Zhang | G06F 3/0481 345/661 |
| 2014/0059501 A1* | 2/2014 | Yuu | G06F 3/04883 715/863 |
| 2014/0149945 A1* | 5/2014 | Ho | G06F 3/0481 715/856 |
| 2014/0165013 A1* | 6/2014 | Chuang | G06F 3/04883 715/863 |
| 2014/0168139 A1* | 6/2014 | Ku | G06F 3/04845 345/174 |
| 2014/0184848 A1* | 7/2014 | Shimosato | H04N 23/632 348/222.1 |
| 2015/0103003 A1* | 4/2015 | Kerr | G06F 3/0488 345/158 |
| 2015/0212628 A1 | 7/2015 | Ku et al. | |
| 2015/0370447 A1 | 12/2015 | Jitkoff | |
| 2017/0220241 A1* | 8/2017 | Vangapalli | G06F 3/041 |
| 2019/0163352 A1* | 5/2019 | Leem | G06F 3/04845 |
| 2019/0163353 A1* | 5/2019 | Leem | G06F 3/0488 |
| 2022/0053140 A1* | 2/2022 | Ku | G06F 3/0488 |
| 2025/0046036 A1* | 2/2025 | Josephson | G06F 3/0304 |

\* cited by examiner

2200

Large touch force:

Small touch force:

2300

Long duration:

Short duration:

GRAPHICAL INTERFACE DISPLAY METHOD, ELECTRONIC DEVICE, MEDIUM, AND PROGRAM PRODUCT

CROSS-REFERENCE TO RELATED APPLICATIONS

This application is a National Stage of International Application No. PCT/CN2022/086716, filed on Apr. 13, 2022, which claims priority to Chinese Patent Application No. 202110426769.X, filed on Apr. 20, 2021. Both of the aforementioned applications are hereby incorporated by reference in their entireties.

TECHNICAL FIELD

This disclosure generally relates to the field of information technologies, and in particular, to a graphical interface display method, an electronic device, a computer-readable storage medium, and a computer program product.

BACKGROUND

With development of information technologies, various types of electronic devices are equipped with various types of screens. Therefore, display effect and styles of user interfaces (UI) on screens become key factors that affect user experience. Animations have become an important part of UIs. With improvement of performance of electronic devices such as smartphones, animations also develop correspondingly. There are an increasing quantity of animations with a high refresh rate, a high degree of rendering, and high complexity. Therefore, display of animations needs to be further improved to improve user experience.

SUMMARY

According to some embodiments of this disclosure, a graphical interface display method, an electronic device, a medium, and a program product are provided, to strengthen association between animation effect of different UI elements, and highlight a relationship between independent UI elements, so that animation effect of a UI better conforms to a use habit of a user, and user experience is significantly improved.

According to a first aspect of this disclosure, a graphical interface display method is provided. According to the graphical interface display method in the first aspect, M user interface UI elements are displayed on a screen of an electronic device, where M is a positive integer greater than 1. A touch that is performed on a first UI element of the M UI elements and that is held for specific duration is detected. Each of N UI elements on the screen is zoomed in response to the touch, where N is a positive integer ranging from 1 to M−1. The zooming N UI elements includes: determining a distance between the first UI element and a second UI element of the N UI elements; determining, based on the distance, a range by which the second UI element is to be zoomed; and zooming the second UI element based on the range to visually indicate the touch. In this manner, association between animation effect of different UI elements can be strengthened, and a relationship between independent UI elements can be highlighted, so that animation effect of a UI better conforms to a use habit of a user, and user experience is significantly improved.

In some implementations, to determine the distance, a first reference point of the first UI element and a second reference point of the second UI element may be determined, and it is determined that a distance between the first reference point and the second reference point is the distance. In this manner, the distance may be determined based on determined reference points of UI elements, to improve accuracy of the determined distance and flexibility of a distance determining manner, and improve user experience.

In some implementations, to determine the distance, a first reference point of the first UI element may be determined; a target circle that intersects the second UI element and that has a smallest radius is determined from a plurality of circles that use the first reference point as a center and that have respective radii; and it is determined that a radius of the target circle is the distance. In this manner, a distance between UI elements can be determined more simply and conveniently, to improve flexibility of a distance determining manner, and improve user experience.

In some implementations, to determine the distance, a horizontal spacing between the first UI element and the second UI element may be determined; a vertical spacing between the first UI element and the second UI element; and the distance is determined based on any one of the following: at least one of the horizontal spacing and the vertical spacing; or at least one of the horizontal spacing and the vertical spacing, and a direction from a second reference point of the second UI element to a first reference point of the first UI element. In this manner, a distance between UI elements may be determined based on a spacing between the UI elements, to improve flexibility of a distance determining manner, and improve user experience.

In some implementations, the method may further include: determining an affected region of the first UI element based on a size of the first UI element; and determining a UI element, in the affected region, of the M UI elements as the N UI elements. In this manner, a UI element to be zoomed in linkage with a touched UI element may be determined based on a size of the touched UI element, so that animation effect of a UI better conforms to a use habit of a user, and user experience is significantly improved.

In some implementations, the method may further include: determining M−1 UI elements of the M UI elements other than the first UI element as the N UI elements. In this manner, all UI elements other than a touched UI element on a screen can be zoomed in linkage with the UI element, so that a UI element to be zoomed in linkage is determined more simply and conveniently, animation effect of a UI better conforms to a use habit of a user, and user experience is significantly improved.

In some implementations, to determine the range, a first range by which the first UI element is to be zoomed in response to the touch may be determined; and a range by which the second UI element is to be zoomed in response to the touch is determined based on any one of the following: the first range and the distance; or at least one of a size of the second UI element and the size of the first UI element, the first range, and the distance. In this manner, animation effect of the first UI element can be transferred to the second UI element, and animation effect of the second UI element is further determined based on the distance between the first UI element and the second UI element and the size of the second UI element. In this way, animation effect of a UI can better conform to a use habit of a user, and user experience is significantly improved.

In some implementations, the first range by which the first UI element is to be zoomed is determined based on at least one of the following items associated with the first UI element: the size of the first UI element; a range within which the first UI element is capable of changing; the duration; and a predetermined touch force. In this manner, the first range by which the first UI element is to be zoomed can be clearly, properly, and flexibly determined based on various factors associated with the first UI element, so that animation effect of a UI can better conform to a use habit of a user, and user experience is significantly improved.

In some implementations, the zooming the second UI element may include: determining delay time based on the distance; and zooming the second UI element in response to that the delay time elapses after the touch occurs. In this manner, linkage zooming can be propagated with a distance in visual presentation, so that animation effect of a UI better conforms to a use habit of a user, and user experience is significantly improved.

In some implementations, the zooming the second UI element may include: determining, based on a predefined curve of a range varying with time, a velocity at which the second UI element is to be zoomed in response to the touch. In this manner, zooming of the first UI element can be conveniently controlled based on the predefined curve of a range varying with time, so that animation effect of a UI better conforms to a use habit of a user, and user experience is significantly improved.

In some implementations, the predefined curve may be a Bezier curve or an elastic force curve. In this manner, zooming of the first UI element can be conveniently controlled based on the Bezier curve or the elastic force curve, so that animation effect of a UI better conforms to a use habit of a user, and user experience is significantly improved.

In some implementations, the method may further include: restoring a zoomed second UI element to the second UI element. In this manner, a UI element can be restored after being released, so that animation effect of a UI better conforms to a use habit of a user, and user experience is significantly improved.

In some implementations, the method may further include: determining, based on at least one of the distance, the duration, the size of the first UI element, and the size of the second UI element, a displacement by which the second UI element is to move; and moving the second UI element by the displacement in the direction from the second reference point of the second UI element to the first reference point of the first UI element. In this manner, association between animation effect of different UI elements can be further strengthened, and a relationship between independent UI elements can be highlighted, so that animation effect of a UI better conforms to a use habit of a user, and user experience is significantly improved.

In some implementations, the method may further include: restoring the second UI element from a position used after the movement to a position used before the movement. In this manner, a UI element can be restored after being released, so that animation effect of a UI better conforms to a use habit of a user, and user experience is significantly improved.

In some implementations, the method may be implemented by at least one of a file in an AAR format, a file in a JAR format, and a system interface. In this manner, graphical interface display with linkage zooming can be simply and conveniently implemented.

According to a second aspect of this disclosure, an electronic device is provided. The electronic device includes a processor and a memory storing instructions. When the instructions are executed by the processor, the electronic device is enabled to perform the method according to any one of the first aspect or the implementations of the first aspect.

According to a third aspect of this disclosure, a computer-readable storage medium is provided. The computer-readable storage medium stores instructions. When the instructions are executed by a processor, an electronic device is enabled to perform the method according to any one of the first aspect or the implementations of the first aspect.

According to a fourth aspect of this disclosure, a computer program product is provided. The computer program product includes instructions. When the instructions are executed by a processor, an electronic device is enabled to perform the method according to any one of the first aspect or the implementations of the first aspect.

BRIEF DESCRIPTION OF DRAWINGS

With reference to the accompanying drawings and the following detailed descriptions, features, advantages, and other aspects of implementations of this disclosure become clearer. Several implementations of this disclosure are shown herein as examples rather than limitations. In the accompanying drawings.

DESCRIPTION OF EMBODIMENTS

Figure 1A:
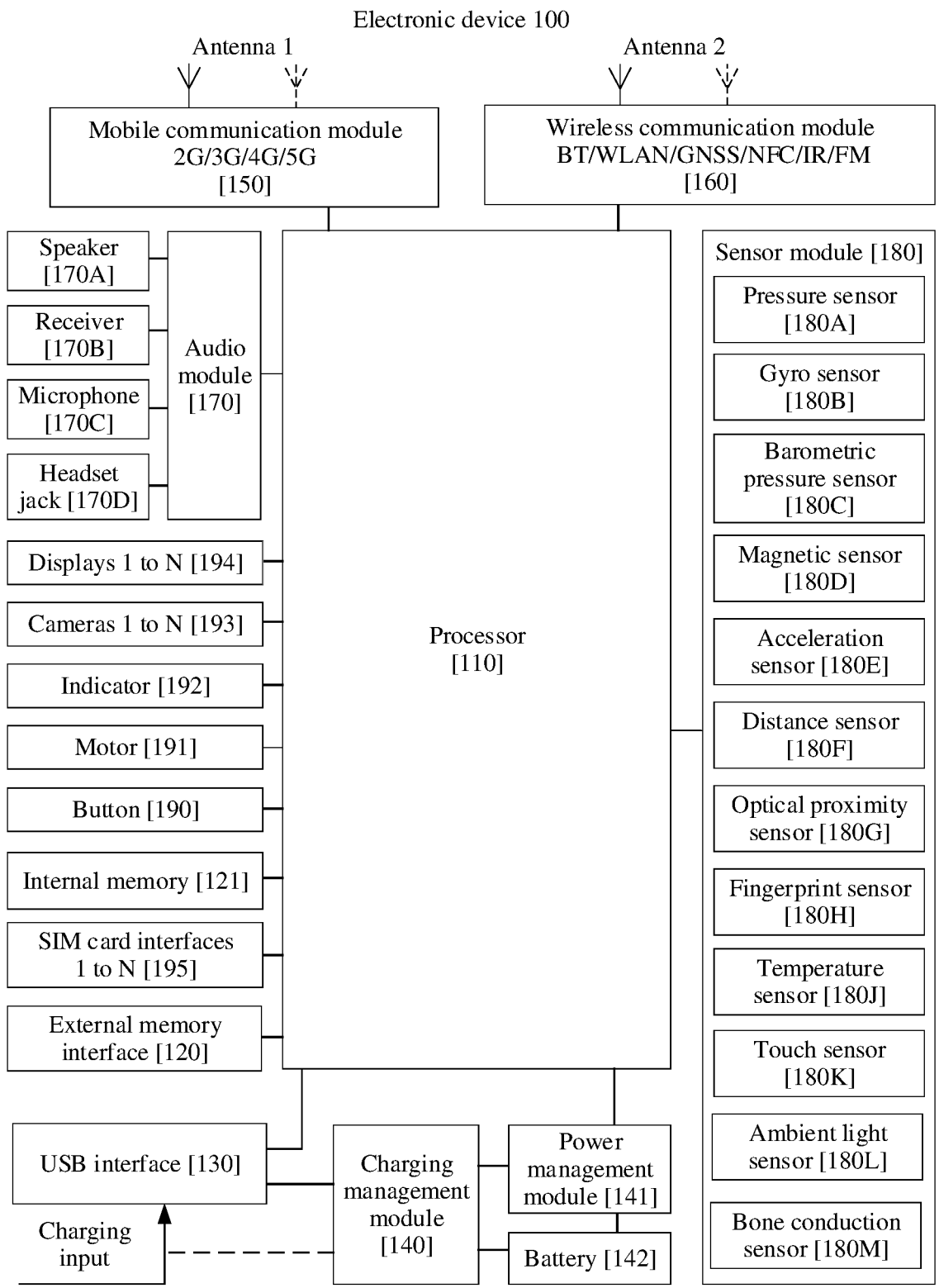
FIG. 1A and FIG. 1B are schematic diagrams of a hardware structure and a software structure of an electronic device that can implement an embodiment of this disclosure.

Some example implementations of this disclosure are described in more detail below with reference to the accompanying drawings. Although some example implementations of this disclosure are shown in the accompanying drawings, it should be understood that this disclosure may be implemented in various forms without being limited by the example implementations described herein. Rather, these implementations are provided to make this disclosure more thorough and complete and to fully convey the scope of this disclosure to a person skilled in the art.

The term "include" and variants thereof used in this specification indicate open inclusion, to be specific, "including but not limited to". Unless otherwise specified, the term "or" indicates "and/or". The term "based on" indicates "at least partially based on". The terms "embodiments" and "some embodiments" indicate "at least some embodiments". The terms "first", "second", and the like are intended to distinguish between different objects and the like, but do not represent a chronological order, and do not indicate that "first" and "second" are different types.

The term "UI" used in this specification indicates an interface for interaction and information exchange between a user and an application or an operating system. The UI implements conversion between an internal form of information and a form acceptable to the user. For example, a UI of an application is source code written by using a specific computer language such as Java or extensible markup language (extensible markup language, XML). The UI source code is parsed and rendered on an electronic device, and is finally presented as content that can be recognized by a user, for example, a UI element such as a picture, text, or a button.

In some embodiments, an attribute and content of a UI element on a UI are defined by using a tag or a node. For example, the UI element included in the UI is defined in the XML by using a node, for example, <Textview>, <ImgView>, or <VideoView>. One node corresponds to one UI element or one attribute on the UI. After being parsed and rendered, the node is presented as user-visible content. In addition, UIs of many applications such as a hybrid application (hybrid application) usually further include a web page. A web page may be understood as a special UI element embedded in a UI of an application. A web page is source code written in a specific computer language, for example, a hypertext markup language (hypertext markup language, HTML), cascading style sheets (cascading style sheets, CSS), or JavaScript (JavaScript, JS). The source code of the web page may be loaded and displayed as user-recognizable content by a browser or a web page display component with a function similar to a function of the browser. Specific content included in the web page is also defined by using a tag or a node in the source code of the web page. For example, an element and an attribute of the web page are defined in the HTML by using<p>, <img>, <video>, or <canvas>.

The term "UI element" used in this specification includes but is not limited to visual UI elements such as a window (window), a scrollbar (scrollbar), a tableview (tableview), a button (button), a menu bar (menu bar), a text box (text box), a navigation bar, a toolbar (toolbar), an image (image), statictext (statictext), and a widget (Widget).

Some processes described in embodiments of this disclosure include a plurality of operations or steps that appear in a specific order. However, it should be understood that the operations or steps may not be performed or performed in parallel according to the order in which the operations or steps appear in embodiments of this disclosure. Sequence numbers of the operations are merely intended to distinguish between different operations, and the sequence numbers do not indicate any execution order. In addition, the processes may include more or fewer operations, the operations or steps may be performed in sequence or in parallel, and the operations or steps may be combined.

In a mobile operating system such as Android or iOS, an animation is essentially real-time display of a user interface UI or a UI element based on a refresh rate. According to a principle of persistence of vision of human beings, a user feels that an image is moving. The animation is transformed from an initial state of the animation to a final state of the animation after time of the animation elapses. During the transformation, the animation may be controlled based on an animation type and an animation transformation form. For example, the animation type may include a displacement animation, a rotation animation, a zoom animation, and a transparent animation. The animation transformation form may be controlled by controllers such as an interpolator and an estimator. The controllers may be configured to control a transformation velocity of the animation during the time of the animation.

However, conventionally, an animation is only a combination of simple animation effect. As a result, the animation effect is simple and does not conform to a physical rule, and a real use scenario, a use habit of a user, and the like are not considered.

Therefore, embodiments of this disclosure provide a new graphical interface display solution. Embodiments of this disclosure relate to linkage of animation effect of UI elements on a UI, including drag linkage, depth linkage, and pressure linkage. In linkage, a target UI element on which an operation is performed may affect other UI elements on which no operation is performed. Specifically, when animation effect of the target UI element is triggered, animation effect of one or more other UI elements or even other UI elements on the entire UI may be triggered in linkage.

In this way, association between animation effect of different UI elements can be strengthened, and a relationship between independent UI elements can be highlighted. Compared with a conventional animation in which animation effect is simple and each UI element is independent without association, in embodiments of this disclosure, animation effect can better conform to a physical rule, and a real use scenario and a use habit of a user are considered, so that user experience can be significantly improved.

The following describes some example embodiments of this disclosure with reference to FIG. 1A to FIG. 46D.

FIG. 1A is a schematic diagram of a hardware structure of an electronic device 100 that can implement an embodiment of this disclosure. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a handprint sensor 180H, a temperature sensor 180J, a touch sensor 180K, an ambient light sensor 180L, a bone conduction sensor 180M, and the like.

It should be understood that the structure shown in this embodiment of this disclosure does not constitute a specific limitation on the electronic device 100. In some other embodiments of this disclosure, the electronic device 100 may include more or fewer components than those shown in the figure, some components may be combined, some components may be split, or there may be different component layouts. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. The controller may generate an operation control signal based on an instruction operation code and a time sequence signal, to control instruction reading and instruction execution.

A memory may be further disposed in the processor 110 to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used for audio communication, and analog signal sampling, quantization, and encoding. In some embodiments, the audio module 170 may be coupled to the wireless communication module 160 through the PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 16o. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini-USB interface, a micro-USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may alternatively be configured to connect to another electronic device such as an AR device.

It can be understood that an interface connection relationship between the modules in this embodiment of this disclosure is merely an example for description, and does not constitute a limitation on a structure of the electronic device 100. In some other embodiments of this disclosure, the electronic device 100 may alternatively use an interface connection mode different from that in the foregoing embodiment, or use a combination of a plurality of interface connection modes.

The charging management module 140 is configured to receive charging input from a charger. The charger may be a wireless charger or a wired charger. In some embodiments in which wired charging is used, the charging management module 140 may receive charging input from a wired charger through the USB interface 130. In some embodiments in which wireless charging is used, the charging management module 140 may receive wireless charging input through a wireless charging coil of the electronic device 100. The charging management module 140 may further supply power to the electronic device 100 through the power management module 141 while charging the battery 142.

The power management module 141 is connected to the battery 142, the charging management module 140, and the processor 110. The power management module 141 receives input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a quantity of battery cycles, and a battery health status (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution applied to the electronic device 100 for wireless communication such as 2G/3G/4G/5G/6G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, and the like), or displays an image or a video on the display 194. In some embodiments, the modem processor may be an independent device. In some other embodiments, the modem processor may be independent of the processor 110, and is disposed in a same device as the mobile communication module 150 or another functional module.

The wireless communication module 16o may provide a solution applied to the electronic device 100 for wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology. The wireless communication module 16o may be one or more devices integrating at least one communication processor module. The wireless communication module 16o receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), 5G and a future evolved standard, BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, or the like. The display 194 includes a display panel. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like. The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be connected to an external storage card, for example, a microSD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application program for at least one function (for example, a sound play function or an image play function), and the like. The data storage area may store data (for example, audio data and an address book) and the like that are created during use of the electronic device 100. In addition, the internal memory 121 may include a high-velocity random access memory, or may include a non-volatile memory, for example, at least one magnetic disk storage device, a flash memory, or a universal flash storage (universal flash storage, UFS). The processor 110 performs various function applications and data processing of the electronic device 100 by running instructions stored in the internal memory 121 and/or instructions stored in the memory disposed in the processor.

The electronic device 100 may implement an audio function, for example, music play and recording, through the audio module 170, the speaker 170A, the receiver 170B, the microphone 170C, the headset jack 170D, the application processor, and the like.

The SIM card interface 195 is used for connecting a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted in a same SIM card interface 195 at the same time. The plurality of cards may be of a same type or different types. The SIM card interface 195 is also compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a hierarchical architecture, an event-driven architecture, a microkernel architecture, a micro service architecture, or a cloud architecture. In embodiments of this disclosure, a mobile operating system with a hierarchical architecture is used as an example to describe a software structure of the electronic device 100.

Figure 1B:
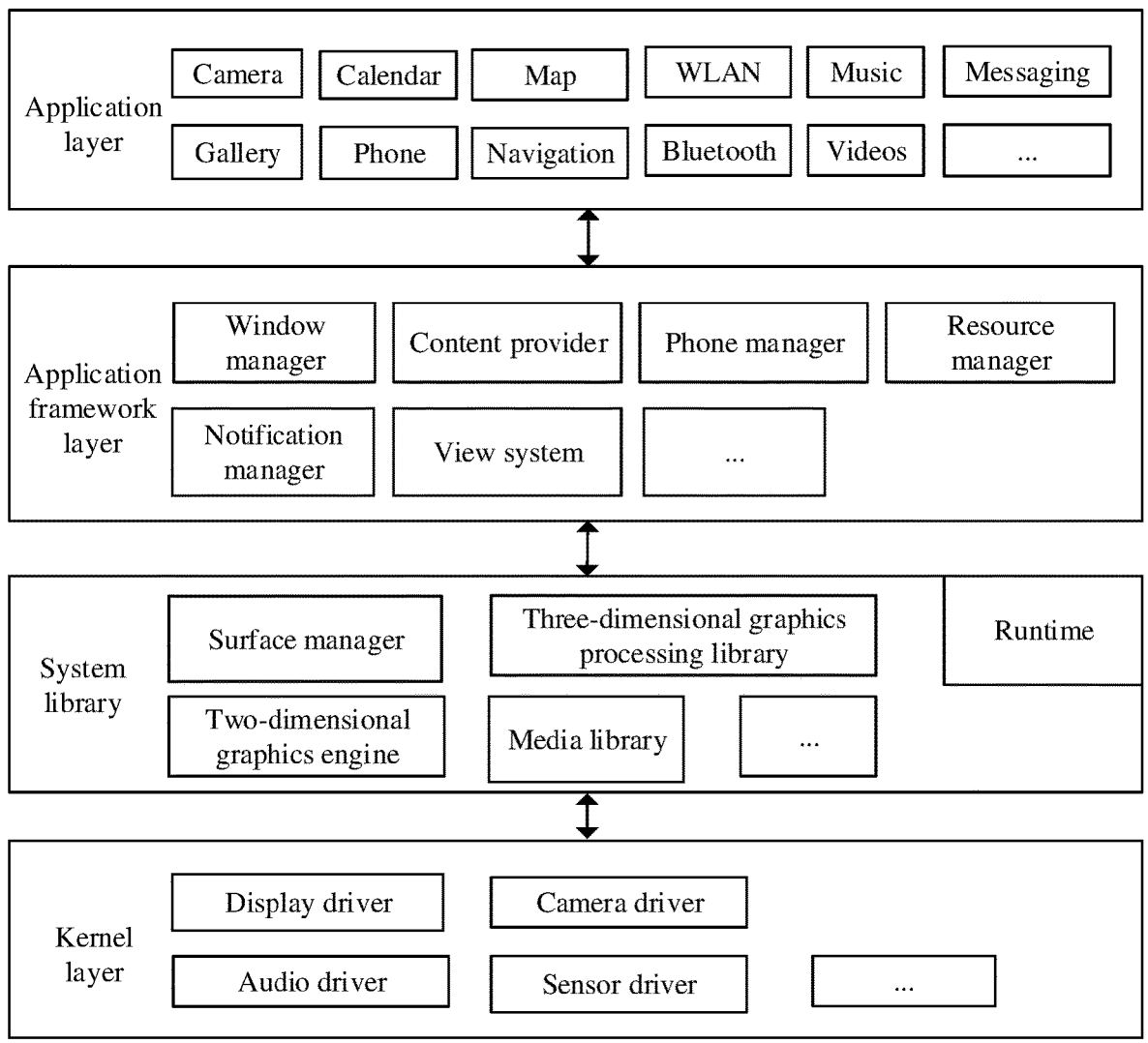

FIG. 1B is a schematic diagram of a software structure of an electronic device 100 according to an embodiment of this disclosure. In the hierarchical architecture, software is divided into several layers, and each layer has a clear role and task. The layers communicate with each other through a software interface. In some embodiments, the operating system may be divided into four layers: an application layer, an application framework layer, an operating system runtime (runtime) and system library, and a kernel layer from top to bottom.

The application layer may include a series of application packages. As shown in FIG. 1B, the application packages may include applications such as Camera, Gallery, Calendar, Phone, Map, Navigation, WLAN, Bluetooth, Music, Videos, and Messaging.

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like. The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and answered, a browsing history, a bookmark, an address book, and the like. The view system includes visual controls, such as a control for displaying text and a control for displaying an image. The view system may be configured to construct an application. A display interface may include one or more views. For example, a display interface including an SMS message notification icon may include a text display view and an image display view. The phone manager is configured to provide a communication function for the electronic device 100, for example, management of a call status (including answering, hanging up, or the like). The resource manager provides various resources such as a localized character string, an icon, an image, a layout file, and a video file for an application. The notification manager enables an application to display notification information in a status bar, and may be configured to convey a notification message. The notification manager may automatically disappear after a short pause without user interaction. For example, the notification manager is configured to indicate download completion or provide a message notification. The notification manager may alternatively be a notification that appears in a top status bar of the system in a form of a graph or scroll bar text, for example, a notification for an application running in the background, or may be a notification that appears on the screen in a form of a dialog window. For example, text information is displayed in the status bar, a prompt tone is played, the electronic device vibrates, or an indicator blinks.

Still as shown in FIG. 1B, the operating system runtime includes a kernel library and a virtual machine. The operating system runtime schedules and manages the operating system. The kernel library includes two parts: a function that needs to be called in Java language and a kernel library of the operating system. The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection. The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D and 3D layers for a plurality of applications. The media library supports play and recording of a plurality of commonly used audio and video formats, static image files, and the like. The media library may support a plurality of audio and video encoding formats such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

Figure 2:
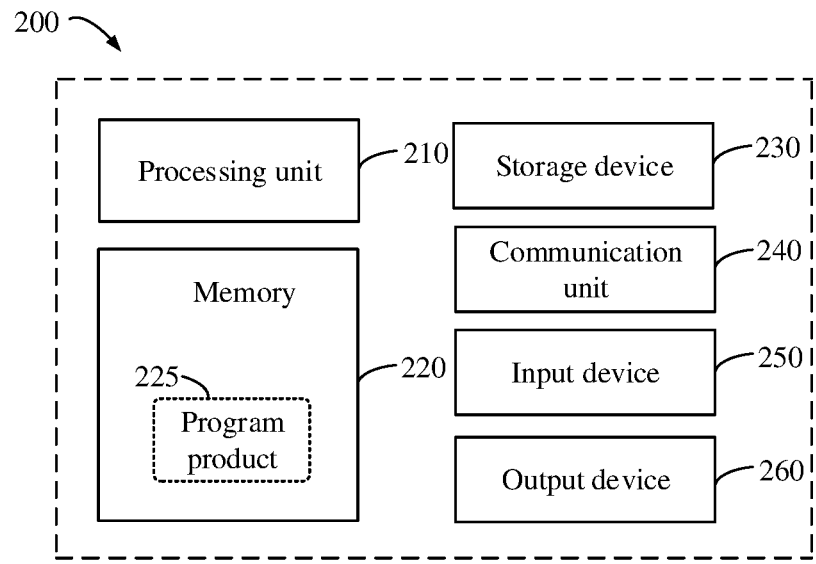
FIG. 2 is a block diagram of another electronic device that can implement an embodiment of this disclosure.

FIG. 2 is a block diagram of another electronic device 200 that can implement an embodiment of this disclosure. As shown in FIG. 2, the electronic device 200 may be in a form of a general-purpose computing device. Components of the electronic device 200 may include but are not limited to one or more processors or processing units 210, a memory 220, a storage device 230, one or more communication units 240, one or more input devices 250, and one or more output devices 260. The processing unit 210 may be a physical or virtual processor and is capable of performing various types of processing based on programs stored in the memory 220. In a multiprocessor system, a plurality of processing units execute computer-executable instructions in parallel, to improve a parallel processing capability of the electronic device 200.

The electronic device 200 usually includes a plurality of computer storage media. The medium may be any available medium accessible to the electronic device 200, including but not limited to a volatile medium, a non-volatile medium, a removable medium, and a non-removable medium. The memory 220 may be a volatile memory (for example, a register, a cache, a random access memory (RAM)), a non-volatile memory (for example, a read-only memory (ROM), an electrically erasable programmable read-only memory (EEPROM), a flash memory), or a combination thereof. The storage device 230 may be a removable or non-removable medium, and may include a machine-readable medium, for example, a flash drive, a magnetic disk, or any other medium. The storage device 230 may be configured to store information and/or data (for example, training data used for training), and may be accessed on the electronic device 200.

The electronic device 200 may further include another removable, non-removable, volatile, or non-volatile storage medium. Although not shown in FIG. 2, a magnetic disk drive for reading data from or writing data to a removable or non-volatile magnetic disk (for example, a "floppy disk") and an optical disc drive for reading data from or writing data to a removable or non-volatile optical disc may be provided. In these cases, each drive may be connected to a bus (not shown) through one or more data medium interfaces. The memory 220 may include a computer program product 225, and the computer program product 225 includes one or more program modules. The program modules are configured to perform an object editing method or process in embodiments of this disclosure.

The communication unit 240 communicates with another computing device through a communication medium. In addition, functions of the components of the electronic device 200 may be implemented by a single computing cluster or a plurality of computing machines. The computing machines are capable of performing communication through a communication connection. Therefore, the electronic device 200 may perform an operation in a network environment through a logical connection to one or more other servers, a network personal computer (PC), or another network node.

The input device 250 may be one or more input devices, for example, a mouse, a keyboard, or a tracking ball. The output device 260 may be one or more output devices, for example, a display, a speaker, or a printer. In this embodiment of this disclosure, the output device 260 may include a touchscreen with a touch sensor, and the touchscreen may receive touch input from a user. The electronic device 200 may further communicate with one or more external devices (not shown) through the communication unit 240 according to a requirement. The external device, such as a storage device or a display device, communicates with one or more devices that enable a user to interact with the electronic device 200, or communicates with any device (for example, a network interface card or a modem) that enables the electronic device 200 to communicate with one or more other computing devices. The communication may be performed through an input/output (I/O) interface (not shown).

It should be understood that the electronic device 100 shown in FIG. 1A and FIG. 1B and the electronic device 200 shown in FIG. 2 are merely two example electronic devices that can implement one or more embodiments of this disclosure, and should not be construed as any limitation on functions or scopes of embodiments described in this specification.

Drag Linkage

Currently, to better display more information, a screen of an electronic device is increasingly large, a layout of a UI on the screen is increasingly complex, and a difference between UI elements in sizes and shapes is increasingly large. In this case, the UI includes various irregular UI elements arranged in various irregular layouts. For example, a leftmost screen, a control center, an application market, or a gallery of a smartphone includes various irregular UI elements such as controls, cards, pictures, and covers.

Conventionally, there is no animation effect linkage between various irregular UI elements. To be specific, when animation effect of a target UI element is triggered, animation effect of one or more other elements is not triggered in linkage. Animation effect of each UI element is independent without association. Therefore, conventional animation effect is simple and inflexible, and cannot indicate a relationship between UI elements.

Embodiments of this disclosure relate to linkage of animation effect in a case in which a UI element on a UI is dragged. This is also referred to as drag linkage. In drag linkage, a dragged target UI element may affect other UI elements that are not dragged. Specifically, in the drag linkage, when animation effect of the target UI element is triggered, animation effect of one or more other UI elements or even other UI elements on the entire UI may be triggered in linkage. For example, in the drag linkage, when the target UI element is dragged, the target UI element moves along with the drag with specific animation effect, and other UI elements may also move with corresponding animation effect, to visually present a linkage drag.

In this way, association between animation effect of different UI elements can be strengthened, and a relationship between independent UI elements can be highlighted. Compared with a conventional animation in which animation effect is simple and each UI element is independent without association, in embodiments of this disclosure, animation effect can better conform to a physical rule, and a real use scenario and a use habit of a user are considered, so that user experience can be significantly improved.

The following describes some example embodiments of drag linkage with reference to FIG. 3A to FIG. 19B.

Figure 3A:
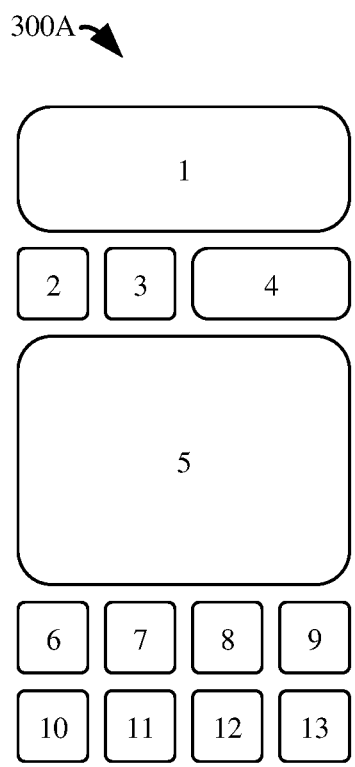
FIG. 3A to FIG. 3C are schematic diagrams of example UIs according to some embodiments of this disclosure.
Figure 3B:
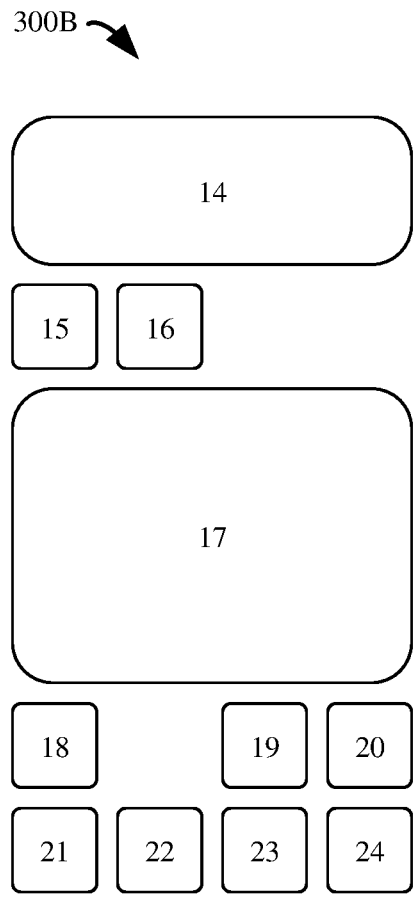
Figure 3C:
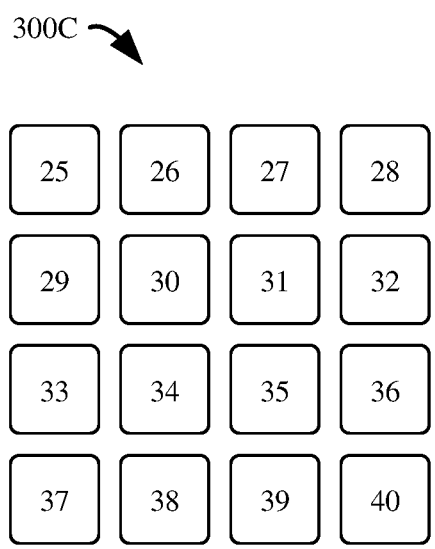

FIG. 3A to FIG. 3C are schematic diagrams of example UIs 300A to 300C according to some embodiments of this disclosure. In some embodiments, UI elements may have irregular sizes and shapes. For example, as shown in FIG. 3A, the UI 300A may include a plurality of UI elements, for example, UI elements 1 to 13, where UI elements 1, 2, 4, and 5 have different sizes and shapes. Further, a UI may also have an irregular localities. For example, as shown in FIG. 3B, an area on the right of UI elements 16 and 18 on the UI 300B are vacant, to be specific, there is no UI element. However, embodiments of this disclosure are also applicable to regular layouts, sizes, and shapes. For example, as shown in FIG. 3C, the UI 300C has a regular layout, and UI elements 25 to 40 on the UI 300C all have a same size and shape. It should be understood that embodiments of this disclosure are applicable to any appropriate regular or irregular layouts, sizes, and shapes.

A UI element on a UI may be dragged. For example, when a user expects to move a UI element, the user may drag the UI element. In an example, when a user expects to change a position of a UI element on a UI, combine a UI element with another UI element, or place a UI element in a toolbar or a recycle bin, the user may drag the UI element. When a drag at a UI element is detected, the UI element may move with specific animation effect, to visually present a drag action. As described above, in drag linkage, a dragged target UI element may affect other UI elements that are not dragged. Specifically, when the target UI element is dragged, the target UI element moves along with the drag with specific animation effect, and other UI elements may also move with corresponding animation effect, to visually present a linkage drag.

Figure 4:
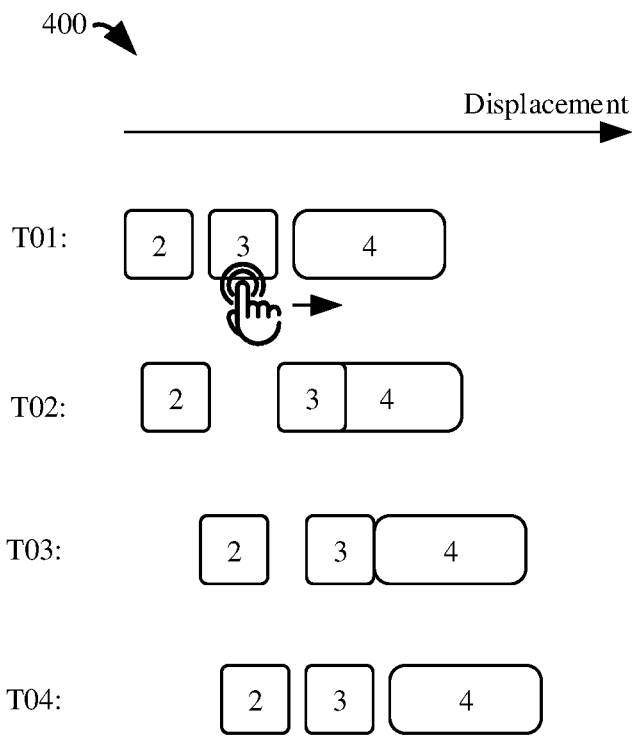
FIG. 4 is a schematic diagram of example drag linkage according to some embodiments of this disclosure.

FIG. 4 is a schematic diagram of example drag linkage 400 according to some embodiments of this disclosure. As shown in FIG. 4, when a drag at a UI element 3 is detected, the UI element 3 may move with specific animation effect, to visually present a drag action. The target UI element 3 moves along with the drag with specific animation effect, and other UI elements 2 and 4 may also move with corresponding animation effect, to visually present a linkage drag. For clarity, FIG. 4 shows only linkage movement of the UI elements 2 and 3. It should be understood that the linkage movement may occur at any at least two UI elements on any UI, for example, at any at least two UI elements on the UIs 300A to 300C.

Specifically, when a drag at the UI element 3 is detected at time T01, the UI element 3 and the other UI elements 2 and 4 are enabled to move. At time T02, a spacing between the UI element 3 and the UI element 4 in a drag direction decreases. A spacing may represent a distance between corresponding reference points of two UI elements. In some embodiments, it may be determined that a center point of a UI element is a reference point of the UI element. Alternatively, a spacing may represent a distance between adjacent boundaries of two UI elements. As shown in FIG. 4, in some embodiments, the UI element 3 may even cover at least a part of the UI element 4. A spacing between the UI element 3 and the UI element 2 in a direction opposite to the drag direction increases. This means that a moving velocity of the UI element 3 is greater than that of the UI elements 2 and 4. At time T03, the spacing between the UI element 3 and the UI element 4 in the drag direction increases, and the spacing between the UI element 3 and the UI element 2 in the direction opposite to the drag direction decreases. This means that a moving velocity of the UI element 3 is less than that of the UI elements 2 and 4. At time T04, the UI element 3 and the other elements 2 and 4 move to a predetermined distance, and therefore stop moving. In some embodiments, the predetermined distance may be determined based on a friction model. The following describes in detail a manner of determining a distance based on the friction model. Therefore, descriptions thereof are omitted herein.

The foregoing describes an example of linkage movement of UI elements, and the following describes a principle of movement of a UI element.

Movement of a UI element may be controlled by the following factors: a friction factor, a linkage factor, a hand following factor, a hand following ratio factor, a hand-release rebound factor, and/or an inertia rebound factor. For example, the friction factor may control the UI element to stop moving. The linkage factor may control animation effect of another UI element. The hand following factor may control hand-following movement of the UI element, for example, hand-following movement of the UI element when the UI element is dragged within a boundary. The hand-following ratio factor may control a ratio of hand-following movement of the UI element, for example, a ratio of a displacement of the UI element to a displacement of a hand when the UI element is dragged beyond a boundary. The hand-release rebound factor may control restoration of the UI element when a hand is released, for example, restoration of the UI element when a hand is released after the UI element is dragged beyond a boundary. The inertia rebound factor may control a rebound of the UI element after the UI element crosses a boundary. For example, when the UI element moves across a boundary, the friction factor may not be able to control the UI element to stop moving. In this case, the inertia rebound factor may control a rebound of the UI element after the UI element crosses a boundary.

The following describes in detail a friction model associated with a friction factor and an elastic force model associated with a linkage factor. Generally, a distance by which a UI element is to move may be determined by using the friction model, to determine a source position and a destination position of movement of the UI element. In addition, based on a spring parameter (for example, an elasticity coefficient or a damping coefficient) of a dragged UI element, a spring parameter of another UI element that moves in linkage may be determined in a transfer manner described in detail below. In this way, during movement of the dragged UI element and the UI element that moves in linkage, each UI element is controlled, based on a spring parameter of the UI element, to move in conformity to the elastic force model.

The friction model may be used to determine a distance by which a UI element is to move, for example, a distance by which a UI element is to move after a hand is released or flicked. The distance may be determined by using the following equations (1) and (2):

$$V(t) = V_0 \times e^{-4.2 \times f_{friction} \times t} \quad (1)$$

$$S(t) = \left(\frac{V_0}{-4.2 \times f_{friction}}\right) \times \left(e^{-4.2 \times f_{friction} \times t} - 1\right), \quad (2)$$

$f_{friction}$ indicates friction, and may be configured by an electronic device or a user; t indicates time of movement; $V_0$ indicates an initial velocity, and may be configured by an electronic device or a user, or is obtained by detecting a velocity of a drag performed by a user; V(t) indicates a final velocity, and because movement of a UI element finally stops, V(t) is 0; e indicates a natural constant; and S(t) indicates a distance by which a UI element is to move. It should be understood that the constants in the foregoing equations are merely examples, and may be set by an electronic device or a user.

It can be learned from the foregoing equations that the time t of movement may be determined by using the equation (1). Therefore, the distance S(t) may be further determined by using the equation (2). In this manner, a distance by which a UI element is to move may be easily determined. In addition, because various parameters (for example, the friction and the initial velocity) in the equations are configurable, a distance by which a UI element is to move may be affected by configuring the parameters, to improve flexibility of animation effect and user experience.

Figure 5A:
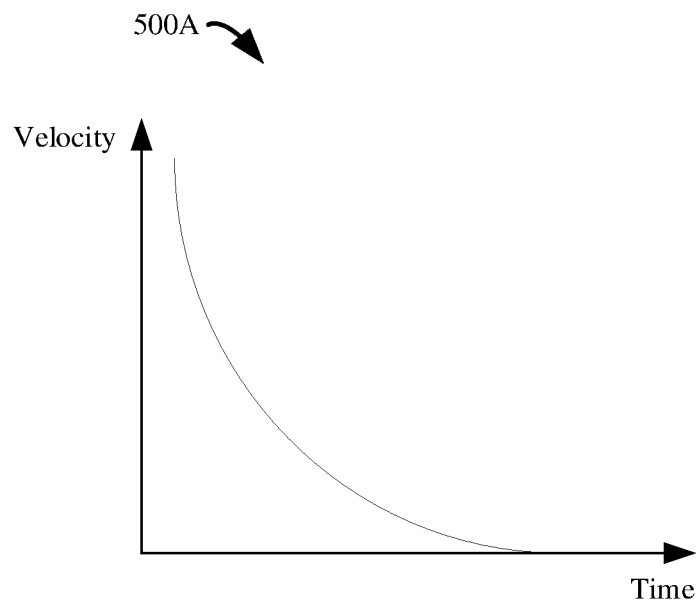
FIG. 5A and FIG. 5B are schematic diagrams of an example velocity-time curve and an example displacement-time curve of a friction model respectively according to some embodiments of this disclosure.
Figure 5B:
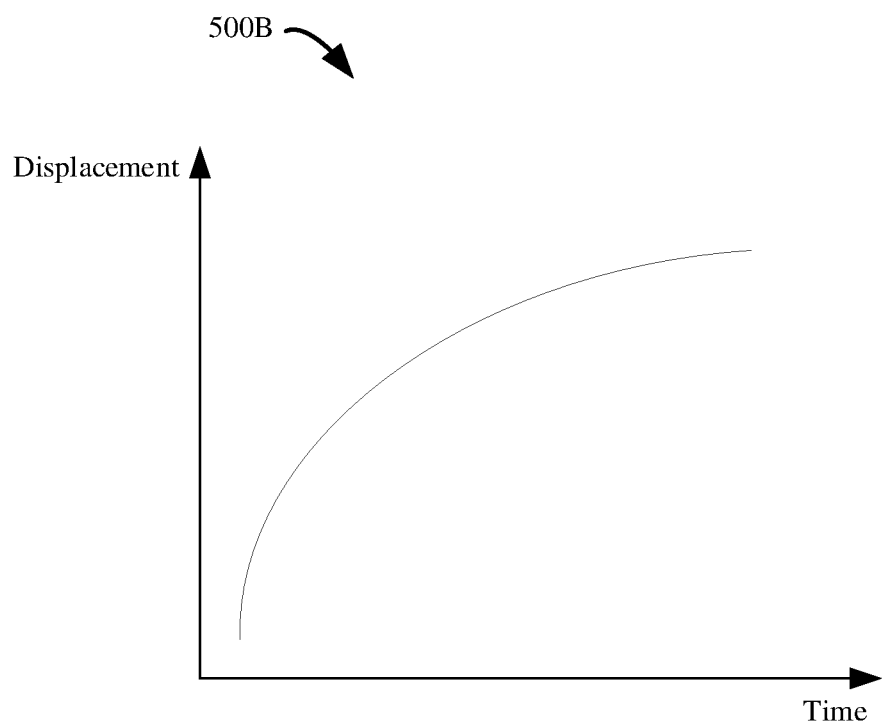

Movement of a UI element in conformity to the friction model meets a velocity-time curve and a displacement-time curve of the friction model. FIG. 5A and FIG. 5B are schematic diagrams of an example velocity-time curve 500A and an example displacement-time curve 500B of a friction model respectively according to some embodiments of this disclosure. As shown in FIG. 5A and FIG. 5B, when only friction is applied, a moving velocity of a UI element decreases to 0 with time, and a moving distance of the UI element increases with time until the UI element stops moving.

The foregoing describes how the friction factor controls a UI element to stop moving. In addition, whether a position to which a UI element can move is limited may also control a position at which the UI element stops moving.

Specifically, in some embodiments, a position to which a UI element can move is not limited. In this case, a distance determined based on the friction model is a distance by which the UI element is to move. However, in some embodiments, a position to which a UI element can move is limited. In other words, the UI element can move only to a predetermined position. In this case, although a distance by which the UI element is to move may be determined based on the friction model, if the UI element is not at the predetermined position after moving by the distance, a distance by which the UI element is to move needs to be adjusted, so that the UI element can move to the predetermined position. For example, the UI element may move to a predetermined position closest to a stop position determined based on the friction model. Therefore, a distance by which the UI element is to move may be determined based on both the friction model and the predetermined position.

Figure 6:
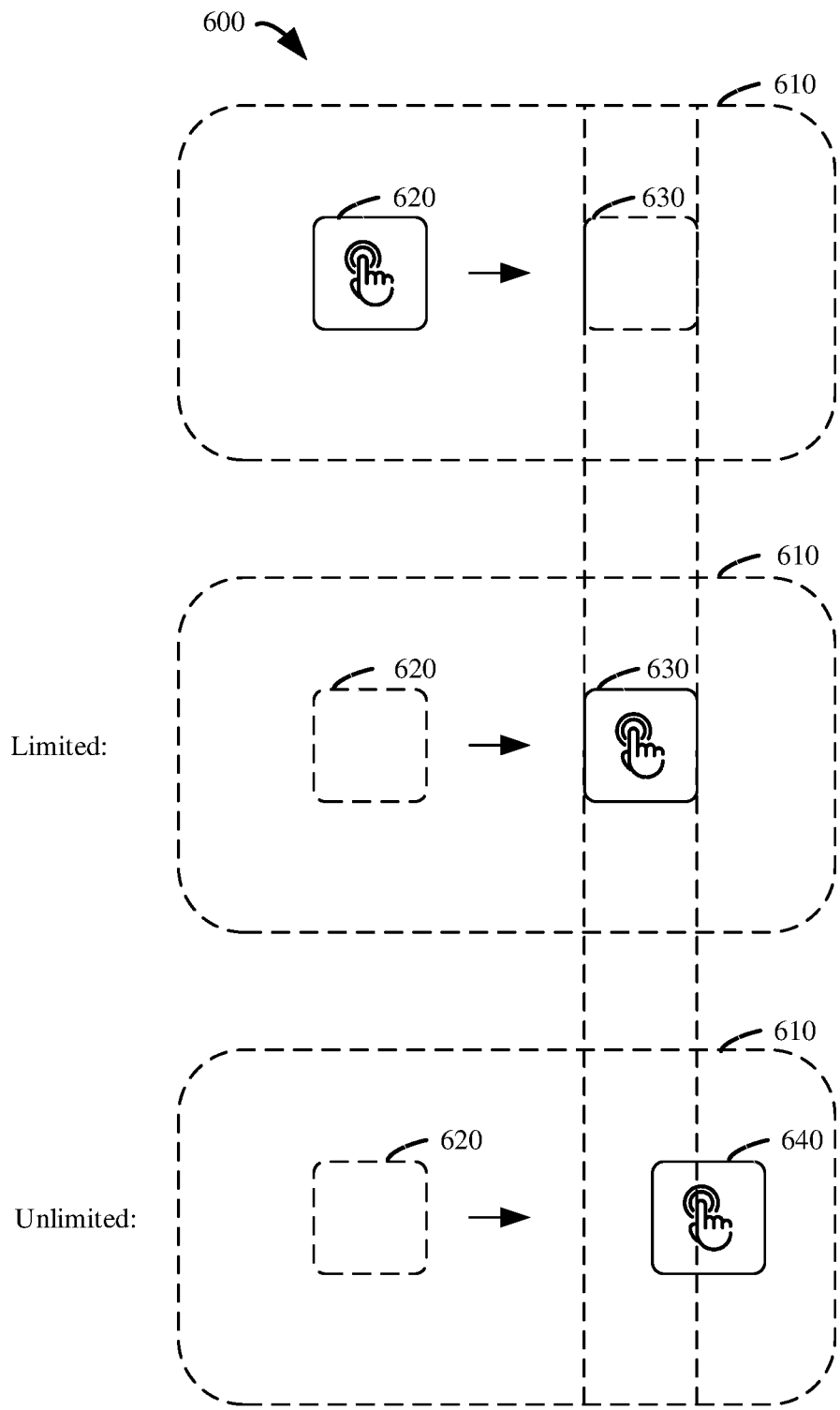
FIG. 6 is a schematic diagram of an example in which a movement position is limited and unlimited according to some embodiments of this disclosure.

FIG. 6 is a schematic diagram of an example 600 in which a movement position is limited and unlimited according to some embodiments of this disclosure. As shown in FIG. 6, when a position to which a UI element can move is limited, the UI element can move only from a source position 620 on a screen 610 to a predetermined position 630. In comparison, when a position to which a UI element can move is not limited, the UI element can move from the source position 620 on the screen 610 to any position 640.

Further, in some embodiments, a range within which a UI element can move may be further limited. The UI element moving beyond the range is considered as boundary crossing. The range may be any appropriate range. For example, the range may be a range within which a distance from a screen boundary is less than a predetermined proportion of a screen size or predetermined pixels (for example, 10% or 1000 pixels), or a range within which a distance from a source position of the UI element to a destination position is less than a predetermined proportion of a screen size or predetermined pixels (for example, 50% or 10000 pixels). Therefore, a distance by which the UI element is to move may alternatively be determined based on the range.

The friction model is described in detail above, and the elastic force model is further described below.

A curve of a movement displacement of a UI element varying with time may be an elastic force curve that conforms to the elastic force model. Because a velocity may be determined based on a displacement and time, a moving velocity of a UI element also conforms to the elastic force model. Therefore, it can be considered that a motion rule of a spring may be simulated in movement of a UI element. It should be understood that, to describe the elastic force model herein, the curve of a movement displacement of a UI element varying with time is described as the elastic force curve. However, the curve of a movement displacement of a UI element varying with time may alternatively be any appropriate predefined curve, for example, a Bezier curve.

The elastic force model may be based on damping vibration equations (3) and (4) according to the Hooke's law:

$$f = ma \quad (3)$$

$$-kx - g\frac{dx}{dt} = m\frac{d^2x}{dt^2}, \quad (4)$$

f indicates a force applied to a spring during vibration (namely, movement), and may be configured by an electronic device or a user; a indicates an acceleration of movement; t indicates time of movement; k indicates an elasticity coefficient of the spring; x indicates a deformation amount of the spring; g indicates a damping coefficient of the spring; and m indicates mass of a UI element, and herein, a size of the UI element may be equivalent to the mass of the UI element.

The elasticity coefficient indicates a force to be applied per unit deformation amount of the spring. A larger elasticity coefficient k indicates shorter time for the spring to return to an equilibrium position from a maximum amplitude, and a smaller elasticity coefficient k indicates longer time for the spring to return to the equilibrium position from the maximum amplitude. The elasticity coefficient k may be configured by an electronic device or a user. In some embodiments, a value range of the elasticity coefficient k may be 1 to 999, and a recommended value range of the elasticity coefficient k may be 150 to 400.

The damping coefficient is a quantitative representation of a shock absorption force (for example, fluid resistance or friction) of the spring during vibration. The shock absorption force can enable an amplitude of the spring to gradually decrease until the spring stops at the equilibrium position. A larger damping coefficient indicates that it is easier for the spring to stop at the equilibrium position, and a smaller damping coefficient indicates that it is harder for the spring to stop at the equilibrium position. The damping coefficient g may be configured by an electronic device or a user. In some embodiments, a value range of the damping coefficient g may be 1 to 99.

In addition, it should be understood that, as described above, a distance S(t) by which the UI element is to move may be determined based on the friction model. When the UI element moves by the distance S(t), S(t) may be considered as a deformation amount of the spring. Therefore, S(t) is equal to x.

The elastic force model has three damping states: a critically damped state, an underdamped state, and an overdamped state. Critical damping meets the following equation (5):

$$g^2 = 4 \times m \times k, \quad (5)$$

g indicates the damping coefficient of the spring, m indicates the size of the UI element, and k indicates the elasticity coefficient of the spring.

The critical damping is used as a reference. A case in which damping is greater than the critical damping is the overdamped state. A case in which damping is less than the critical damping is the underdamped state.

Figure 7A:
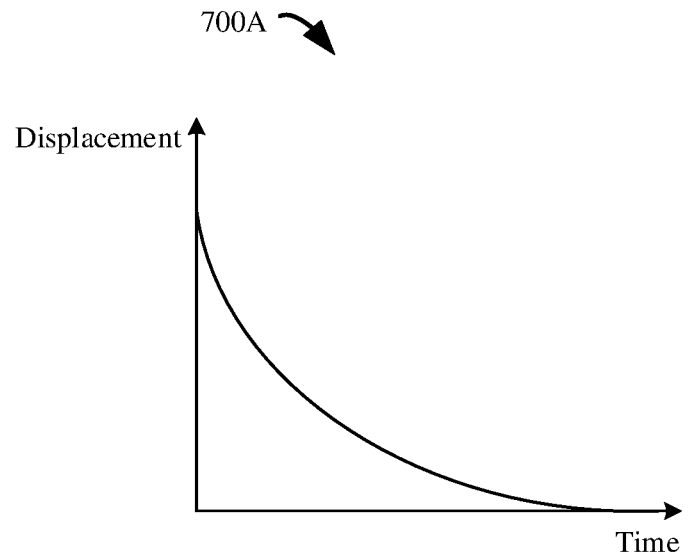
FIG. 7A to FIG. 7C are schematic diagrams of example curves of a deformation amount x of a spring varying with time t in a critically damped state, an underdamped state, and an overdamped state respectively according to some embodiments of this disclosure.
Figure 7B:
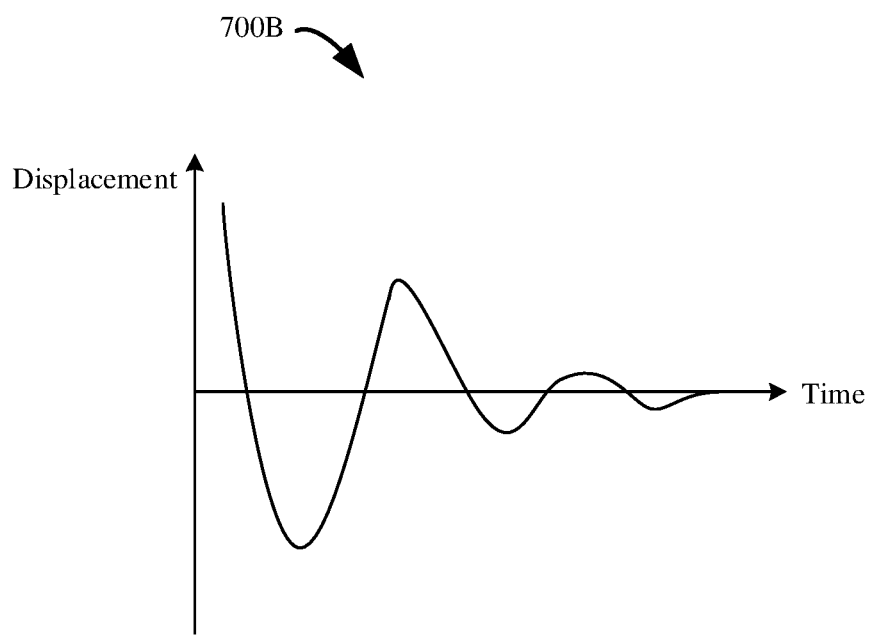
Figure 7C:
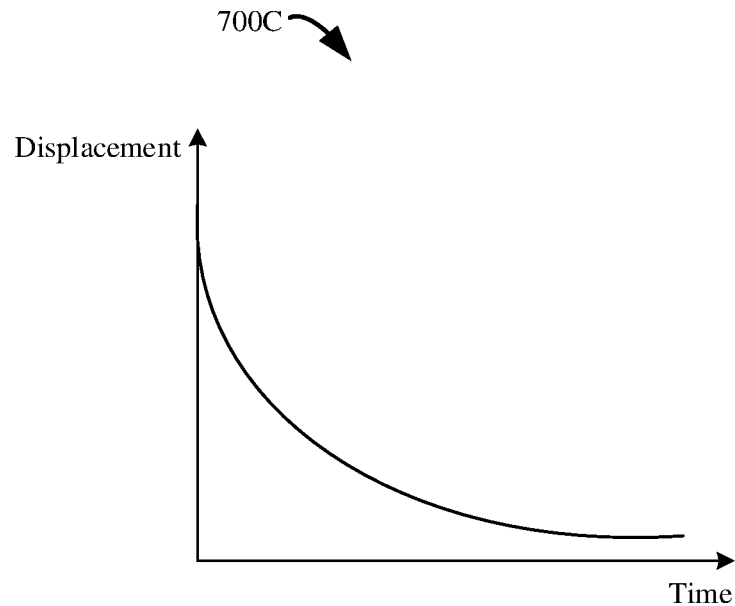

In different damping states, a displacement-time curve of a UI elements varies. FIG. 7A to FIG. 7C are schematic diagrams of example curves 700A to 700C of a deformation amount x of a spring varying with time t in a critically damped state, an underdamped state, and an overdamped state respectively according to some embodiments of this disclosure. As shown in FIG. 7A, in the critically damped state, the spring stops moving and no longer vibrates after returning to an equilibrium position at a most steady velocity within shortest time. As shown in FIG. 7B, in the underdamped state, an amplitude of the spring slowly and gradually decreases through a plurality of vibrations, and the spring finally returns to an equilibrium position. As shown in FIG. 7C, in the overdamped state, the spring almost does not vibrate, and an amplitude gradually decreases, to reach an equilibrium position.

As described above, a curve of a movement displacement of a UI element varying with time may be an elastic force curve that conforms to an elastic force model. Therefore, it can be considered that a motion rule of a spring may be simulated in movement of a UI element. To be specific, a variation rule of a deformation amount of the spring may be simulated in a variation rule of a displacement of the UI element. A damping coefficient and/or an elasticity coefficient may be adjusted to adjust the variation rule of the displacement of the UI element, so that the UI element simulates a motion rule of the spring in a critically damped state, an overdamped state, or an underdamped state.

Further, as described above, based on a spring parameter (for example, an elasticity coefficient or a damping coefficient) of a dragged UI element, a spring parameter of another UI element that moves in linkage may be determined in a transfer manner described in detail below. In this way, during movement of the dragged UI element and the UI element that moves in linkage, each UI element is controlled, based on a spring parameter of the UI element, to move in conformity to the elastic force model. In this way, the dragged UI element and the UI element that moves in linkage can simulate motion rules of springs with different spring parameters, to present animation effect that a spacing between UI elements in a drag direction is first reduced and then restored (similar to that the spring is first compressed and then restored), and a spacing between UI elements in a direction opposite to the drag direction is first increased and then restored (similar to that the spring is first stretched and then restored). This adds a dynamic feedback to a drag action of a user.

Animation effect of a UI element that moves in linkage is determined based on animation effect of movement of a dragged UI element and a distance between the dragged UI element and the UI element that moves in linkage. Because animation effect of movement of the UI element that moves in linkage varies with the distance, it can also be considered that the animation effect of the movement of the UI element that moves in linkage is transferred with the distance. In some embodiments, the transfer may be nonlinear transfer. Alternatively, the transfer may be linear transfer.

For example, in the case of nonlinear transfer, the animation effect of the movement of the UI element that moves in linkage may be determined by using the following equation (6):

$$x^n = x \times (n+1)^{-0.18 \times g}, \qquad (6)$$

$x^n$ indicates the animation effect of the movement of the UI element that moves in linkage; x indicates the animation effect of the movement of the dragged UI element; n indicates the distance between the dragged UI element and the UI element that moves in linkage; g indicates a transfer coefficient, and when the transfer coefficient is 0, the animation effect of the movement of the UI element that moves in linkage is the same as the animation effect of the movement of the dragged UI element; and constants in the equation (6) are merely examples, and may be configured by an electronic device or a user.

When a curve of movement displacement of a UI element varying with time is an elastic force curve, animation effect of movement may be controlled by a damping coefficient and/or an elasticity coefficient. Therefore, x may be determined based on at least one of the damping coefficient and the elasticity coefficient.

For example, x may be a ratio of an elasticity coefficient of the dragged UI element to a damping coefficient of the dragged UI element. In this case, the ratio of the elasticity coefficient of the dragged UI element to the damping coefficient of the dragged UI element is transferred, based on the distance n, to the UI element that moves in linkage, to obtain a ratio $x^n$ of an elasticity coefficient of the UI element that moves in linkage to a damping coefficient of the UI element that moves in linkage. Therefore, the animation effect of the movement of the dragged UI element may be transferred, based on the distance, to the UI element that moves in linkage. A larger ratio of an elasticity coefficient to a damping coefficient indicates weaker association between movement of UI elements, and a larger difference between spring characteristics and movement of UI elements. This may be considered that a spring is "excessively soft". On the contrary, a smaller ratio of an elasticity coefficient to a damping coefficient indicates stronger association between movement of UI elements, and a smaller difference between spring characteristics and movement of UI elements. This may be considered that a spring is "excessively rigid".

It should be understood that, that x indicates the ratio of the elasticity coefficient of the dragged UI element to the damping coefficient of the dragged UI element is merely an example. x can be any appropriate factor. In another example, x may be the elasticity coefficient of the dragged UI element. In still another example, x may alternatively be the damping coefficient of the dragged UI element.

In addition, although the elastic force curve is described in detail above, animation effect of movement of a UI element may conform to any appropriate predetermined curve, for example, Bezier curve. Depending on an order of the Bezier curve, the Bezier curve may have a control point corresponding to the order. For example, when a second-order Bezier curve is used, the Bezier curve may have two control points. Similarly, when a first-order Bezier curve is used, the Bezier curve may have one control point, and when a third-order Bezier curve is used, the Bezier curve may have three control points, and so on. When a curve of a movement displacement of a UI element varying with time is a Bezier curve, animation effect of movement may be controlled based on coordinates of at least one of at least one control point of the Bezier curve. For example, when a second-order Bezier curve is used, one or both of two control points of the second-order Bezier curve may be used to control the animation effect of movement. Therefore, x may be determined based on the coordinates of the at least one of the at least one control point.

The nonlinear transfer is described in detail above. In the case of linear transfer, the animation effect of the movement of the UI element that moves in linkage may be determined by using the following equation (7):

$$x^n = x - g \times n, \qquad (7)$$

$x^n$ indicates the animation effect of the movement of the UI element that moves in linkage; x indicates the animation effect of the movement of the dragged UI element; n indicates the distance between the dragged UI element and the UI element that moves in linkage; and g indicates a transfer coefficient, and when the transfer coefficient is 0, the animation effect of the movement of the UI element that moves in linkage is the same as the animation effect of the movement of the dragged UI element.

Similar to the nonlinear transfer, when a curve of movement displacement of a UI element varying with time is an elastic force curve, animation effect of movement may be controlled by a damping coefficient and/or an elasticity coefficient. Therefore, x may be determined based on at least one of the damping coefficient and the elasticity coefficient. When a curve of a movement displacement of a UI element varying with time is a Bezier curve, animation effect of movement may be controlled based on coordinates of at least one of at least one control point of the Bezier curve. Therefore, x may be determined based on the coordinates of the at least one of the at least one control point.

A principle of drag linkage is described in detail above. The following further describes a process of controlling, according to the principle of drag linkage, a UI element to perform linkage movement.

Figure 8:
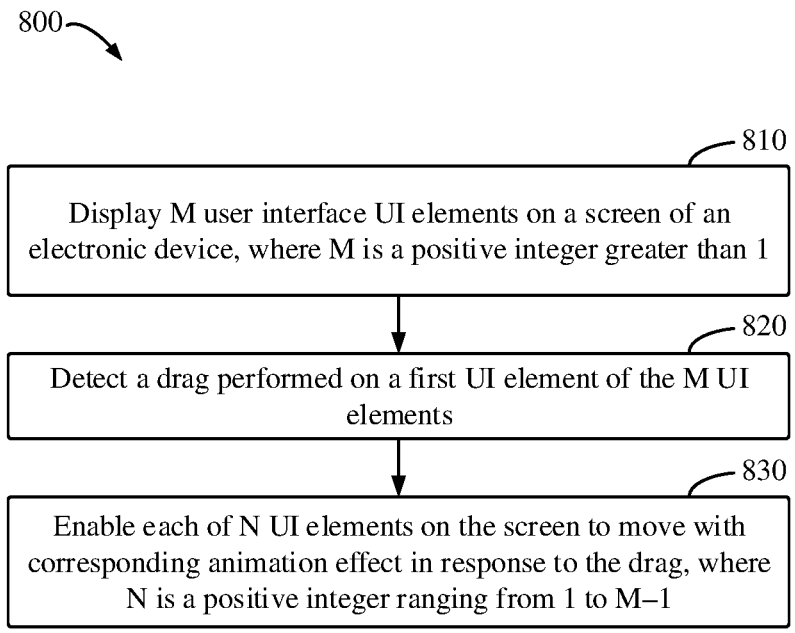
FIG. 8 is a flowchart of a graphical interface display method according to an embodiment of this disclosure.

FIG. 8 is a flowchart of a graphical interface display method 800 according to an embodiment of this disclosure. It should be understood that the method 800 may be performed by the electronic device 100 described with reference to FIG. 1 or the electronic device 200 described with reference to FIG. 2. The method 800 is described herein with reference to the UI 300A in FIG. 3A. However, it should be understood that the UI 300A is merely an example, and the method 800 is applicable to any appropriate interface, including but not limited to the UIs 300B and 300C.

Figure 9:
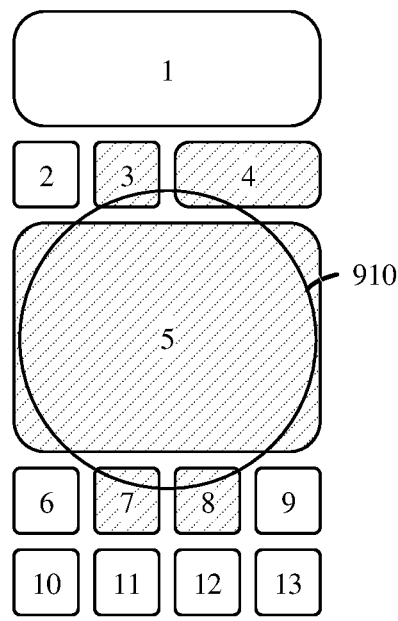
FIG. 9 is a schematic diagram of an example affected region of a UI element according to an embodiment of this disclosure.

At a block 810, M user interface UI elements are displayed on a screen of the electronic device. M is a positive integer greater than 1. For example, as shown in FIG. 9, the M UI elements may be UI elements 1 to 13.

At a block 820, a drag performed on a first UI element of the M UI elements is detected. For example, the first UI element may be the UI element 5. The drag performed on the first UI element enables the first UI element to move with specific animation effect, to present drag effect.

At a block 830, in response to the drag performed on the first UI element, each of the N UI elements on the screen is enabled to move with corresponding animation effect. N is a positive integer ranging from 1 to M−1. Therefore, a linkage drag is visually indicated.

In some embodiments, the drag linkage may be applied to all UI elements on the screen. In this case, it may be determined that M−1 UI elements of the M UI elements other than the first UI element are the N UI elements. Alternatively, the drag linkage may be applied only to some UI elements on the screen. In this case, an affected region of the first UI element may be determined based on a size of the first UI element, and it is determined that a UI element, in the affected region, of the M UI elements is the N UI elements. For example, a larger size of the first UI element may indicate a larger affected region of the first UI element. Alternatively, the affected region may alternatively be narrowed with the size, and this disclosure is not limited herein. For example, the affected region may be a circle that uses a reference point of the first UI element as a center and that has a predetermined radius. It should be understood that the affected region may be any appropriate region in any shape, for example, a rectangular shape or a rhombic shape with a predetermined size. The affected region may be configured by an electronic device and a user, and this disclosure is not limited herein.

In addition, in some embodiments, a UI element that intersects the affected region may be considered to be within the affected region. Alternatively, when the affected region is a circle with a predetermined radius, if a distance between a UI element and the first UI element is less than the predetermined radius of the affected region, the UI element may be considered to be within the affected region.

FIG. 9 is a schematic diagram of an example affected region of a UI element according to an embodiment of this disclosure. As shown in FIG. 9, because the UI elements 3, 4, 7, and 8 are in an affected region 910 of the UI element 5, the UI elements 3, 4, 7, and 8 move in linkage with the UI element 5. In addition, because the UI elements 1, 2, 6, and 9 to 13 are not in the affected region 910 of the UI element 5, the UI elements 1, 2, 6, and 9 to 13 do not move in linkage with the UI element 5.

Still as shown in FIG. 8, to enable the N UI elements to move with corresponding animation effect, a distance between the first UI element and each of the N UI elements may be determined. How to determine a distance between the first UI element and a second UI element of the N UI elements is described below.

In some embodiments, distances may be classified into a plurality of distance levels based on ranges to which the distances belong. For example, a UI element on which an operation is performed may belong to a distance level 0; UI elements of UI elements in linkage may belong to distance levels 1, 2, 3, . . . , based on corresponding distances between the UI elements and the UI element on which the operation is performed; and UI elements belonging to a same distance level may be considered as having a same distance. Therefore, linkage between UI elements can be simplified based on a distance level, so that UI elements belonging to a same distance level are linked in a same manner, to improve uniformity and coordination of linkage. However, it should be understood that a distance may alternatively be used in linkage, so that UI elements are more precisely linked. A distance level may be interchangeably referred to as a distance.

Figure 10:
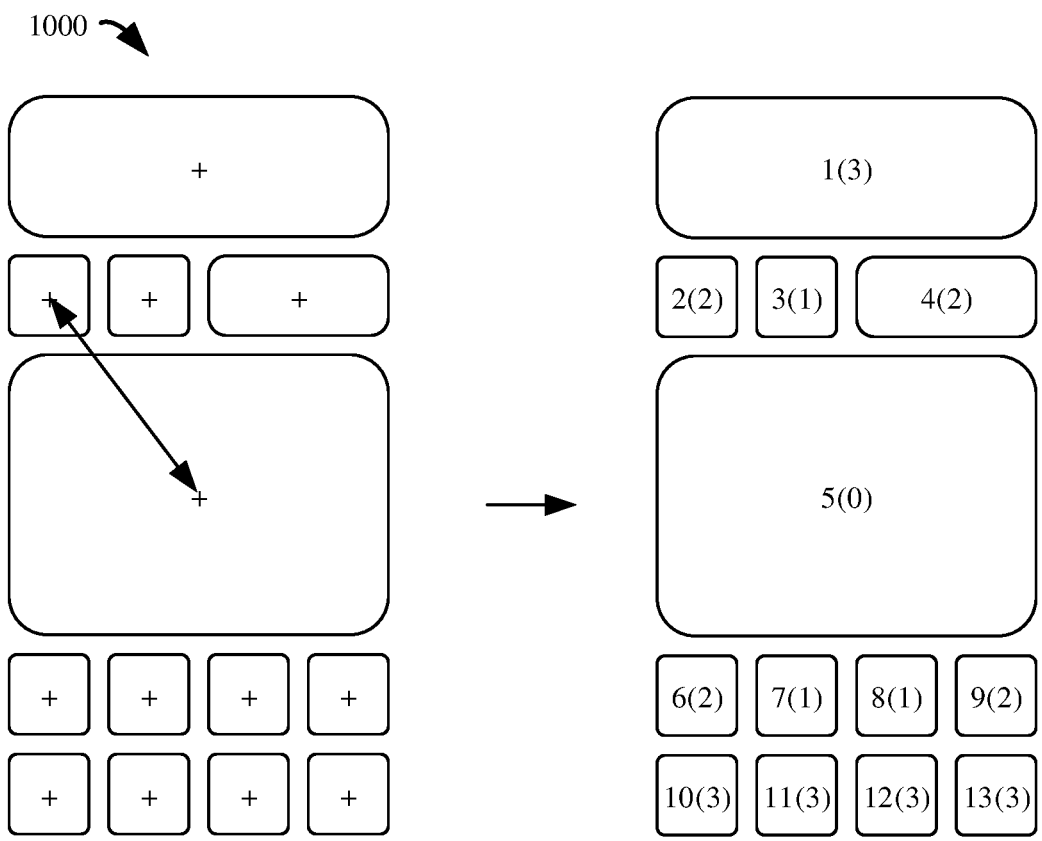
FIG. 10 is a schematic diagram of an example of determining a distance according to an embodiment of this disclosure.

FIG. 10 is a schematic diagram of an example 1000 of determining a distance according to an embodiment of this disclosure. As shown in FIG. 10, in some embodiments, a first reference point of the first UI element (for example, the UI element 5) and a second reference point of the second UI element (for example, the UI element 2) may be determined. In FIG. 10, a reference point of each UI element is indicated by "+". In some embodiments, it may be determined that a center point of a UI element is a reference point of the UI element. Alternatively, a reference point of a UI element may be configured by an electronic device or a user, so that a position of the reference point can be any appropriate position. This disclosure is not limited herein. Therefore, it may be determined that a distance between the first reference point and the second reference point is a distance between the first UI element and the second UI element.

For example, it is assumed that position coordinates of the first reference point on the screen are (x0, y0), and position coordinates of the second reference point on the screen are (x1, y1). In this case, the distance may be determined by using the following equation (8):

$$n = \sqrt{(x1 - x0)^2 + (y1 - y0)^2}, \qquad (8)$$

n indicates the distance, x0 indicates a horizontal coordinate of the first reference point, y0 indicates a vertical coordinate of the first reference point, x1 indicates a horizontal coordinate of the second reference point, and y1 indicates a vertical coordinate of the second reference point.

As shown in FIG. 10, distances, determined in the foregoing manner, between the UI element 5 and other UI elements are as follows: A distance between the UI element 5 and the UI element 5 is 0, distances between the UI element 5 and the UI elements 3, 7, and 8 are 1, distances between the UI element 5 and the UI elements 2, 4, 6, and 9 are 2, and distances between the UI element 5 and the UI elements 1 and 10 to 13 are 3.

Figure 11A:
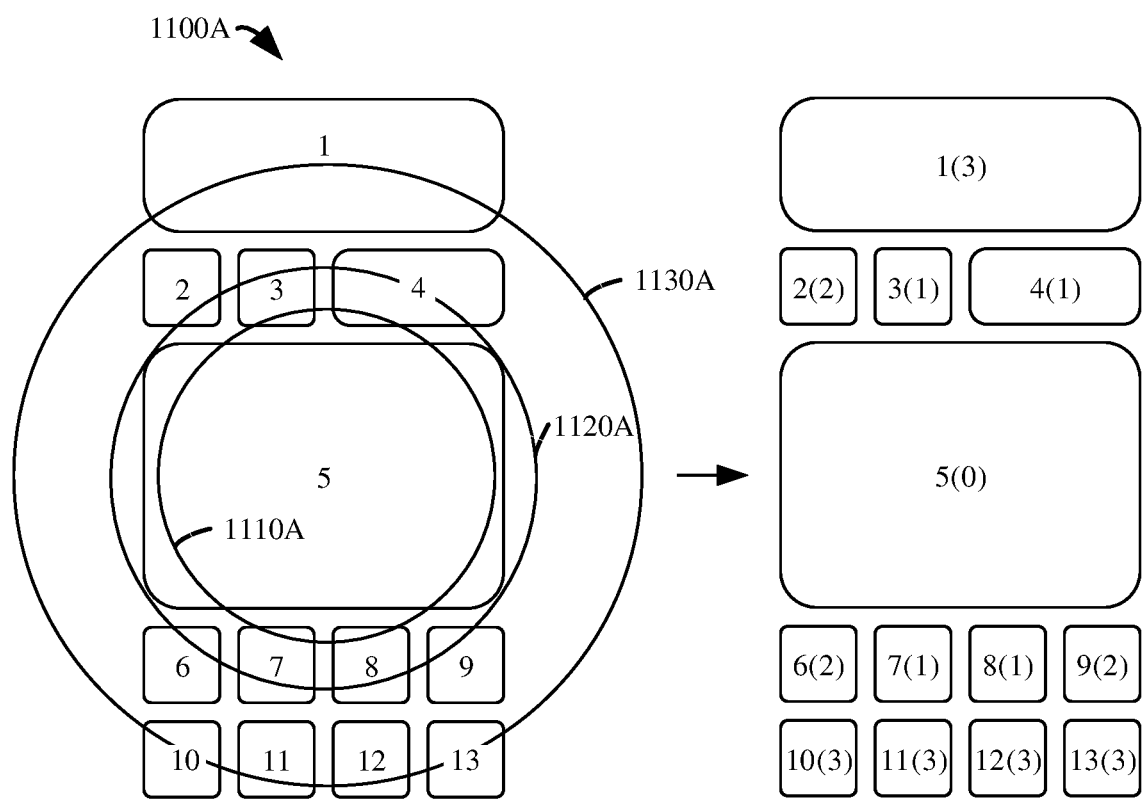
FIG. 11A to FIG. 11C are schematic diagrams of examples of determining a distance according to an embodiment of this disclosure.
Figure 11B:
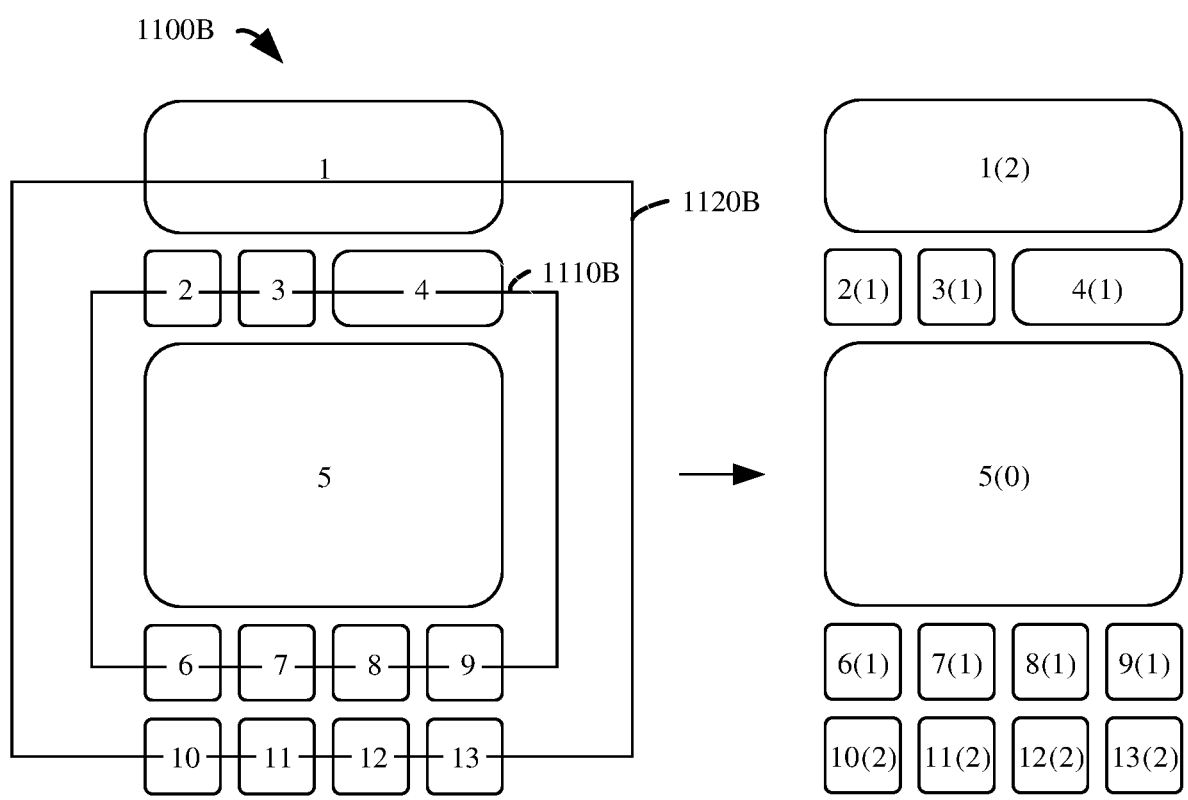
Figure 11C:
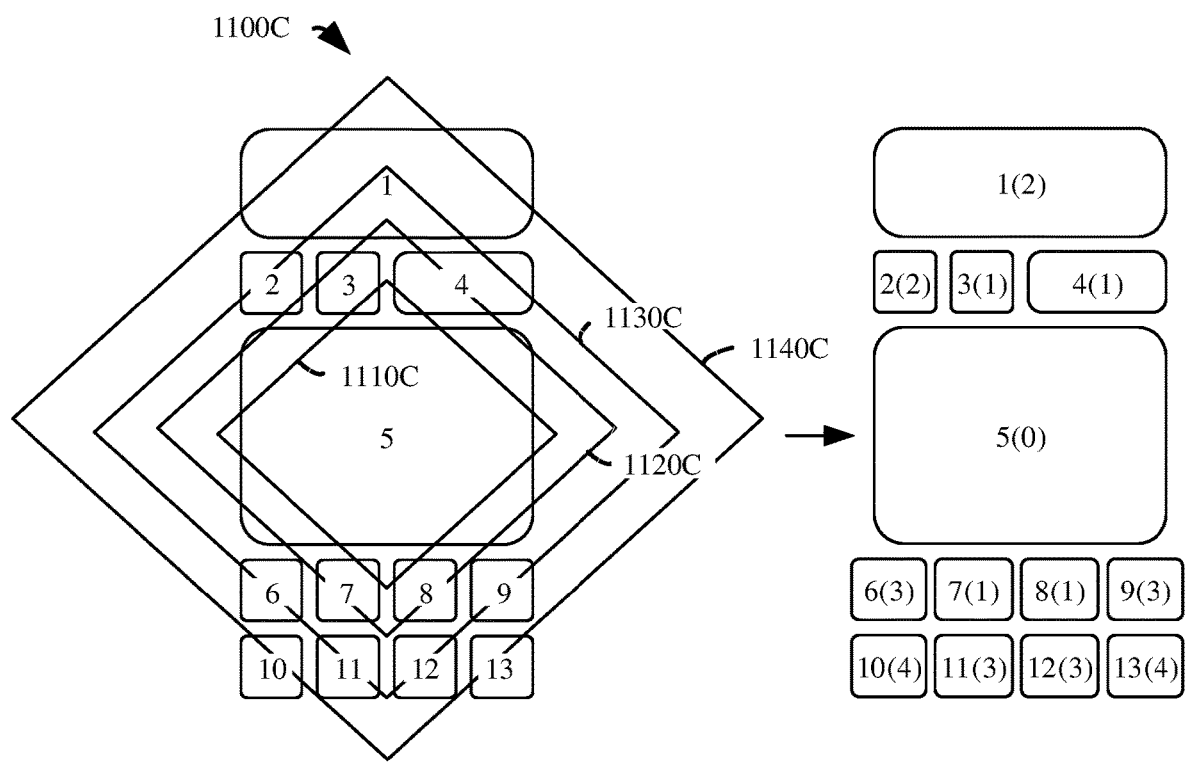

FIG. 11A to FIG. 11C are schematic diagrams of examples 1000A to 1100C of determining a distance according to an embodiment of this disclosure. As shown in FIG. 11A, in some embodiments, a first reference point of the first UI element may be determined. A plurality of circles with respective radii, for example, circles 1110A to 1130A, may be determined by using the first reference point as a circle center. It should be understood that, in addition to the circles, any other appropriate shapes with respective sizes, such as rectangles or rhombuses, may be determined by using the first reference point as a center. This disclosure is not limited herein.

For example, as shown in FIG. 11B, in some embodiments, a first reference point of the first UI element may be determined. A plurality of rectangles with respective sizes, such as rectangles 1110B and 1120B, may be determined by using the first reference point as a center. In addition, as shown in FIG. 11C, in some embodiments, a first reference point of the first UI element may be determined. A plurality of rhombuses with respective sizes, such as rectangles 1110C to 1140C, may be determined by using the first reference point as a center.

In some embodiments, the radii of the plurality of circles may be predetermined sizes or may increase proportionally. Alternatively, the radii of the plurality of circles may be configured by an electronic device or a user, and this disclosure is not limited herein.

Therefore, a circle that intersects the second UI element may be determined from the plurality of circles. Therefore, it may be determined that a radius of the intersecting circle is the distance. In some embodiments, if more than one circle intersects the second UI element, a target circle that intersects the second UI element and that has a smallest radius may be determined from the circles. Further, in some embodiments, if no circle intersects the second UI element, it may be determined that a circle closest to the second UI element is a target circle. Therefore, it may be determined that a radius of the target circle is the distance.

As shown in FIG. 11A, distances, determined in the foregoing manner, between the UI element 5 and other UI elements are as follows: A distance between the UI element 5 and the UI element 5 is 0. Because a circle that intersects the UI elements 3, 4, 7, and 8 and that has a smallest radius is the circle 1110A, distances between the UI elements 3, 4, 7, and 8 and the UI element 5 are 1. Because the circle 1120A intersects the UI elements 2, 6, and 9, distances between the UI elements 2, 6, and 9 and the UI element 5 are 2. In addition, because the circle 1130A intersects the UI elements 1 and 10 to 13, distances between the UI elements 1 and 10 to 13 and the UI element 5 are 3.

Figure 12:
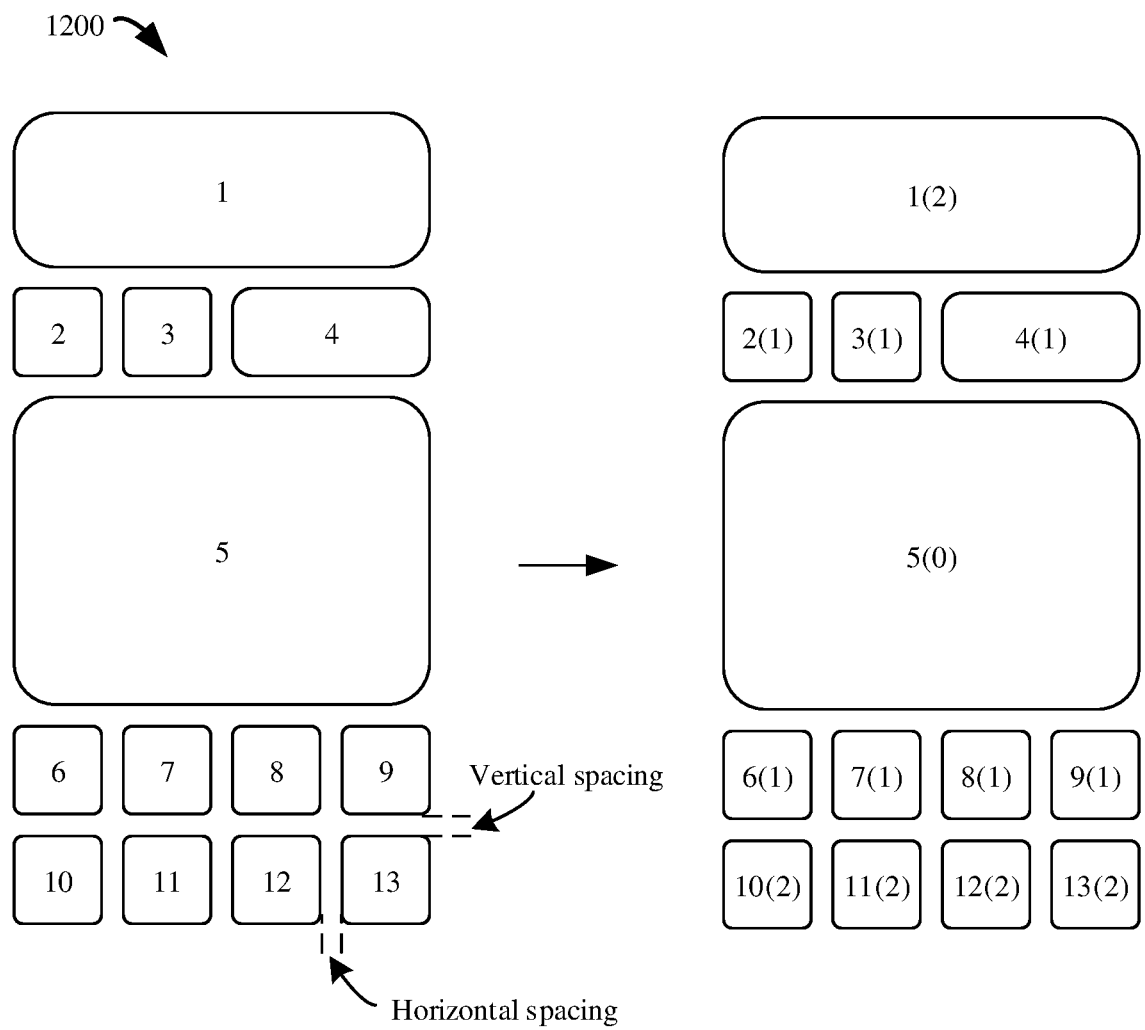
FIG. 12 is a schematic diagram of an example of determining a distance according to an embodiment of this disclosure.

FIG. 12 is a schematic diagram of an example 1200 of determining a distance according to an embodiment of this disclosure. As shown in FIG. 12, in some embodiments, a horizontal spacing between the first UI element and the second UI element and/or a vertical spacing between the first UI element and the second UI element may be determined. In some embodiments, the horizontal spacing may represent a sum of lengths of one or more horizontal spacings between the first UI element and the second UI element. The horizontal spacing may represent a spacing between vertical boundaries of two UI elements on the screen. Similar to the horizontal spacing, the vertical spacing may represent a sum of lengths of one or more vertical spacings between the first UI element and the second UI element. The vertical spacing may represent a spacing between horizontal boundaries of two UI elements on the screen. In the case of an irregular layout, lengths of a horizontal spacing and a vertical spacing between UI elements may be irregular. In addition, the lengths of the horizontal spacing and the vertical spacing between UI elements may be configured by an electronic device or a user.

Therefore, the distance may be determined based on the horizontal spacing and/or the vertical spacing. For example, there are two vertical spacings between the UI element 5 and the UI element 13. Therefore, a distance between the UI element 5 and the UI element 13 may be a sum of lengths of the two vertical spacings. In another example, there is one horizontal spacing between the UI element 12 and the UI element 13. Therefore, a distance between the UI element 12 and the UI element 13 may be a length of the horizontal spacing.

As shown in FIG. 12, distances, determined in the foregoing manner, between the UI element 5 and other UI elements are as follows: A distance between the UI element 5 and the UI element 5 is 0, distances between the UI element 5 and the UI elements 2 to 4 and 6 to 9 are 1, and distances between the UI element 5 and the UI elements 1 and 10 to 13 are 2.

Figure 13:
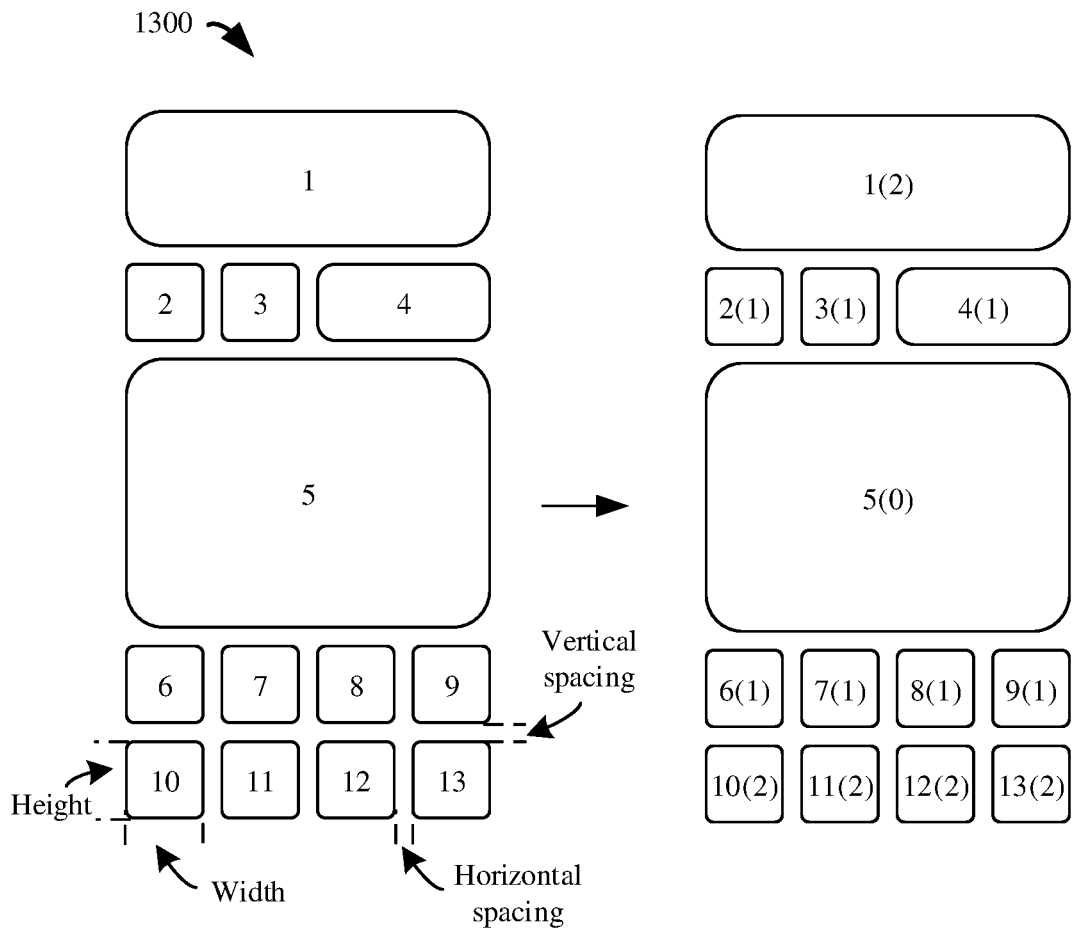
FIG. 13 is a schematic diagram of an example of determining a distance according to an embodiment of this disclosure.

FIG. 13 is a schematic diagram of an example 1300 of determining a distance according to an embodiment of this disclosure. In some embodiments, different from FIG. 12 in which only a middle spacing (for example, a horizontal spacing and a vertical spacing) between UI elements is considered in a horizontal spacing and a vertical spacing, a size of a middle UI element between UI elements may be further considered in a horizontal spacing and a vertical spacing. As shown in FIG. 13, the horizontal spacing may represent a sum of a length of one or more horizontal spacings between the first UI element and the second UI element and a width of one or more middle UI elements. The vertical spacing may represent a sum of a length of one or more vertical spacings between the first UI element and the second UI element and a height of one or more middle UI elements.

Therefore, the distance may be determined based on the horizontal spacing and/or the vertical spacing. For example, there are two vertical spacings and one middle UI element 9 between the UI element 5 and the UI element 13. Therefore, a distance between the UI element 5 and the UI element 13 may be a sum of lengths of the two vertical spacings and a height of the UI element 9. In another example, there is one horizontal spacing and one middle UI element 12 between the UI element 11 and the UI element 13. Therefore, a distance between the UI element 11 and the UI element 13 may be a sum of a length of the horizontal spacing and a width of the UI element 12. In addition, there is one vertical spacing between the UI element 3 and the UI element 5. Therefore, a distance between the UI element 3 and the UI element 5 is a length of the vertical spacing. There are three vertical spacings and two middle UI elements 5 and 7 between the UI element 3 and the UI element 11. Therefore, a distance between the UI element 3 and the UI element 11 is a sum of lengths of the three vertical spacings and heights of the two middle UI elements 5 and 7. There is one horizontal spacing between the UI element 3 and the UI element 2. Therefore, a distance between the UI element 3 and the UI element 2 is a length of the horizontal spacing.

As shown in FIG. 13, distances, determined in the foregoing manner, between the UI element 5 and other UI elements are as follows: A distance between the UI element 5 and the UI element 5 is 0, distances between the UI element 5 and the UI elements 2 to 4 and 6 to 9 are 1, and distances between the UI elements 1 and 10 to 13 and the UI element 5 are 2.

Figure 14A:
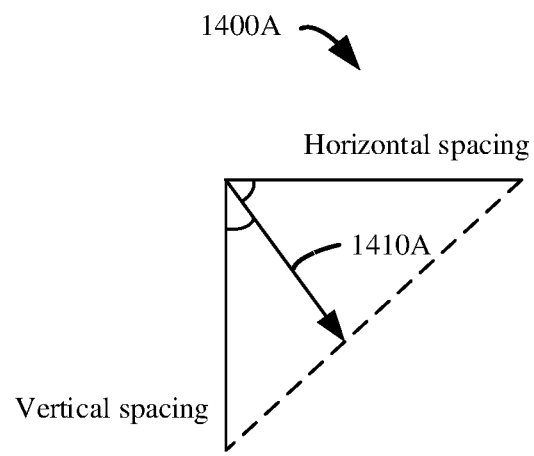
FIG. 14A and FIG. 14B are schematic diagrams of examples of determining a distance according to an embodiment of this disclosure.
Figure 14B:
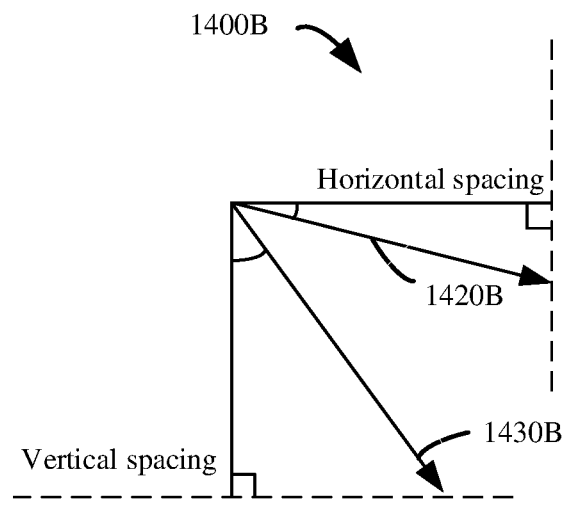

FIG. 14A and FIG. 14B are schematic diagrams of examples 1400A and 1400B of determining a distance according to an embodiment of this disclosure. In some embodiments, in addition to lengths of a horizontal spacing and a vertical spacing and a width and a height of a middle UI element, an operation direction may be further considered in a horizontal spacing and a vertical spacing. For example, when the first UI element is dragged, an operation direction may be a direction in which the first UI element is dragged. In addition, although a drag linkage scenario is described herein, there are also a depth linkage scenario and a pressure linkage scenario, as described below. In the depth linkage scenario and the pressure linkage scenario, a distance determining manner in which an operation direction is considered may also be used. Specifically, in the depth linkage scenario and the pressure linkage scenario, a UI element may be touched. When the first UI element is touched, although there is no operation direction, a direction from the second UI element to the first UI element (for example, a direction from a second reference point to a first reference point) may be considered as an operation direction, so that the operation direction is considered in a horizontal spacing and a vertical spacing.

In this case, a horizontal spacing and/or a vertical spacing may be first determined according to the distance determining manners described with reference to FIG. 12 and FIG. 13. Then an included angle between an operation direction and a horizontal direction and/or a vertical direction may be determined. Therefore, a distance in the operation direction may be determined by using a trigonometric function principle.

In some embodiments, as shown in FIG. 14A, because a horizontal spacing, a vertical spacing, and an included angle between an operation direction 1410A and a horizontal direction or a vertical direction are known, a distance in the operation direction 1410A may be determined by using the trigonometric function principle.

Alternatively, one of a horizontal direction and a vertical direction that is closer to an operation direction may be selected as a reference direction based on included angles between the operation direction and the horizontal direction and the vertical direction, to determine a distance in the operation direction. For example, as shown in FIG. 14B, because an operation direction 1430B is closer to a vertical direction, the vertical direction may be selected as a reference direction, and a distance in the operation direction 1430B is determined by using the trigonometric function principle based on a vertical spacing and an included angle between the operation direction 1430B and the vertical direction. In another example, because an operation direction 1420B is closer to a horizontal direction, a distance in the operation direction 1420B may be determined by using the trigonometric function principle based on a horizontal spacing and an included angle between the operation direction 1420B and the horizontal direction. In addition, the reference direction may be configured by an electronic device or a user, and this disclosure is not limited herein. For example, the reference direction may be set to a horizontal direction, a vertical direction, or any other appropriate direction.

In the foregoing descriptions, a distance in an operation direction is determined based on a horizontal spacing and a vertical spacing. However, as described above, the horizontal spacing and the vertical spacing may be determined based on a middle spacing and a size of a middle UI element. Therefore, the distance in the operation direction may alternatively be determined by segment based on each middle spacing and middle UI element. Specifically, for each middle spacing and middle UI element, a size of the middle spacing or the middle UI element, and an included angle between an operation direction and a horizontal direction or a vertical direction may be determined. Therefore, the distance in the operation direction may be determined by using the trigonometric function principle. Then distances in the operation direction that are determined based on all middle spacings and middle UI elements may be summed to determine a total distance in the operation direction.

Still as shown in FIG. 8, after the distance between the first UI element and the second UI element is determined, animation effect of movement of the second UI element may be determined based on the distance. Therefore, in some embodiments, first animation effect of movement of the first UI element in response to a drag may be determined. As described above, in some embodiments, the first animation effect of movement of the first UI element may be controlled by a predefined curve of a displacement varying with time. For example, the predefined curve may be a Bezier curve or an elastic force curve.

Therefore, animation effect of movement of the second UI element in response to the drag may be determined based on the first animation effect and the distance between the first UI element and the second UI element. In some embodiments, when the first animation effect of movement of the first UI element is controlled by the predefined curve of a displacement varying with time, a curve of a displacement of the second UI element varying with time may be determined based on the predefined curve of a displacement of the first UI element varying with time. For example, when the elastic force curve is used, a damping coefficient and/or an elasticity coefficient of a spring may be transferred based on a distance. When the Bezier curve is used, coordinates of at least one of at least one control point of the Bezier curve may be transferred based on a distance. How to transfer the animation effect of the first UI element to the second UI element to obtain the animation effect of the second UI element may be implemented in the transfer manner described in detail above. Therefore, descriptions thereof are omitted herein.

In this manner, because the animation effect of the movement of the second UI element is determined based on the animation effect of the movement of the first UI element and the distance between the second UI element and the first UI element, clear and natural drag linkage that conforms to a use habit of a user can be implemented.

In addition, in some embodiments, a size of the second UI element may also affect the animation effect of the movement of the second UI element. In this case, the size of the second UI element may also be considered to determine the animation effect of the second UI element. For example, a larger size of the second UI element may indicate smaller impact of the linkage on the second UI element. Therefore, the animation effect of the movement of the second UI element may be inversely proportional to the size of the second UI element. Therefore, in some embodiments, the animation effect of the movement of the second UI element may be determined based on a first range, the distance, and the size of the second UI element.

In addition, in some embodiments, the size of the first UI element may also affect the animation effect of the movement of the second UI element. In this case, the size of the first UI element may also be considered to determine the animation effect of the second UI element. For example, a larger size of the first UI element indicates larger linkage impact that may be generated by the first UI element. Therefore, the animation effect of the movement of the second UI element may be directly proportional to the size of the first UI element. Therefore, in some embodiments, the animation effect of the movement of the second UI element may be determined based on the first range, the distance, and the size of the first UI element.

Further, as described above, both the size of the first UI element and the size of the second UI element may affect the animation effect of the movement of the second UI element. Therefore, in some embodiments, the animation effect of the movement of the second UI element may be determined based on the first range, the distance, the size of the first UI element, and the size of the second UI element.

Still as shown in FIG. 8, after the animation effect of the movement of the second UI element is determined, the second UI element may be enabled to move with the animation effect, to visually indicate movement of the second UI element along with the first UI element. The N UI elements may move with respective animation effect, to visually indicate a drag on the entire screen or in some regions of the screen, and present drag linkage.

In some embodiments, a moving direction of a UI element that moves in linkage may be associated with a drag direction, to visually indicate a drag action. Therefore, in some embodiments, a drag direction may be determined, and the second UI element may move with animation effect in association with the determined direction.

In addition, in some embodiments, to better present transfer of animation effect and improve user experience, the first UI element and the second UI element do not start to move at the same time. For example, the first UI element may start to move when the drag occurs, and the second UI element may start to move after the drag occurs for a period of time. Therefore, in some embodiments, delay time may be determined based on the distance between the first UI element and the second UI element, and the second UI element is enabled to move in response to that the delay time elapses after the drag occurs. Further, in some embodiments, a delay coefficient may be determined, and delay time is determined based on the distance and the delay coefficient. For example, the delay time may be a quotient obtained by dividing the distance by the delay coefficient. The delay coefficient may be configured by an electronic device or a user.

Figure 15:
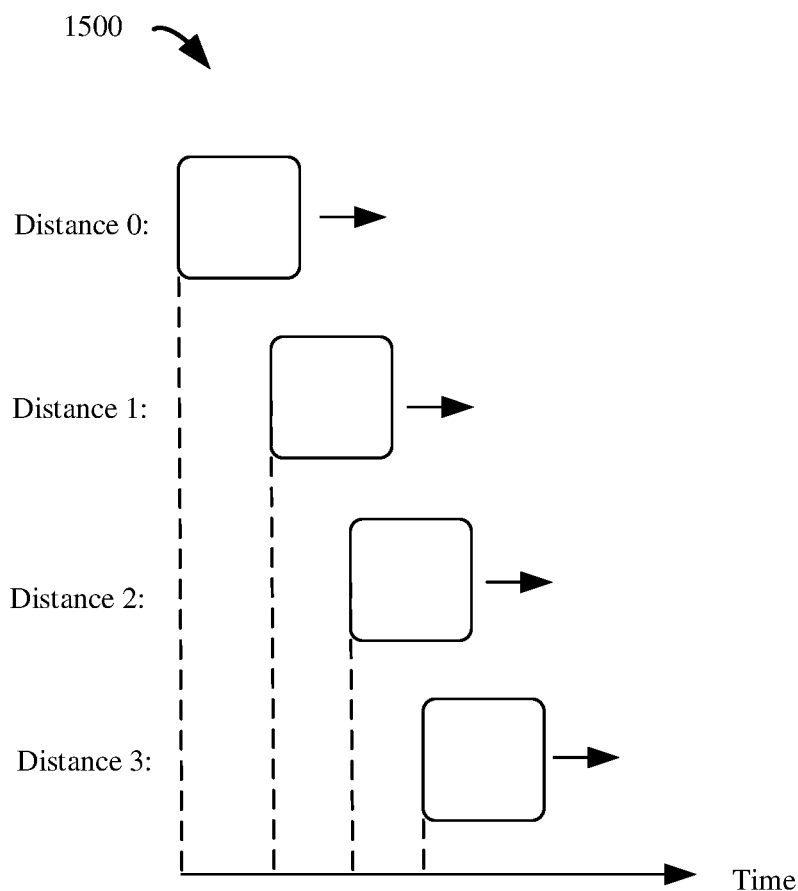
FIG. 15 is a schematic diagram of example delay time according to an embodiment of this disclosure.

FIG. 15 is a schematic diagram of example delay time 1500 according to an embodiment of this disclosure. As shown in FIG. 15, the first UI element (for example, the UI element 5) starts to move when a drag occurs, a UI element (for example, the UI elements 3, 4, 7, and 8) at a distance of 1 moves later than the first UI element, a UI element (for example, the UI elements 2, 6, and 9) at a distance of 2 moves later than the UI element at a distance of 1, and a UI element (for example, the UI elements 1 and 10 to 13) at a distance of 3 moves later than the UI element at a distance of 2.

In this manner, association between animation effect of different UI elements can be strengthened, and a relationship between independent UI elements can be highlighted. Compared with a conventional animation in which animation effect is simple and each UI element is independent without association, in embodiments of this disclosure, animation effect can better conform to a physical rule, and a real use scenario and a use habit of a user are considered, so that user experience can be significantly improved.

A process of implementing drag linkage is described in detail above. The following further describes drag linkage in different scenarios. The scenarios include: a scenario in which a UI element moves completely along with a hand, a scenario in which a UI element does not move completely along with a hand, a scenario in which a UI element continues to move after a hand is released or flicked, and a scenario in which a UI element continues to move and rebounds after a hand is released or flicked. It should be understood that the scenarios may be combined with each other to obtain more abundant animation effect. For example, a UI element may not move completely along with a hand, and may continue to move after the hand is released or flickered. In another example, a UI element may not move completely along with a hand, and may continue to move and rebound after the hand is released or flickered. An example in which the UI element 5 is dragged and the UI elements 2 to 4 and 6 to 9 move in linkage is used below for description.

Figure 16A:
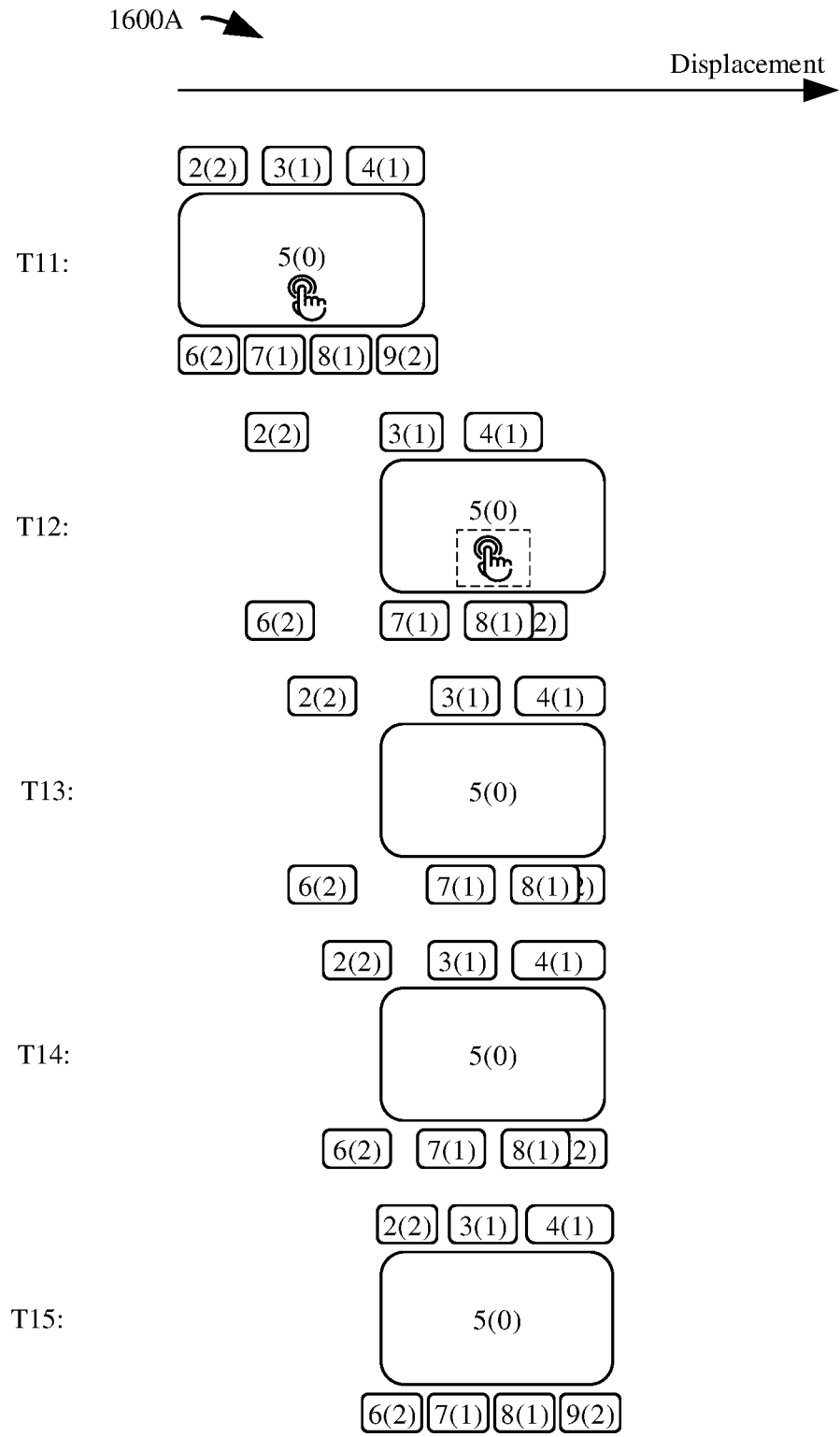
FIG. 16A is a schematic diagram of an example scenario in which a UI element moves completely along with a hand according to an embodiment of this disclosure.
Figure 16B:
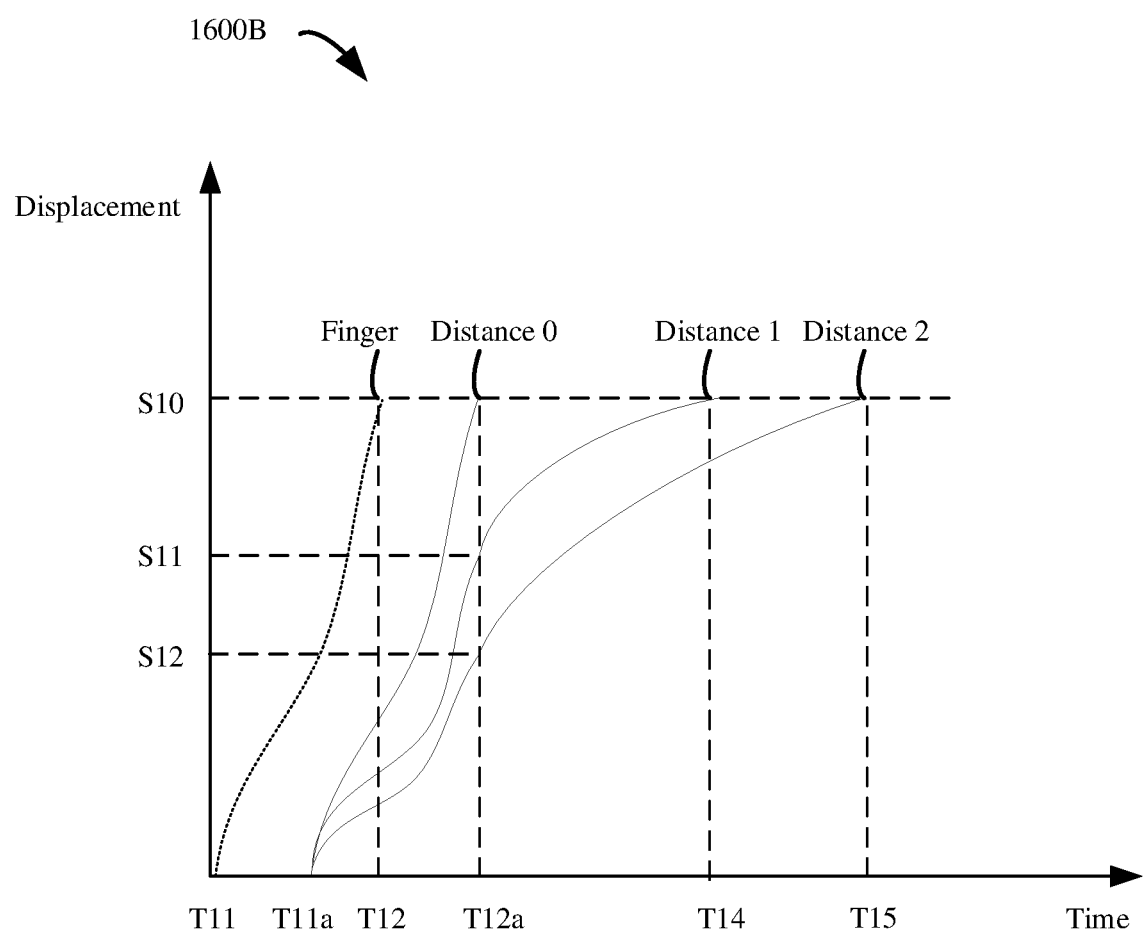
FIG. 16B is a schematic diagram of an example displacement-time curve in a scenario in which a UI element moves completely along with a hand according to an embodiment of this disclosure.

FIG. 16A is a schematic diagram of an example scenario 1600A in which a UI element moves completely along with a hand according to an embodiment of this disclosure. FIG. 16B is a schematic diagram of an example displacement-time curve 1600B in a scenario in which a UI element moves completely along with a hand according to an embodiment of this disclosure.

As shown in FIG. 16A and FIG. 16B, at T11, the UI element 5 is dragged. At T11a, the UI element 5 starts to move along with the drag by a hand. In some embodiments, if the UI element 5 starts to move when the drag occurs, T11a may be equal to T11. Alternatively, if the UI element 5 starts to move after the drag occurs, T11a may be greater than T11. In addition to the dragged UI element 5, other UI elements (for example, the UI elements 2 to 4 and 6 to 9) also move in linkage. It should be understood that, for clarity, the other UI elements are shown to start moving simultaneously the UI element 5. However, as described above, the other UI elements may start to move after respective delay time.

At T12, a user releases or flickers the hand. In this case, the drag on the UI element 5 ends. At T12a, the UI element 5 stops moving. In some embodiments, T12a may be equal to T12 if the UI element 5 stops moving when the hand is released or flickered. Alternatively, T12a may be greater than T12 if the UI element 5 stops moving after the hand is released or flickered. In this case, a displacement of the UI element 5 in a drag direction is S10. Displacements of the UI elements 3, 4, 7, and 8 at a distance of 1 in the drag direction are S11. Displacements of the UI elements 2, 6, and 9 at a distance of 2 in the drag direction are S12. The displacement S10 is greater than the displacement S11, and the displacement S11 is greater than the displacement S12. In this case, the UI element 5 stops moving, and the UI elements 3, 4, 7, and 8 at a distance of 1 and the UI elements 2, 6, and 9 at a distance of 2 continue to move with animation effect controlled by a predefined curve (for example, an elastic force curve).

At T13, spacings between the UI element 5 and the UI elements 3, 4, 7, and 8 at a distance of 1 in the drag direction decrease. In addition, spacings, in the drag direction, between the UI elements 3, 4, 7, and 8 at a distance of 1 and the UI element 9 at a distance of 2 in the drag direction decrease. In addition, spacings, in the drag direction, between the UI elements 3, 4, 7, and 8 at a distance of 1 and the UI elements 2 and 6 at a distance of 2 in a direction opposite to the drag direction increase.

At T14, a displacement of the UI element 5 in the drag direction remains at S10. The UI elements 3, 4, 7, and 8 at a distance of 1 move in the drag direction by the displacement S10, and then stop moving. Displacements of the UI elements 2, 6, and 9 at a distance of 2 in the drag direction have not reached S10, and the UI elements 2, 6, and 9 continue to move with animation effect controlled by a predefined curve. Compared with T13, spacings, in the drag direction, between the UI elements 3, 4, 7, and 8 at a distance of 1 and the UI element 9 at a distance of 2 in the drag direction increase. In addition, spacings, in the drag direction, between the UI elements 3, 4, 7, and 8 at a distance of 1 and the UI elements 2 and 6 at a distance of 2 in the direction opposite to the drag direction decrease.

At T15, displacements of the UI element 5 and the UI elements 3, 4, 7, and 8 at a distance of 1 in the drag direction remain at S10. The UI elements 2, 6, and 9 at a distance of 2 move in the drag direction by the displacement S10, and then stop moving. In this way, drag linkage is completed.

Figure 17A:
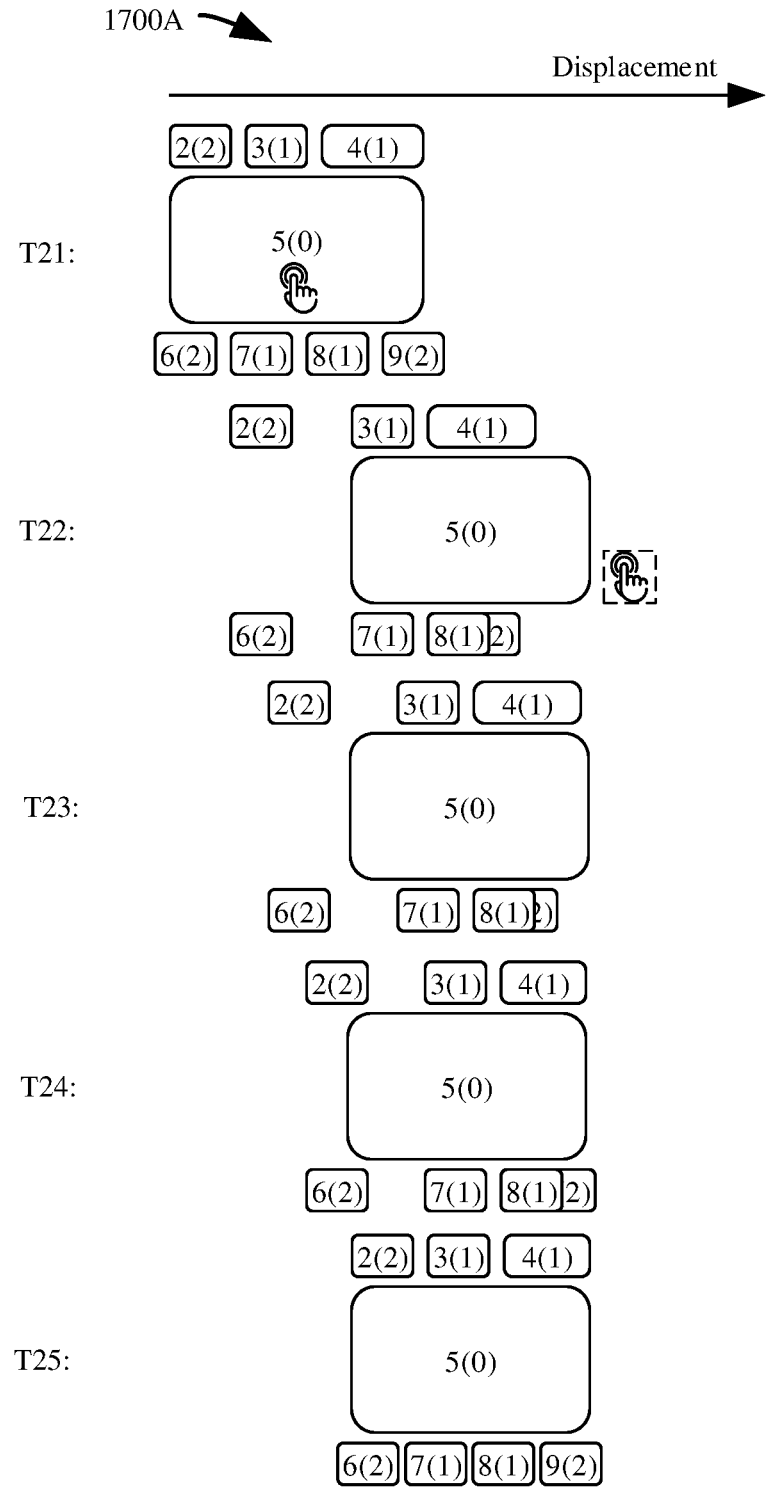
FIG. 17A is a schematic diagram of an example scenario in which a UI element does not move completely along with a hand according to an embodiment of this disclosure.
Figure 17B:
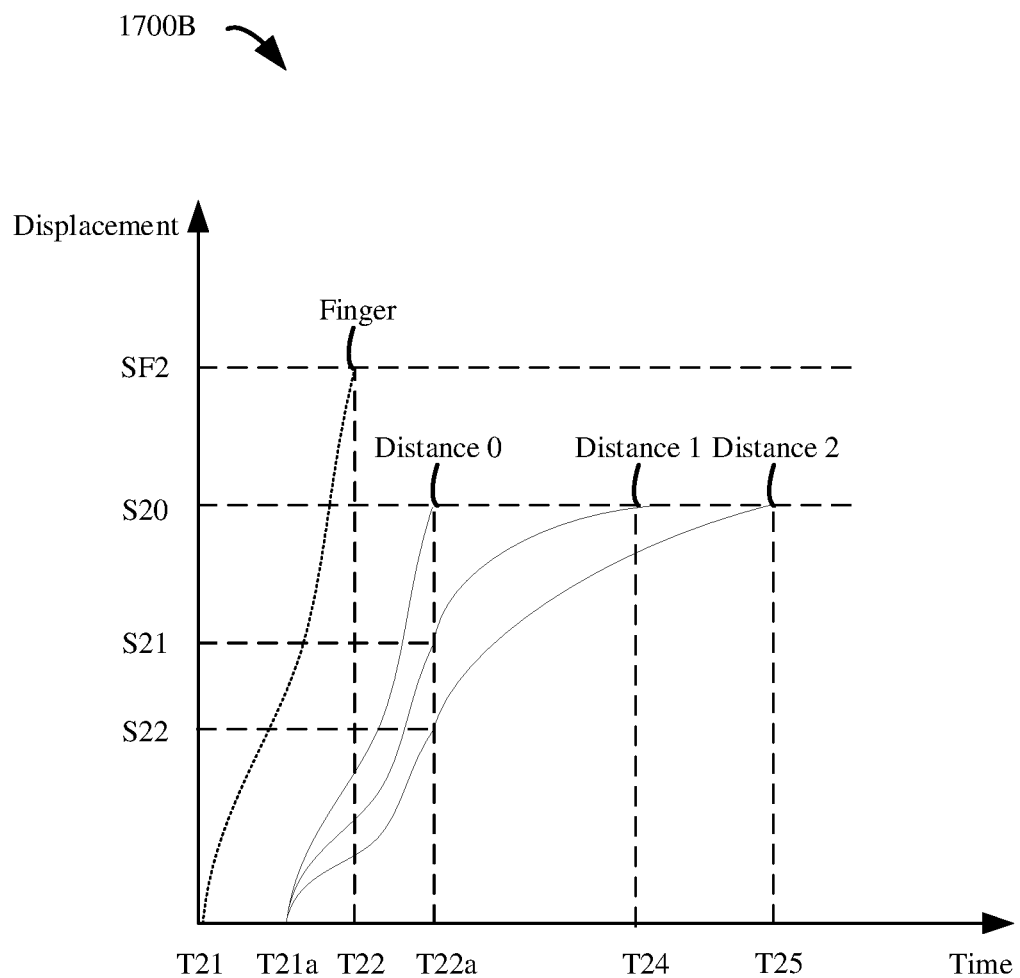
FIG. 17B is a schematic diagram of an example displacement-time curve in a scenario in which a UI element does not move completely along with a hand according to an embodiment of this disclosure.

FIG. 17A is a schematic diagram of an example scenario 1700A in which a UI element does not move completely along with a hand according to an embodiment of this disclosure. FIG. 17B is a schematic diagram of an example displacement-time curve 1700B in a scenario in which a UI element does not move completely along with a hand according to an embodiment of this disclosure.

As shown in FIG. 17A and FIG. 17B, at T21, the UI element 5 is dragged. At T21a, the UI element 5 starts to move along with the drag by a hand. In some embodiments, if the UI element 5 starts to move when the drag occurs, T21a may be equal to T21. Alternatively, if the UI element 5 starts to move after the drag occurs, T21a may be greater than T21. In addition to the dragged UI element 5, other UI elements (for example, the UI elements 2 to 4 and 6 to 9) also move in linkage. It should be understood that, for clarity, the other UI elements are shown to start moving simultaneously the UI element 5. However, as described above, the other UI elements may start to move after respective delay time.

At T22, a user releases or flickers the hand. In this case, the drag on the UI element 5 ends. At T22a, the UI element 5 stops moving. In some embodiments, T22a may be equal to T22 if the UI element 5 stops moving when the hand is released or flickered. Alternatively, T22a may be greater than T22 if the UI element 5 stops moving after the hand is released or flickered. In this case, a displacement of the hand in a drag direction is SF2. A displacement of the UI element 5 in the drag direction is S20. Displacements of the UI elements 3, 4, 7, and 8 at a distance of 1 in the drag direction are S21. Displacements of the UI elements 2, 6, and 9 at a distance of 2 in the drag direction are S22. The displacement SF2 is greater than the displacement S20, the displacement S20 is greater than the displacement S21, and the displacement S21 is greater than the displacement S22. In this case, the UI element 5 stops moving, and the UI elements 3, 4, 7, and 8 at a distance of 1 and the UI elements 2, 6, and 9 at a distance of 2 continue to move with animation effect controlled by a predefined curve (for example, an elastic force curve). Compared with T21, spacings between the UI element 5 and the UI elements 3, 4, 7, and 8 at a distance of 1 in the drag direction increase. Spacings, in the drag direction, between the UI elements 3, 4, 7, and 8 at a distance of 1 and the UI element 9 at a distance of 2 in the drag direction decrease. In addition, spacings, in the drag direction, between the UI elements 3, 4, 7, and 8 at a distance of 1 and the UI elements 2 and 6 at a distance of 2 in a direction opposite to the drag direction increase.

At T23, spacings between the UI element 5 and the UI elements 3, 4, 7, and 8 at a distance of 1 in the drag direction decrease. In addition, spacings, in the drag direction, between the UI elements 3, 4, 7, and 8 at a distance of 1 and the UI element 9 at a distance of 2 in the drag direction decrease. In addition, spacings, in the drag direction, between the UI elements 3, 4, 7, and 8 at a distance of 1 and the UI elements 2 and 6 at a distance of 2 in a direction opposite to the drag direction increase.

At T24, a displacement of the UI element 5 in the drag direction remains at S20. The UI elements 3, 4, 7, and 8 at a distance of 1 move in the drag direction by the displacement S20, and then stop moving. Displacements of the UI elements 2, 6, and 9 at a distance of 2 in the drag direction have not reached S20, and the UI elements 2, 6, and 9 continue to move with animation effect controlled by a predefined curve. Compared with T23, spacings, in the drag direction, between the UI elements 3, 4, 7, and 8 at a distance of 1 and the UI element 9 at a distance of 2 in the drag direction increase. In addition, spacings, in the drag direction, between the UI elements 3, 4, 7, and 8 at a distance of 1 and the UI elements 2 and 6 at a distance of 2 in the direction opposite to the drag direction decrease.

At T25, displacements of the UI element 5 and the UI elements 3, 4, 7, and 8 at a distance of 1 in the drag direction remain at S20. The UI elements 2, 6, and 9 at a distance of 2 move in the drag direction by the displacement S20, and then stop moving. In this way, drag linkage is completed.

In the scenario described with reference to FIG. 16A to FIG. 17B, after the drag stops, the UI element 5 stops moving. However, the UI element 5 may alternatively continue to move by a specific distance after the drag stops. In some embodiments, the distance may be determined based on the friction model, as described above. Whether the UI element 5 continues to move after the drag stops may be configured by an electronic device or a user. For example, if the electronic device is configured to allow the UI element 5 to continue to move after the hand is released or flickered, the UI element 5 may continue to move. Otherwise, the UI element 5 stops moving as the drag stops.

Figure 18A:
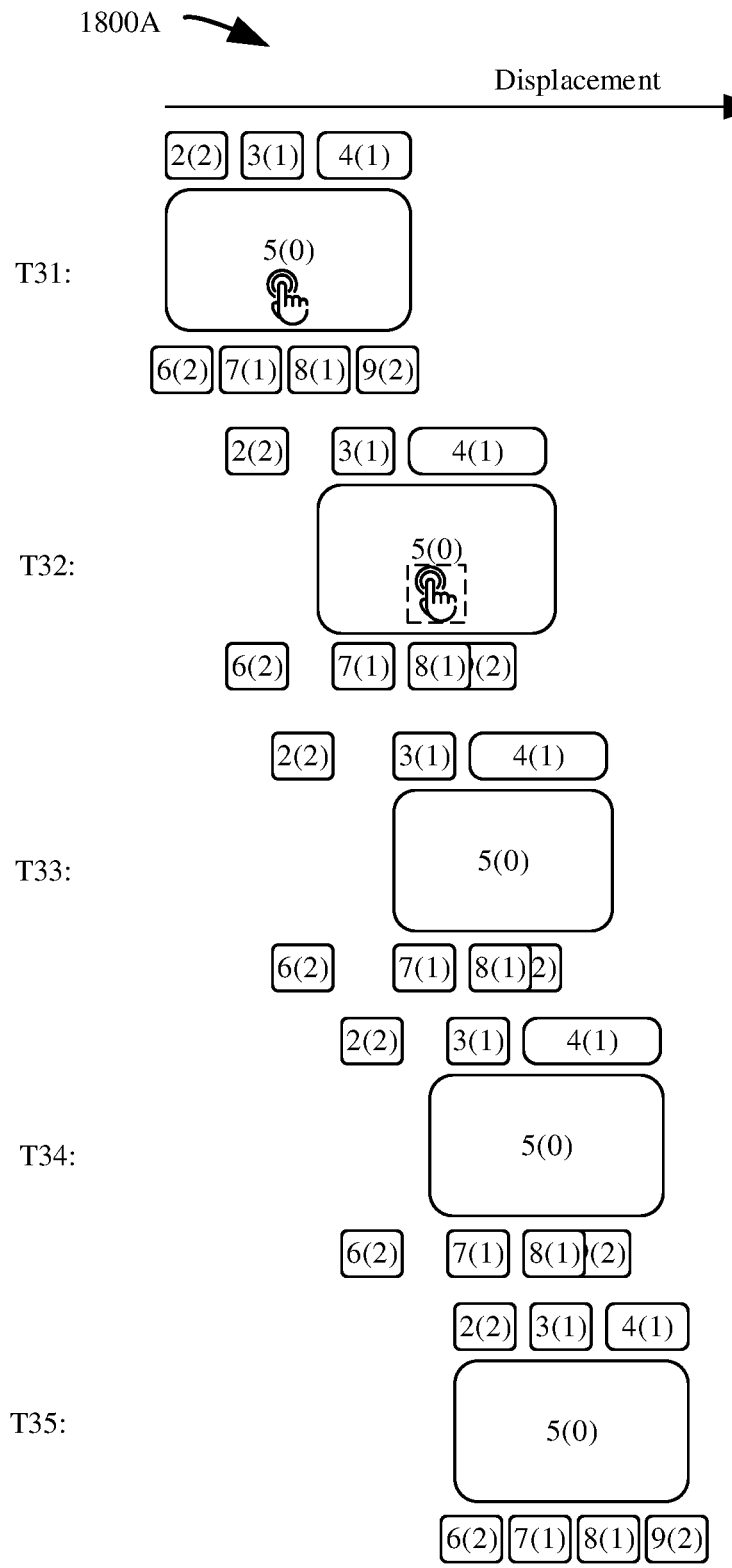
FIG. 18A is a schematic diagram of an example scenario in which a UI element moves completely along with a hand according to an embodiment of this disclosure.
Figure 18B:
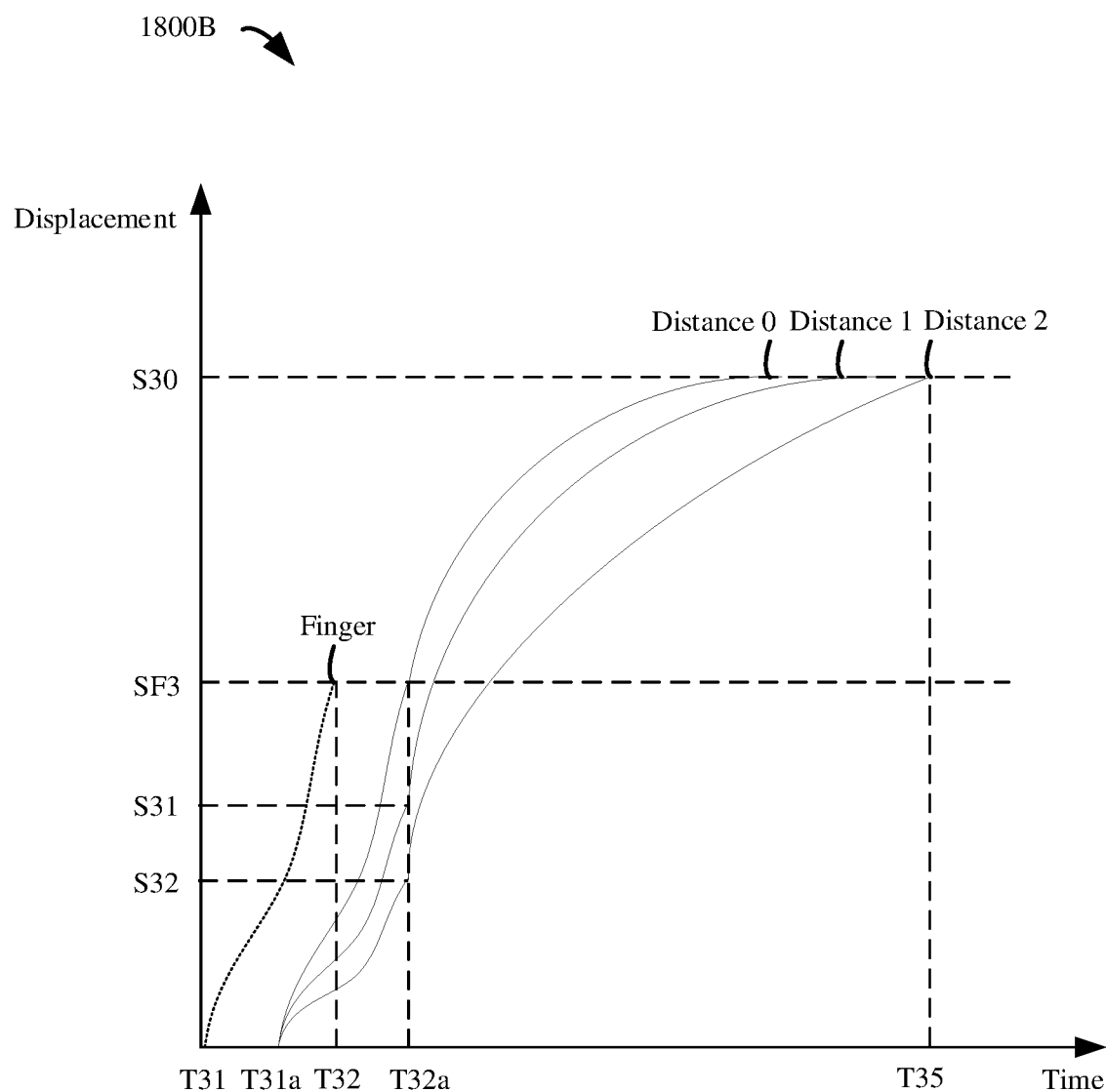
FIG. 18B is a schematic diagram of an example displacement-time curve in a scenario in which a UI element moves completely along with a hand according to an embodiment of this disclosure.

FIG. 18A is a schematic diagram of an example scenario 1800A in which a UI element moves completely along with a hand according to an embodiment of this disclosure. FIG. 18B is a schematic diagram of an example displacement-time curve 1800B in a scenario in which a UI element moves completely along with a hand according to an embodiment of this disclosure.

As shown in FIG. 18A and FIG. 18B, at T31, the UI element 5 is dragged. At T11a, the UI element 5 starts to move along with the drag by a hand. In some embodiments, if the UI element 5 starts to move when the drag occurs, T31a may be equal to T31. Alternatively, if the UI element 5 starts to move after the drag occurs, T31a may be greater than T31. In addition to the dragged UI element 5, other UI elements (for example, the UI elements 2 to 4 and 6 to 9) also move in linkage. It should be understood that, for clarity, the other UI elements are shown to start moving simultaneously the UI element 5. However, as described above, the other UI elements may start to move after respective delay time.

At T32, a user releases or flickers the hand. In this case, the drag on the UI element 5 ends. At T32a, the UI element 5 continues to move with animation effect controlled by a predefined curve (for example, an elastic force curve). In some embodiments, T32a may be equal to T32 if the UI element 5 moves with animation effect controlled by a predefined curve when the drag ends. Alternatively, T32a may be greater than T32 if the UI element 5 moves with animation effect controlled by a predefined curve after the drag ends. In this case, a displacement of the UI element 5 in a drag direction is SF3. Displacements of the UI elements 3, 4, 7, and 8 at a distance of 1 in the drag direction are S31. Displacements of the UI elements 2, 6, and 9 at a distance of 2 in the drag direction are S32. The displacement SF3 is greater than the displacement S31, and the displacement S31 is greater than the displacement S32. In addition, the UI elements 3, 4, 7, and 8 at a distance of 1 and the UI elements 2, 6, and 9 at a distance of 2 also continue to move with animation effect controlled by a predefined curve. Compared with T31, spacings between the UI element 5 and the UI elements 3, 4, 7, and 8 at a distance of 1 in the drag direction increase. Spacings, in the drag direction, between the UI elements 3, 4, 7, and 8 at a distance of 1 and the UI element 9 at a distance of 2 in the drag direction decrease. In addition, spacings, in the drag direction, between the UI elements 3, 4, 7, and 8 at a distance of 1 and the UI elements 2 and 6 at a distance of 2 in a direction opposite to the drag direction increase.

At T33, spacings between the UI element 5 and the UI elements 3, 4, 7, and 8 at a distance of 1 in the drag direction increase. Spacings, in the drag direction, between the UI elements 3, 4, 7, and 8 at a distance of 1 and the UI element 9 at a distance of 2 in the drag direction decrease. In addition, spacings, in the drag direction, between the UI elements 3, 4, 7, and 8 at a distance of 1 and the UI elements 2 and 6 at a distance of 2 in a direction opposite to the drag direction increase.

At T34, all UI elements continue to move with animation effect controlled by a predefined curve. Compared with T33, spacings between the UI element 5 and the UI elements 3, 4, 7, and 8 at a distance of 1 in the drag direction decrease. Spacings, in the drag direction, between the UI elements 3, 4, 7, and 8 at a distance of 1 and the UI element 9 at a distance of 2 in the drag direction increase. In addition, spacings, in the drag direction, between the UI elements 3, 4, 7, and 8 at a distance of 1 and the UI elements 2 and 6 at a distance of 2 in the direction opposite to the drag direction decrease.

At T35, all UI elements move in the drag direction by a displacement S3, and then stop moving. A distance, in the drag direction, between the displacement S30 at a position at which the movement stops and the displacement SF3 at a position at which the hand is released or flickered may be determined based on the friction model, as described above. In this way, drag linkage is completed.

Further, in some embodiments, if a UI element continues to move after a drag stops, the UI element may rebound by a distance. As described above, in an underdamped state, a displacement of a spring fluctuates between a positive value and a negative value with time. Therefore, an elastic force curve of the underdamped state may be used to control a rebound of the UI element.

It should be understood that, in FIG. 18A and FIG. 18B, UI elements are shown to allow overlapping with each other. For example, at time T32 to T34, the UI element 8 and the UI element 9 overlap. However, UI elements may not be allowed to overlap with each other. Whether overlapping is allowed may be configured by an electronic device or a user. When overlapping is allowed, movement of UI elements conforms to an elastic force curve in an underdamped state. When overlapping is not allowed, movement of UI elements conforms to an elastic force curve in an overdamped state. Further, whether any two UI elements overlap may further depend on relative movement ranges of the two UI elements. For example, when the relative movement ranges of the two UI elements are small, the UI elements usually do not overlap. However, when the relative movement ranges of the two UI elements are large, the UI elements may overlap.

Figure 19A:
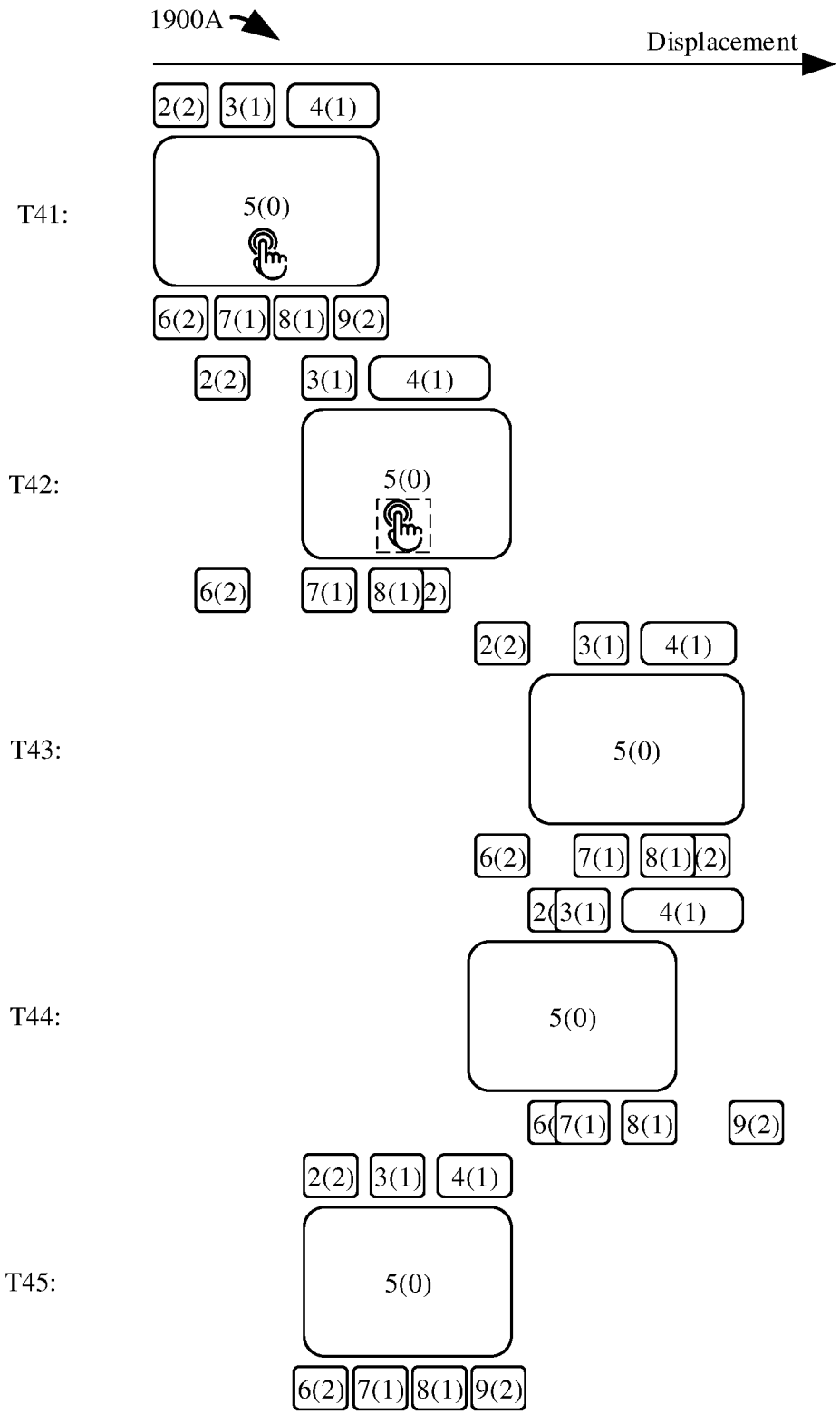
FIG. 19A is a schematic diagram of an example scenario in which a UI element moves completely along with a hand according to an embodiment of this disclosure.
Figure 19B:
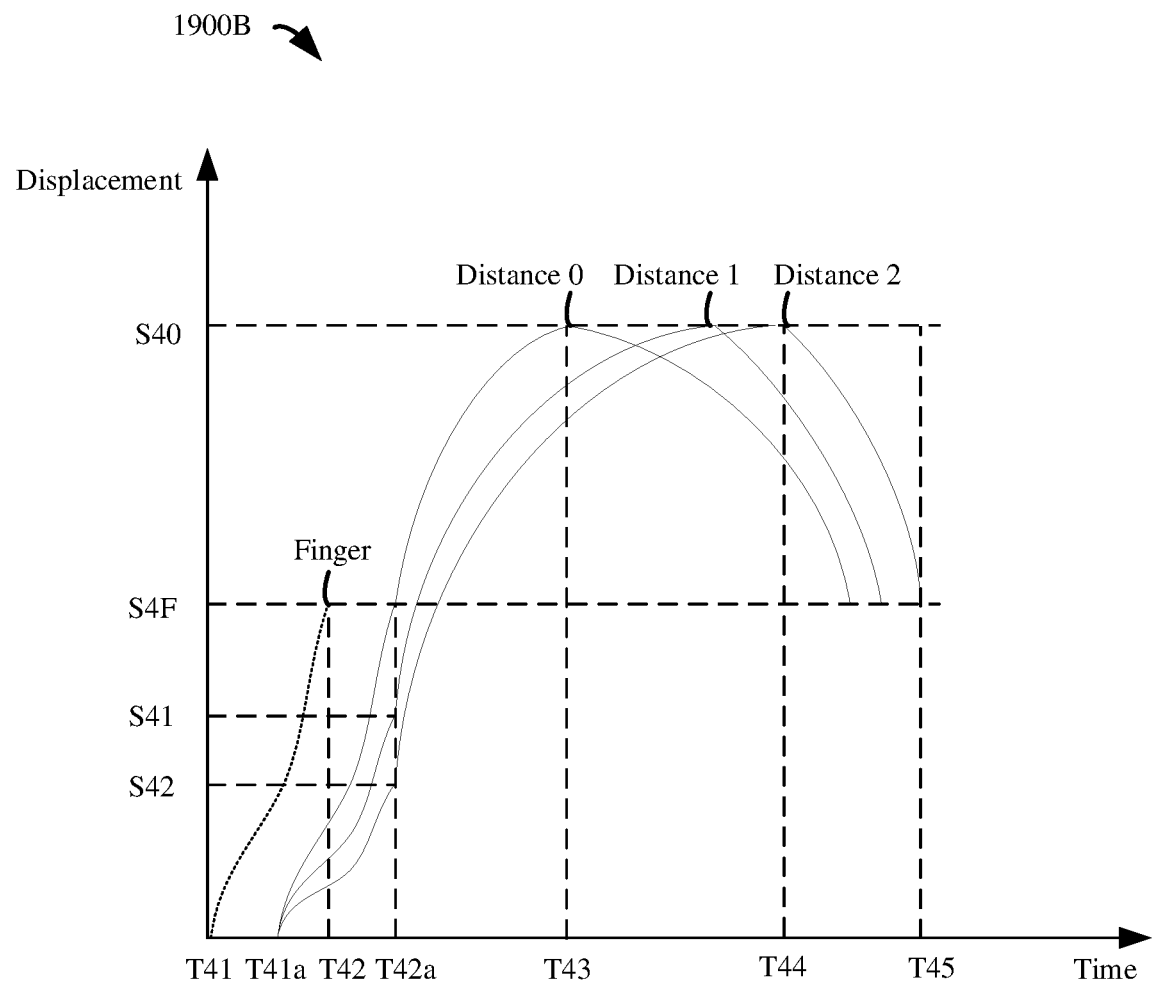
FIG. 19B is a schematic diagram of an example displacement-time curve in a scenario in which a UI element moves completely along with a hand according to an embodiment of this disclosure.

FIG. 19A is a schematic diagram of an example scenario 1900A in which a UI element moves completely along with a hand according to an embodiment of this disclosure. FIG. 19B is a schematic diagram of an example displacement-time curve 1900B in a scenario in which a UI element moves completely along with a hand according to an embodiment of this disclosure.

As shown in FIG. 19A and FIG. 19B, at T41, the UI element 5 is dragged. At T41a, the UI element 5 starts to move along with the drag by a hand. In some embodiments, if the UI element 5 starts to move when the drag occurs, T41a may be equal to T41. Alternatively, if the UI element 5 starts to move after the drag occurs, T41a may be greater than T41. In addition to the dragged UI element 5, other UI elements (for example, the UI elements 2 to 4 and 6 to 9) also move in linkage. It should be understood that, for clarity, the other UI elements are shown to start moving simultaneously the UI element 5. However, as described above, the other UI elements may start to move after respective delay time.

At T42, a user releases or flickers the hand. In this case, the drag on the UI element 5 ends. At T42a, the UI element 5 continues to move with animation effect controlled by a predefined curve (for example, an elastic force curve). In some embodiments, T42a may be equal to T42 if the UI element 5 moves with animation effect controlled by a predefined curve when the drag ends. Alternatively, T42a may be greater than T42 if the UI element 5 moves with animation effect controlled by a predefined curve after the drag ends. In this case, a displacement of the UI element 5 in a drag direction is SF4. Displacements of the UI elements 3, 4, 7, and 8 at a distance of 1 in the drag direction are S41. Displacements of the UI elements 2, 6, and 9 at a distance of 2 in the drag direction are S42. The displacement SF4 is greater than the displacement S41, and the displacement S41 is greater than the displacement S42. In addition, the UI elements 3, 4, 7, and 8 at a distance of 1 and the UI elements 2, 6, and 9 at a distance of 2 also continue to move with animation effect controlled by a predefined curve. Compared with T41, spacings between the UI element 5 and the UI elements 3, 4, 7, and 8 at a distance of 1 in the drag direction increase. Spacings, in the drag direction, between the UI elements 3, 4, 7, and 8 at a distance of 1 and the UI element 9 at a distance of 2 in the drag direction decrease. In addition, spacings, in the drag direction, between the UI elements 3, 4, 7, and 8 at a distance of 1 and the UI elements 2 and 6 at a distance of 2 in a direction opposite to the drag direction increase.

At T43, the UI element 5 moves in the drag direction by a displacement S40, and then starts to rebound. In some embodiments, a distance between the displacement S40 in the drag direction at a rebound position and the displacement SF4 in the drag direction at a position at which the hand is released or flickered may be determined based on the friction model, as described above.

At T44, the UI element 9 at a distance of 2 moves in the drag direction by the displacement S40, and also starts to rebound.

At T45, all UI elements rebound in the drag direction by the displacement SF4, and then stop moving. In this way, drag linkage is completed.

It should be understood that, although the UI element 5 is shown to rebound before the UI elements 3, 4, 7, and 8 at a distance of 1, and the UI elements 3, 4, 7, and 8 at a distance of 1 are shown to rebound before the UI elements 2, 6, and 9 at a distance of 2, all UI elements may rebound together. For example, the UI element 5 may stop moving to wait for other UI elements to move by the displacement S40, and then all UI elements start to rebound together. In addition, although all UI elements are shown to rebound to the position at which the hand is released or flickered, all the UI elements may rebound to a larger extent or a smaller extent. Embodiments of this disclosure are not limited thereto.

Depth Linkage

Embodiments of this disclosure relate to linkage of UI elements on a UI in a depth direction. This is also referred to as depth linkage. The depth direction is a direction perpendicular to a screen of an electronic device. In depth linkage, a touched target UI element may affect other UI elements that are not touched. Specifically, in the depth linkage, when animation effect of the target UI element is triggered, animation effect of one or more other UI elements or even other UI elements on the entire UI may be triggered in linkage, so that all other UI elements are affected by the target UI element. For example, in the depth linkage, when the target UI element is touched within specific duration, in addition to the target UI element, other UI elements may also be zoomed based on a corresponding range, to visually present linkage zooming.

In this way, association between animation effect of different UI elements can be strengthened, and a relationship between independent UI elements can be highlighted. Compared with a conventional animation in which animation effect is simple and each UI element is independent without association, in embodiments of this disclosure, animation effect can better conform to a physical rule, and a real use scenario and a use habit of a user are considered, so that user experience can be significantly improved.

The following describes some example embodiments of depth linkage with reference to FIG. 20 to FIG. 33D.

Depth linkage may occur on a UI with any appropriate regular or irregular layout, and a UI element on the UI may have any appropriate size and shape. For example, depth linkage may occur on the UIs 300A to 300C shown in FIG. 3A to FIG. 3C.

A UI element on a UI may be touched. For example, when a user expects to perform an operation associated with a UI element, the user may touch the UI element. In an example, when a user expects to enter an application represented by a UI element or open a menu associated with a UI element, the user may touch the UI element. When a touch on a UI element is detected, the UI element may change, for example, the UI element may be zoomed, to present a touch action in a depth direction. For example, the UI element may be zoomed out, to present being away in the depth direction. Alternatively, the UI element may be zoomed in, to present being close in the depth direction. Zoom-out of a UI element is used below as an example to describe zooming. However, it should be understood that zooming may alternatively be zoom-in of a UI element.

Figure 20:
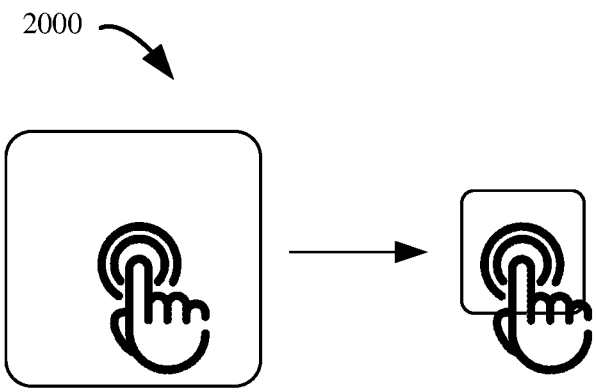
FIG. 20 is a schematic diagram of an example of a change of a UI element when the UI element is touched according to some embodiments of this disclosure.

FIG. 20 is a schematic diagram of an example of a change 2000 of a UI element when the UI element is touched according to some embodiments of this disclosure. As shown in FIG. 20, when a touch on a UI element is detected, the UI element may be zoomed out, to present being away in a depth direction.

The change of the UI element may conform to a surface pressure model. In the surface pressure model, pressure at all parts of the UI element (for example, all pixels or all parts obtained through division in any other appropriate manner) is the same. To be specific, regardless of a specific touched part of the UI element (for example, regardless of whether a center of the UI element is touched or an edge of the UI element is touched), pressure at all parts of the UI element is the same. Therefore, regardless of a specific touched part of the UI element, a change of the UI element remains the same.

Figure 21:
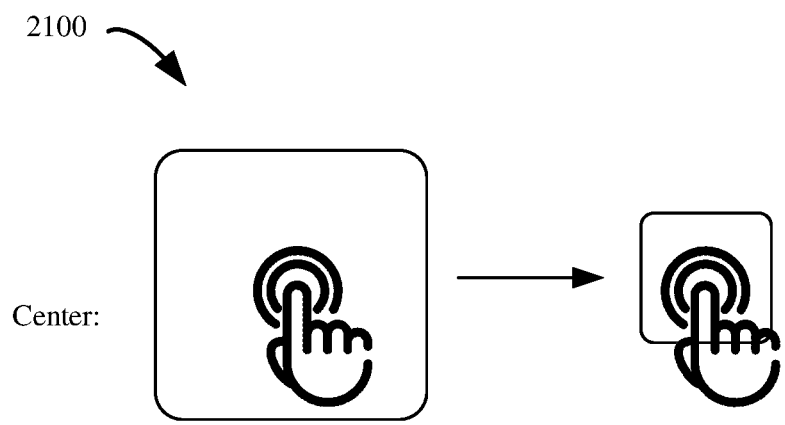
FIG. 21 is a schematic diagram of an example of changes of a UI element when the UI element is touched at different positions according to some embodiments of this disclosure.
Figure 21:
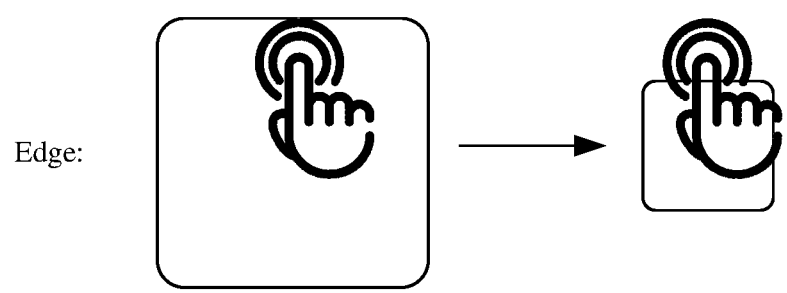

FIG. 21 is a schematic diagram of an example of changes 2100 of a UI element when the UI element is touched at different positions according to some embodiments of this disclosure. As shown in FIG. 21, regardless of whether a touch is detected at a center of the UI element or at an edge of the UI element, the UI element may be zoomed out based on a same range, to present being away in a depth direction.

In addition, as shown in FIG. 21, after the UI element is zoomed out, a touch position may no longer be within a range of the zoomed-out UI element. In this case, because the touch position is still within a range of the UI element that is not zoomed out or is within any other appropriate range, the touch may still be detected as a touch on the UI element. Alternatively, because the touch position is no longer within the range of the zoomed-out UI element, the touch is not detected as a touch on the UI element. In this case, it can be considered that the touch ends.

In addition, in some embodiments, to enable a change of a UI element to conform to a natural law and a use habit of a user, a change range may depend on a magnitude of a touch force. In the real world, a magnitude of a force is usually a magnitude of a real force. In this case, a larger touch force indicates a larger change in a depth direction. In some embodiments, the touch force may be a touch force that is applied by a user and that is detected by an electronic device. Alternatively, the touch force may be a predetermined touch force specified by an electronic device or a user.

Figure 22:
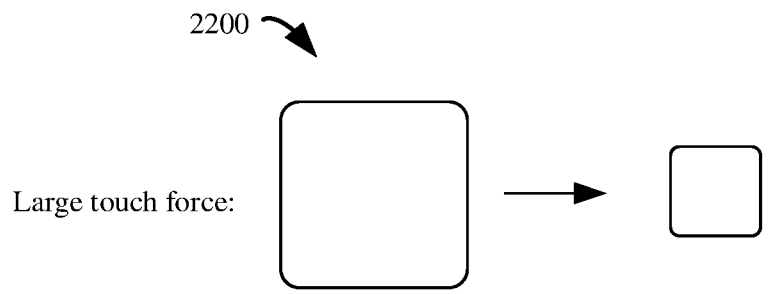
FIG. 22 is a schematic diagram of an example of changes of a UI element under different touch forces according to some embodiments of this disclosure.
Figure 22:
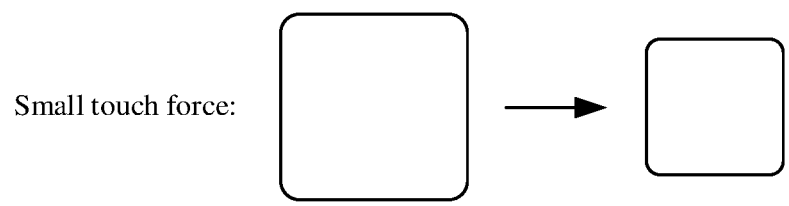

FIG. 22 is a schematic diagram of an example of changes 2200 of a UI element under different touch forces according to some embodiments of this disclosure. As shown in FIG. 22, when a touch force is large, the UI element may be zoomed out by a larger range, to present being away to a larger extent in a depth direction. In some embodiments, the UI element may even be zoomed out to disappear from a UI, that is, to a size of 0, to present being away to a maximum extent in a depth direction. In comparison, when a touch force is small, the UI element may be zoomed out by a smaller range, to present being away to a smaller extent in a depth direction.

However, embodiments of this disclosure are not limited thereto. Zooming modes for the UI element in response to different touch forces may be configured by an electronic device or a user. For example, when a touch force is large, the UI element may be zoomed out by a smaller range; and when a touch force is small, the UI element may be zoomed out by a larger range.

Further, on an electronic device, performing a change in a depth direction completely based on a real touch force may impose a high user requirement, and the electronic device may need to be equipped with related hardware. Therefore, in some embodiments, a touch force may be simulated by or replaced with touch time. For example, if touch time is longer, it can be considered that a touch force is larger, and therefore a change in a depth direction is larger.

Figure 23:
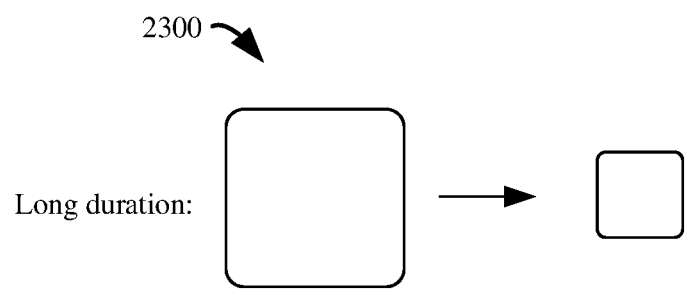
FIG. 23 is a schematic diagram of an example of changes of a UI element in the case of different touch duration according to some embodiments of this disclosure.
Figure 23:
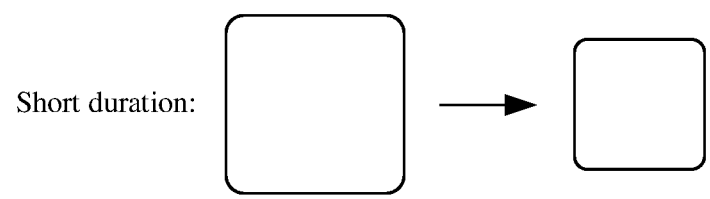

FIG. 23 is a schematic diagram of an example of changes 2300 of a UI element in the case of different touch duration according to some embodiments of this disclosure. As shown in FIG. 23, when touch duration is long, the UI element may be zoomed out by a larger range, to present being away to a larger extent in a depth direction. In some embodiments, the UI element may even be zoomed out to disappear from a UI, that is, to a size of 0, to present being away to a maximum extent in a depth direction. In comparison, when touch duration is short, the UI element may be zoomed out by a smaller range, to present being away to a smaller extent in a depth direction.

However, embodiments of this disclosure are not limited thereto. Zoom modes for the UI element in response to different touch duration may be configured by an electronic device or a user. For example, when touch duration is long, the UI element may be zoomed out by a smaller range; and when touch duration is short, the UI element may be zoomed out by a larger range.

In addition, in some embodiments, to further enable a change of a UI element to conform to a natural law and a use habit of a user, a change range may depend on a size of the UI element. For example, visually, it may be difficult for a same touch to push down a larger UI element, but it may be easier for the same touch to push down a smaller UI element. In this case, a larger UI element may be less affected by the touch, and a smaller UI element may be more affected by the touch.

Figure 24:
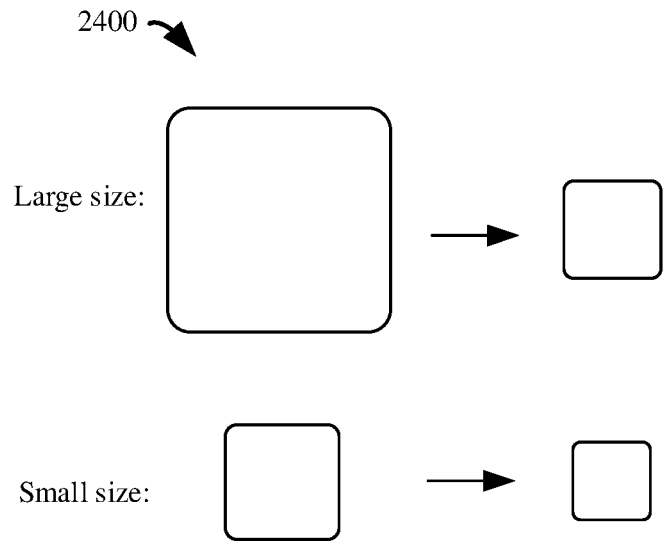
FIG. 24 is a schematic diagram of an example of changes of a UI element in different sizes according to some embodiments of this disclosure.

FIG. 24 is a schematic diagram of an example of changes 2400 of a UI element in different sizes according to some embodiments of this disclosure. As shown in FIG. 24, when a size of the UI element is large, the UI element may be zoomed out by a larger range, to present being away to a larger extent in a depth direction. In comparison, when a size of the UI element is small, the UI element may be zoomed out by a smaller range, to present being away to a smaller extent in a depth direction.

However, embodiments of this disclosure are not limited thereto. Zoom modes for the UI element in different sizes may be configured by an electronic device or a user. For example, to make sizes of zoomed UI elements more balanced, a larger UI element may be more affected by a touch, and a smaller UI element may be less affected by the touch. Therefore, when a size of a UI element is large, the UI element may be zoomed out by a smaller range; and when a size of a UI element is small, the UI element may be zoomed out by a larger zoom range, to present being away to a smaller extent in a depth direction.

In addition, in some embodiments, to improve user experience, a range by which a UI element can be zoomed may be limited, so that the UI element can be zoomed only within an allowed range. For example, the range may be any appropriate range, such as 10% to 90% of a size of the UI element, 100 pixels to 10,000 pixels, or 2% to 50% of a screen-to-body ratio. In an example, it is assumed that the range is 10% to 90% of the size of the UI element. In this case, regardless of a magnitude of a touch force and touch duration, a touched UI element can be zoomed out only to 10% of an original size at most, and cannot disappear from a screen.

Zooming of a touched UI element is described in detail above. As described above, in depth linkage, a touched target UI element may affect other UI elements that are not touched. Specifically, in the depth linkage, when animation effect of the target UI element is triggered, animation effect of one or more other UI elements or even other UI elements on the entire UI may be triggered in linkage, so that all other UI elements are affected by the target UI element. For example, in the depth linkage, when the target UI element is touched within specific duration, in addition to the target UI element, other UI elements may also be zoomed based on a corresponding range, to visually present linkage zooming. Therefore, depth linkage is described in detail below with reference to FIG. 25 to FIG. 33D.

Figure 25:
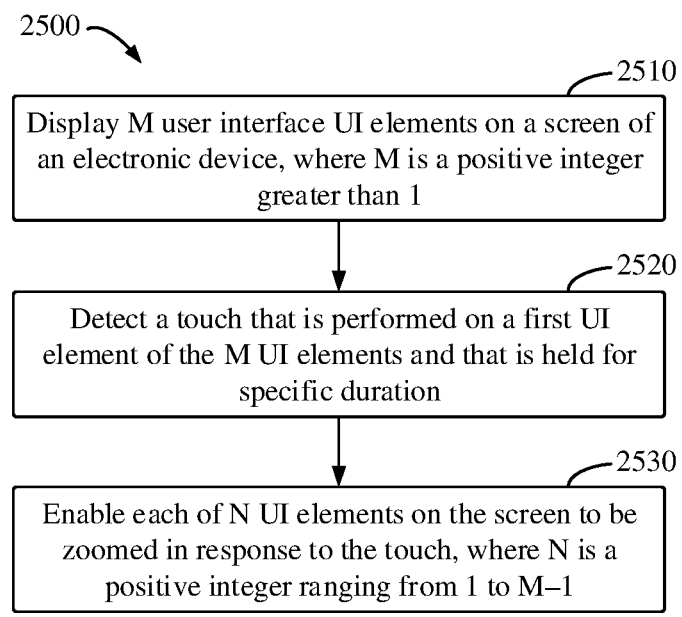
FIG. 25 is a flowchart of a graphical interface display method according to an embodiment of this disclosure.

FIG. 25 is a flowchart of a graphical interface display method 2500 according to an embodiment of this disclosure. It should be understood that the method 2500 may be performed by the electronic device 100 described with reference to FIG. 1A or FIG. 1B or the electronic device 200 described with reference to FIG. 2. The method 2500 is described herein with reference to the UI 300A in FIG. 3A. However, it should be understood that the UI 300A is merely an example, and the method 2500 is applicable to any appropriate interface, including but not limited to the UIs 300B and 300C.

At a block 2510, M user interface UI elements are displayed on a screen of the electronic device. M is a positive integer greater than 1. For example, the M UI elements may be UI elements 1 to 13.

At a block 2520, a touch that is performed on a first UI element of the M UI elements and that is held for specific duration is detected. For example, the first UI element may be the UI element 5. As described above, the touch that is performed on the first UI element and that is held for specific duration enables the first UI element to be zoomed with time, to present touch effect in a depth direction.

At a block 2530, each of N UI elements on the screen is enabled to be zoomed in response to the detected touch that is performed on the first UI element and that is held for specific duration. N is a positive integer ranging from 1 to M−1. Therefore, a linkage touch is visually indicated.

Figure 26:
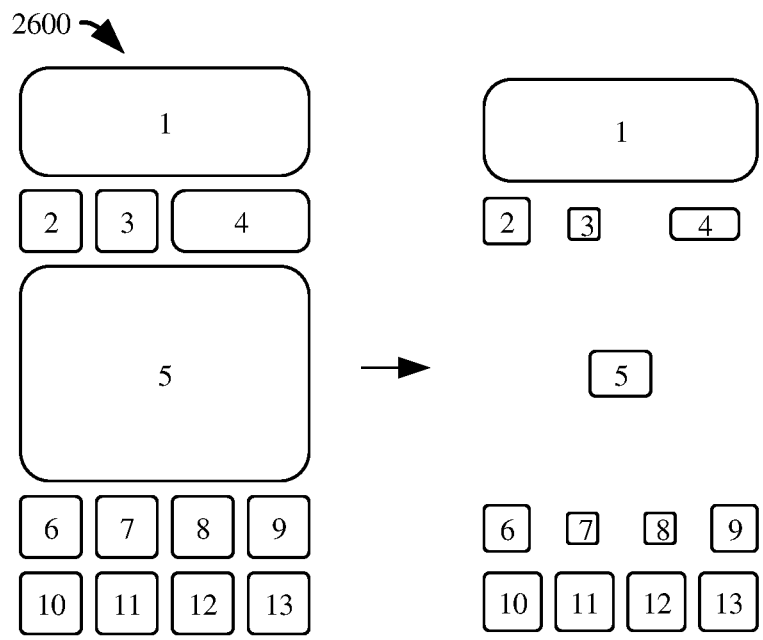
FIG. 26 is a schematic diagram of an example of depth linkage of N UI elements according to an embodiment of this disclosure.

FIG. 26 is a schematic diagram of an example of depth linkage 2600 of N UI elements according to an embodiment of this disclosure. As shown in FIG. 26, the UI element 5 is touched withing specific duration, so that the UI element 5 is zoomed with time, to present touch effect in a depth direction. In addition, other UI elements (for example, the UI elements 1 to 4 and 6 to 13) on the screen are also zoomed based on different ranges with time in response to the touch, to present touch effect in the depth direction. Therefore, a linkage touch is visually presented. For clarity, FIG. 26 shows only depth linkage of the UI elements 1 to 13 on the UI 300A. It should be understood that the depth linkage may occur at any at least two UI elements on any UI, for example, at any at least two UI elements on the UIs 300A to 300C.

In some embodiments, the depth linkage may be applied to all UI elements on the screen. In this case, it may be determined that M−1 UI elements of the M UI elements other than the first UI element are the N UI elements. Alternatively, the depth linkage may be applied only to some UI elements on the screen. In this case, an affected region of the first UI element may be determined based on a size of the first UI element, and it is determined that a UI element, in the affected region, of the M UI elements is the N UI elements. For example, a larger size of the first UI element may indicate a larger affected region of the first UI element. Alternatively, the affected region may alternatively be narrowed with the size, and this disclosure is not limited herein. For example, the affected region may be a circle that uses a reference point of the first UI element as a center and that has a predetermined radius. It should be understood that the affected region may be any appropriate region in any shape, for example, a rectangular shape or a rhombic shape with a predetermined size. The affected region may be configured by an electronic device and a user, and this disclosure is not limited herein.

In addition, in some embodiments, a UI element that intersects the affected region may be considered to be within the affected region. Alternatively, when the affected region is a circle with a predetermined radius, if a distance between a UI element and the first UI element is less than the predetermined radius of the affected region, the UI element may be considered to be within the affected region.

Figure 27:
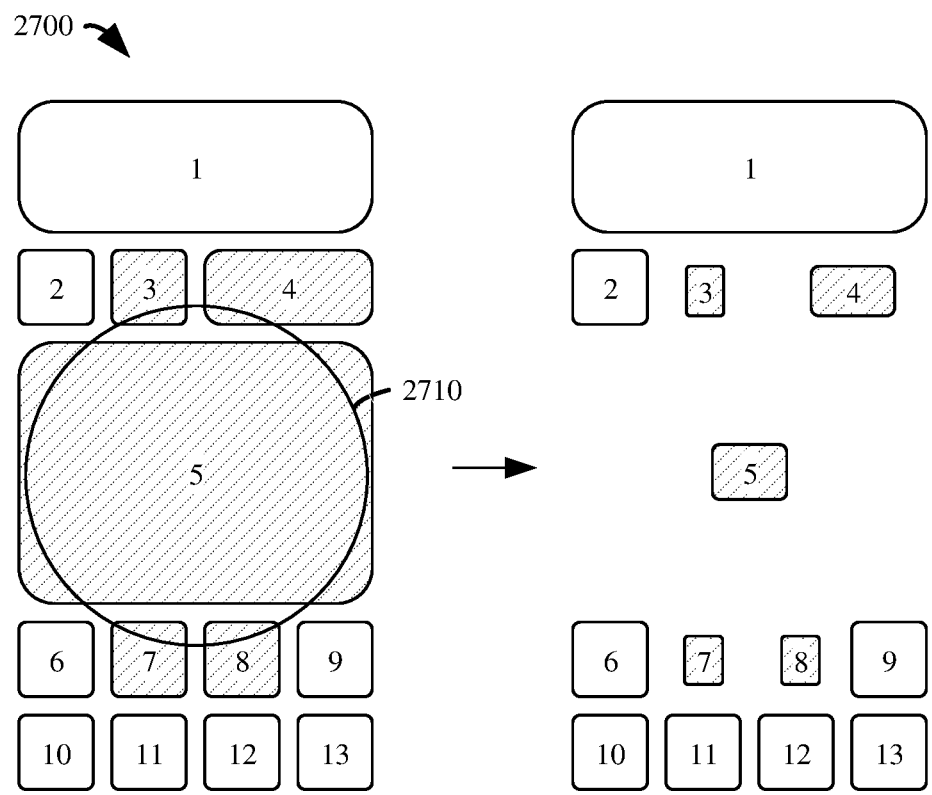
FIG. 27 is a schematic diagram of an example affected region of a UI element according to an embodiment of this disclosure.

FIG. 27 is a schematic diagram of an example affected region 2700 of a UI element according to an embodiment of this disclosure. As shown in FIG. 27, because the UI elements 3, 4, 7, and 8 are in an affected region 2710 of the UI element 5, the UI elements 3, 4, 7, and 8 are zoomed in linkage with the UI element 5. In addition, because the UI elements 1, 2, 6, and 9 to 13 are not in the affected region 2710 of the UI element 5, the UI elements 1, 6, and 9 to 13 are not zoomed in linkage with the UI element 5.

Still as shown in FIG. 25, to enable the N UI elements to be zoomed based on corresponding ranges, a distance between the first UI element and each of the N UI elements may be determined. As described above, in some embodiments, distances may be classified into a plurality of distance levels based on ranges to which the distances belong. For example, a UI element on which an operation is performed may belong to a distance level 0; UI elements of UI elements in linkage may belong to distance levels 1, 2, 3, . . . , based on corresponding distances between the UI elements and the UI element on which the operation is performed; and UI elements belonging to a same distance level may be considered as having a same distance. Therefore, linkage between UI elements can be simplified based on a distance level, so that UI elements belonging to a same distance level are linked in a same manner, to improve uniformity and coordination of linkage. However, it should be understood that a distance may alternatively be used in linkage, so that UI elements are more precisely linked. A distance level may be interchangeably referred to as a distance.

A manner of determining a distance between the first UI element and a second UI element of the N UI elements is described above with reference to FIG. 10 to FIG. 14B. Therefore, descriptions thereof are omitted herein.

Still as shown in FIG. 25, after the distance between the first UI element and the second UI element is determined, a zoom range of the second UI element may be determined based on the distance. For example, a larger distance between the first UI element and the second UI element may indicate a smaller zoom range of the second UI element, to visually indicate that impact of the touch on a remote UI element decreases. Alternatively, a larger distance between the first UI element and the second UI element may indicate a larger zoom range of the second UI element, to visually indicate that impact of the touch on a remote UI element increases.

In some embodiments, to determine the zoom range of the second UI element, a first range by which the first UI element is to be zoomed in response to the touch may be determined. In some embodiments, the first range by which the first UI element is to be zoomed may be determined based on various factors associated with the first UI element. The factors may include but are not limited to a size of the first UI element, a range within which the first UI element is capable of changing, the touch duration, and a predetermined touch force. Impact of the factors on a zoom range of a UI element is described in detail above. Therefore, descriptions thereof are omitted herein.

Then a range by which the second UI element is to be zoomed in response to the touch may be determined based on the first range and the distance between the first UI element and the second UI element. How to transfer the zoom range of the first UI element to the second UI element to obtain the zoom range of the second UI element may be implemented in the transfer manner described in detail above. A difference lies in that, in depth linkage, $x''$ in the transfer equations (7) and (8) indicates a zoom range of a UI element (for example, the second UI element) that is zoomed in linkage, and x indicates a zoom range of a touched UI element (for example, the first UI element). Therefore, descriptions thereof are omitted herein.

In this way, because the zoom range of the second UI element is determined based on the zoom range of the first UI element and the distance between the second UI element and the first UI element, clear and natural depth linkage that conforms to a use habit of a user can be implemented.

In addition, in some embodiments, a size of the second UI element may also affect the zoom range of the second UI element. In this case, the size of the second UI element may also be considered to determine the zoom range of the second UI element. For example, a larger second UI element may indicate a larger zoom range of the second UI element, so that sizes of zoomed UI elements on the screen are closer and more visually uniform. Alternatively, a larger second UI element may indicate a smaller zoom range of the second UI element, so that zoomed UI elements on the screen differ more in sizes. Therefore, in some embodiments, the range by which the second UI element is to be zoomed in response to the touch may be determined based on the first range, the distance, and the size of the second UI element.

In addition, in some embodiments, the size of the first UI element may also affect the zoom range of the second UI element. In this case, the size of the first UI element may also be considered to determine the zoom range of the second UI element. For example, a larger size of the first UI element indicates larger linkage impact that may be generated by the first UI element. Therefore, animation effect of zooming of the second UI element may be directly proportional to the size of the first UI element. Therefore, in some embodiments, the zoom range of the second UI element may be determined based on the first range, the distance, and the size of the first UI element.

Further, as described above, both the size of the first UI element and the size of the second UI element may affect the zoom range of the second UI element. Therefore, in some embodiments, the zoom range of the second UI element may be determined based on the first range, the distance, the size of the first UI element, and the size of the second UI element.

Still as shown in FIG. 25, after the zoom range of the second UI element is determined, the second UI element may be zoomed by the range, to visually indicate that the second UI element is zoomed as the first UI element is touched. The N UI elements may be zoomed by respective ranges, to visually indicate a touch on the entire screen or in some regions of the screen, and present touch linkage.

Figure 28:
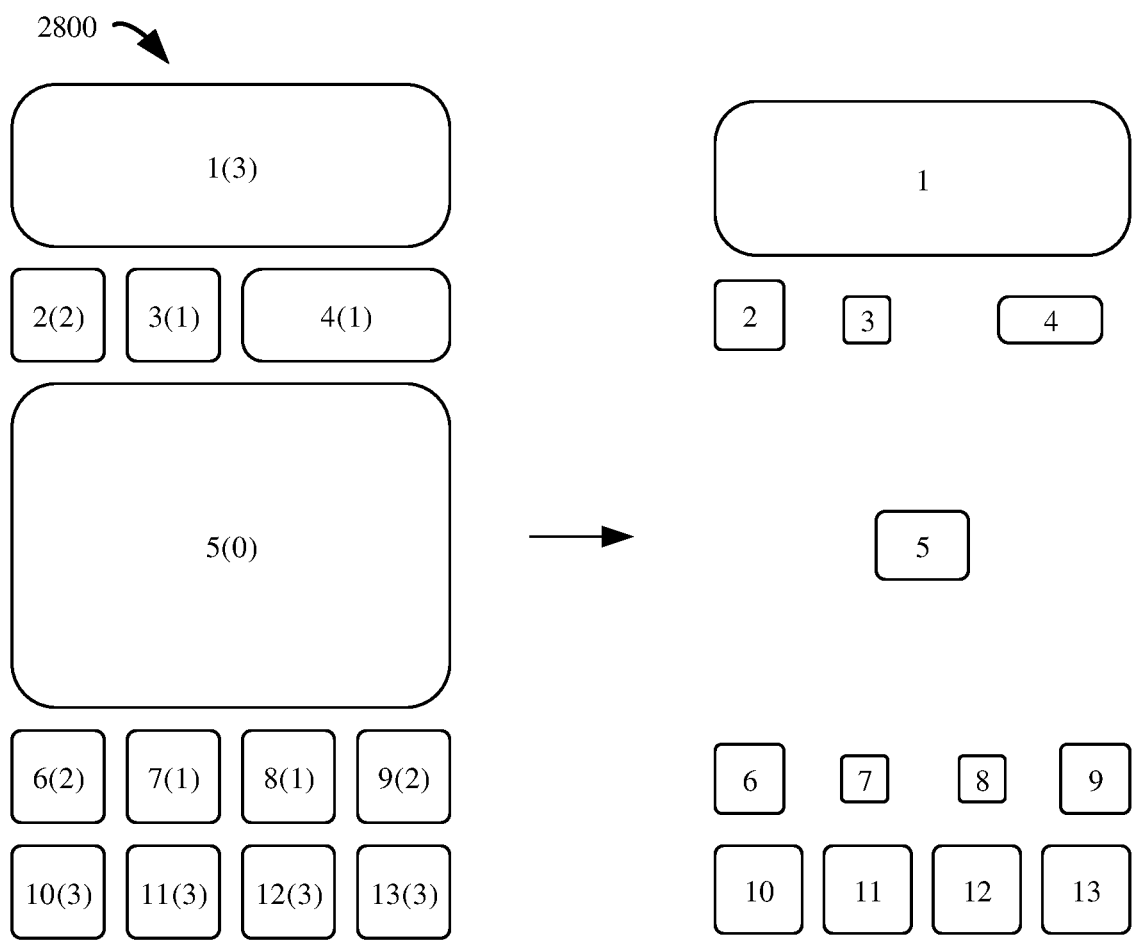
FIG. 28 is a schematic diagram of an example of zooming of a UI element based on a distance according to an embodiment of this disclosure.

FIG. 28 is a schematic diagram of an example of zooming 2800 of a UI element based on a distance according to an embodiment of this disclosure. As shown in FIG. 2800, a zoom range of a UI element (for example, the UI element 5) at a distance of 0 is greater than that of a UI element (for example, the UI elements 3, 4, 7, and 8) at a distance of 1, the zoom range of the UI element at a distance of 1 is greater than that of a UI element (for example, the UI elements 2, 6, and 9) at a distance of 2, and the zoom range of the UI element at a distance of 2 is greater than that of a UI element (for example, the UI elements 1 and 10 to 13) at a distance of 3.

In addition, in some embodiments, to better present transfer of animation effect and improve user experience, the first UI element and the second UI element do not start to be zoomed at the same time. For example, the first UI element may start to be zoomed when the touch occurs, and the second UI element may start to be zoomed after the touch occurs for a period of time. Therefore, in some embodiments, delay time may be determined based on the distance between the first UI element and the second UI element, and the second UI element is enabled to be zoomed in response to that the delay time elapses after the touch occurs. Further, in some embodiments, a delay coefficient may be determined, and delay time is determined based on the distance and the delay coefficient. For example, the delay time may be a quotient obtained by dividing the distance by the delay coefficient. The delay coefficient may be configured by an electronic device or a user.

Figure 29:
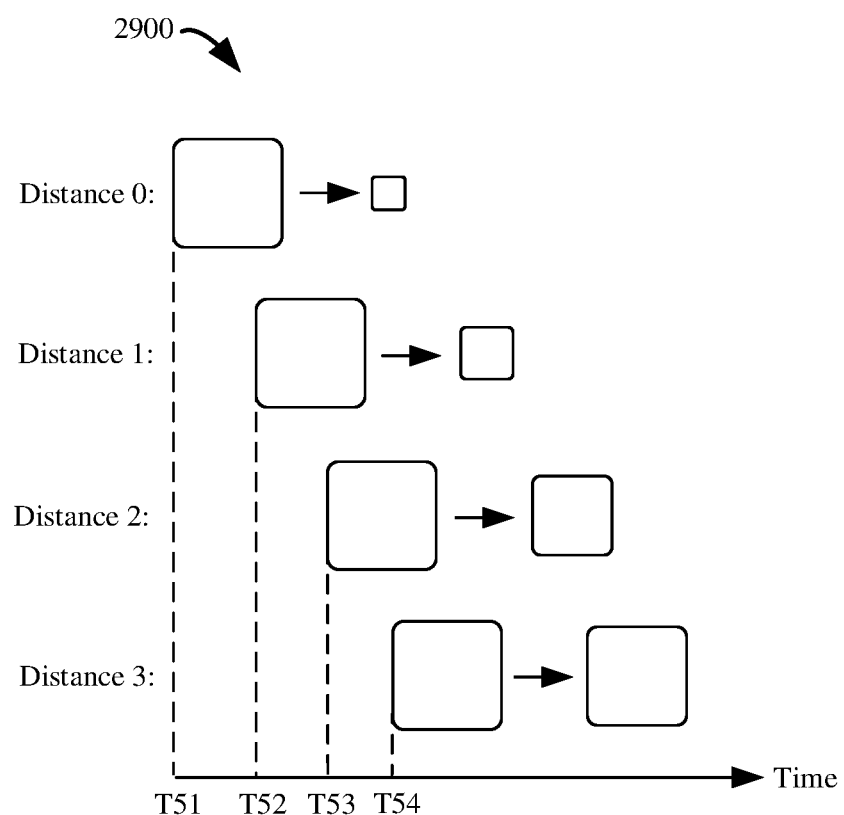
FIG. 29 is a schematic diagram of example delay time according to an embodiment of this disclosure.

FIG. 29 is a schematic diagram of example delay time 2900 according to an embodiment of this disclosure. As shown in FIG. 29, the first UI element at a distance of 0 starts to be zoomed when the touch occurs, a UI element at a distance of 1 is zoomed later than the first UI element, a UI element at a distance of 2 is zoomed later than the UI element at a distance of 1, and a UI element at a distance of 3 is zoomed later than the UI element at a distance of 2.

Figure 30:
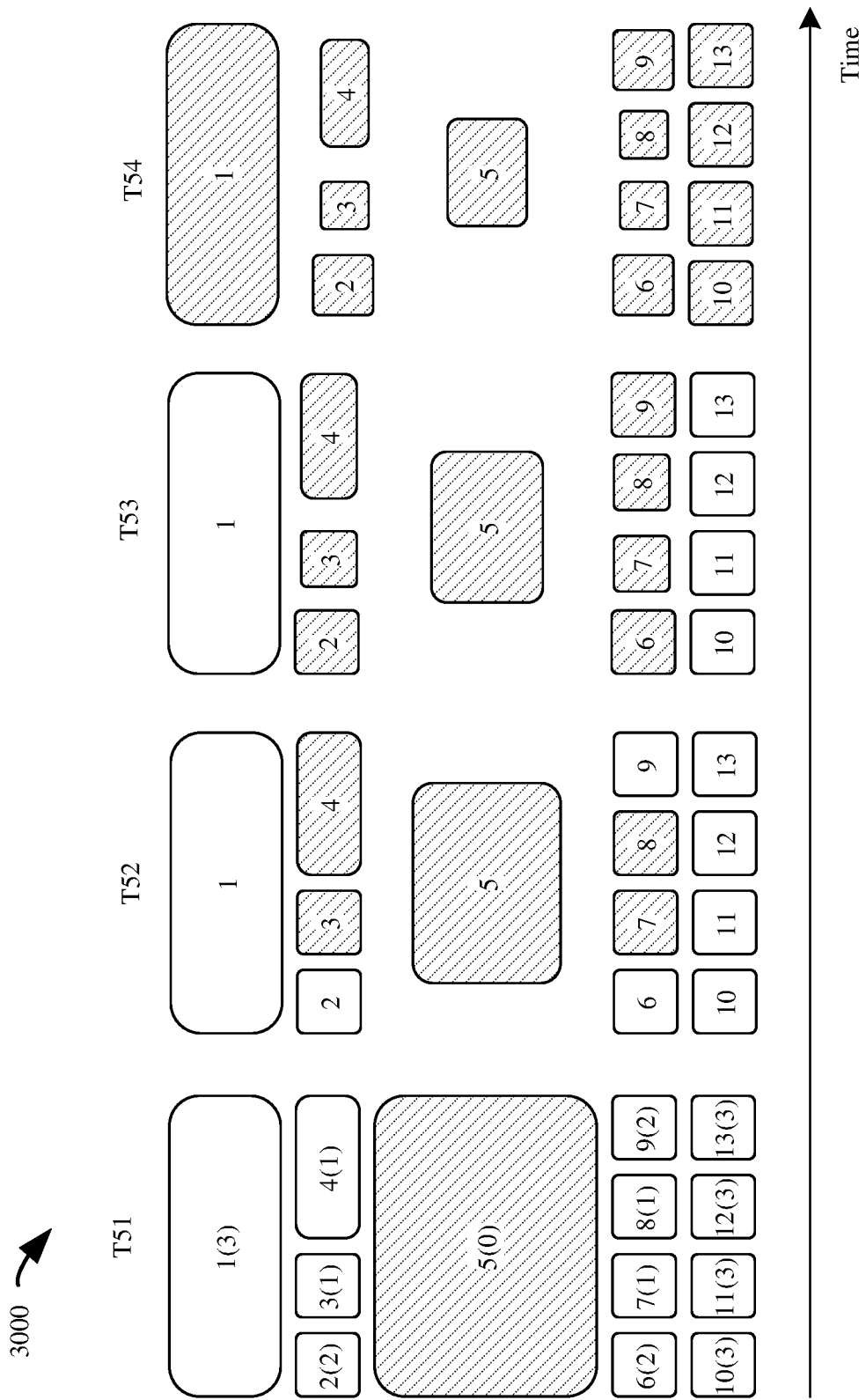
FIG. 30 is a schematic diagram of an example of zooming of a UI element with delay time according to this disclosure.

FIG. 30 is a schematic diagram of an example of zooming 3000 of a UI element with delay time according to this disclosure. As shown in FIG. 30, the UI element 5 at a distance of 0 starts to be zoomed at time T51 at which the touch occurs, the UI elements 3, 4, 7, and 8 at a distance of 1 start to be zoomed at time T52 later than the time T51, the UI elements 2, 4, 6, and 9 at a distance of 2 start to be zoomed at later time T53, and the UI elements 1 and 10 to 13 at a distance of 3 start to be zoomed at latest T54.

In addition, in some embodiments, a zoom velocity of a UI element may be controlled by a predefined curve of a range varying with time. For example, the predefined curve may be a Bezier curve or an elastic force curve. When an elastic force curve is used, a zoom velocity may be controlled by controlling a damping coefficient and a stiffness coefficient of a spring. When a Bezier curve is used, a zoom velocity may be controlled by controlling coordinates of at least one of at least one control point of the Bezier curve.

Further, in some embodiments, to improve user experience, a UI element that is zoomed in linkage may be further enabled to move toward the touched UI element. Specifically, the N UI elements may be enabled to move toward the first UI element, to further visually highlight the touch. For example, a range of a displacement may depend on at least one of a distance between a UI element zoomed in linkage and the touched UI element, the touch duration, the size of the second UI element, and the size of the first UI element. Therefore, in some embodiments, a displacement of movement of the second UI element may be determined based on the distance between the first UI element and the second UI element, the touch duration, the size of the first UI element, and/or the size of the second UI element.

Then the second UI element may be enabled to move by the displacement in a direction from the second UI element to the first UI element. For example, the second UI element may be enabled to move by the displacement in a direction from a second reference point of the second UI element to a first reference point of the first UI element. Visual effect is that the second UI element is attracted by the first UI element. It should be understood that embodiments of this disclosure are not limited thereto. For example, the second UI element may alternatively be enabled to move in an opposite direction (for example, a direction from the first reference point of the first UI element to the second reference point of the second UI element). Visual effect is that the second UI element is repelled by the first UI element.

Figure 31:
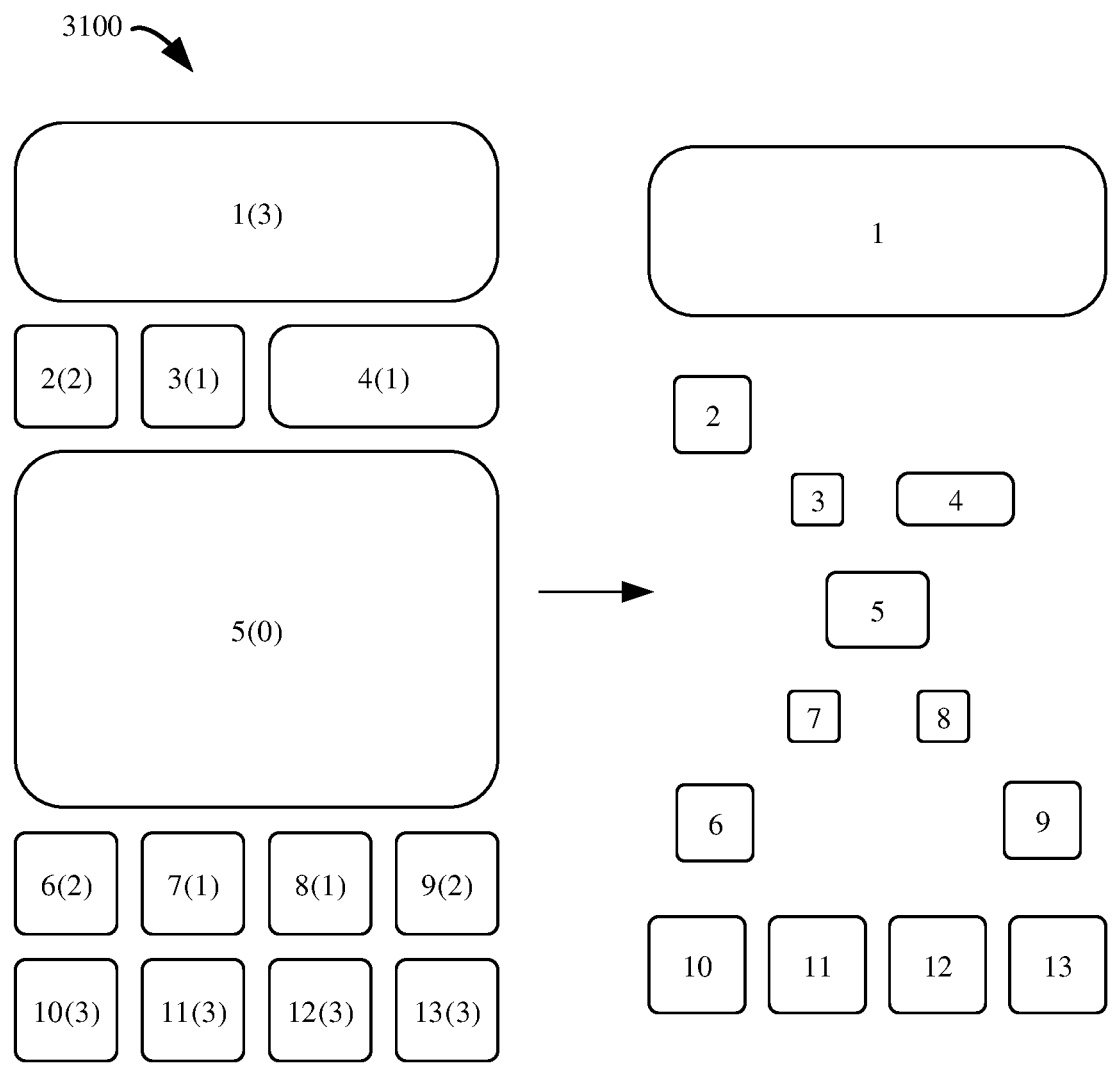
FIG. 31 is a schematic diagram of an example of a movement displacement of a UI element according to an embodiment of this disclosure.

FIG. 31 is a schematic diagram of an example of a movement displacement 3100 of a UI element according to an embodiment of this disclosure. As shown in FIG. 3100, a displacement range of a UI element (for example, the UI elements 3, 4, 7, and 8) at a distance of 1 is greater than that of a UI element (for example, the UI elements 2, 6, and 9) at a distance of 2, and the displacement range of the UI element at a distance of 2 is greater than that of a UI element (for example, the UI elements 1 and 10 to 13) at a distance of 3.

In addition, in some embodiments, a zoomed UI element may be restored after the touch ends (for example, after a user lifts a hand away from the screen). Specifically, both the touched UI element and the N UI elements zoomed in linkage may be restored. Therefore, in some embodiments, a zoomed second UI element may be restored to the non-zoomed second UI element. A restoration process may be an inverse process of zooming. Therefore, detailed descriptions thereof are omitted herein.

Figure 32A:
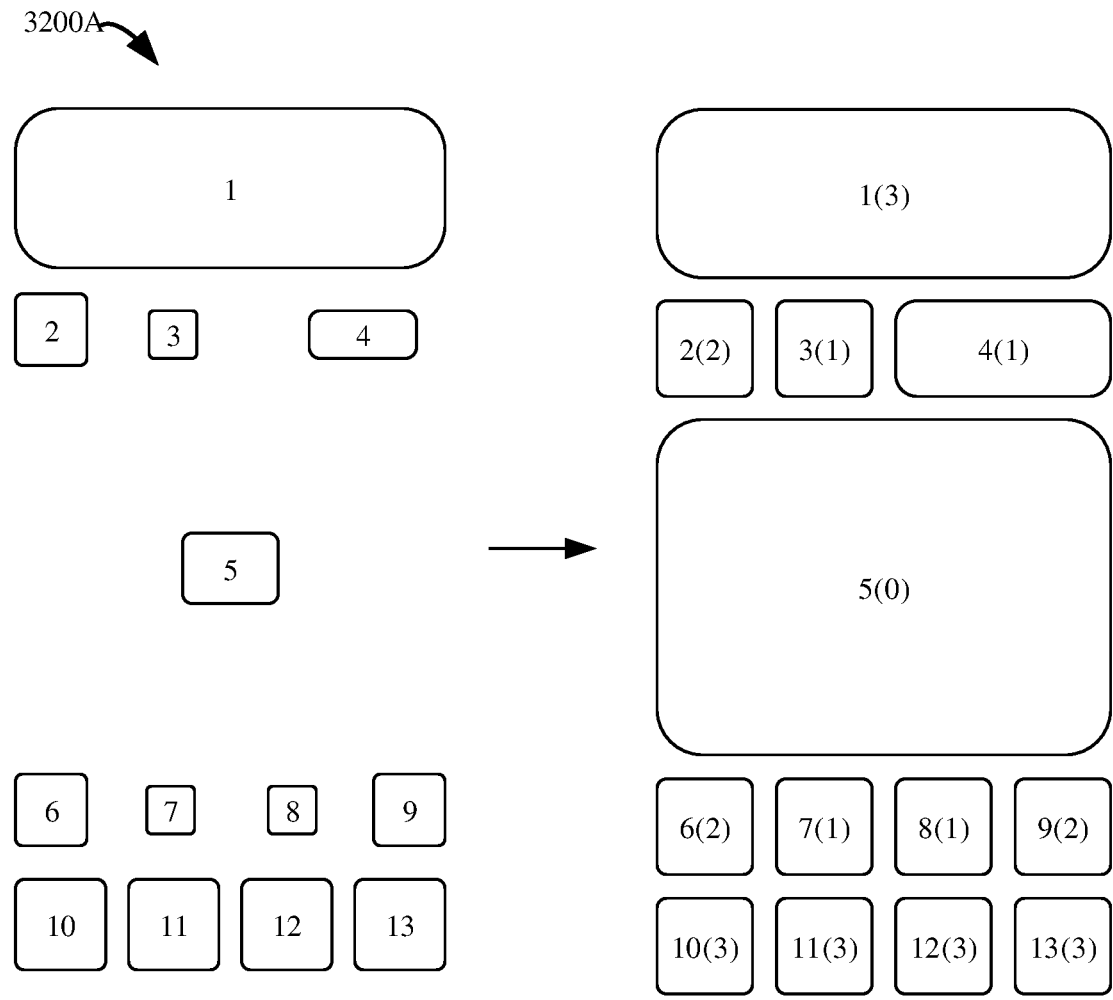
FIG. 32A and FIG. 32B are schematic diagrams of examples of restoration of a UI element without a displacement and restoration of a UI element with a displacement respectively according to an embodiment of this disclosure.

FIG. 32A is a schematic diagram of an example of restoration 3200A of a UI element according to an embodiment of this disclosure. As shown in FIG. 32A, all zoomed UI elements (for example, UI elements 1 to 13) are restored to non-zoomed initial sizes.

Further, as described above, in some embodiments, a UI element may further move in response to the touch. In this case, after the touch ends, the UI element that moves may be restored. Specifically, all the N UI elements that move toward the touched UI element may be restored. Therefore, in some embodiments, the second UI element may be restored from a position used after the movement to a position used before the movement.

Figure 32B:
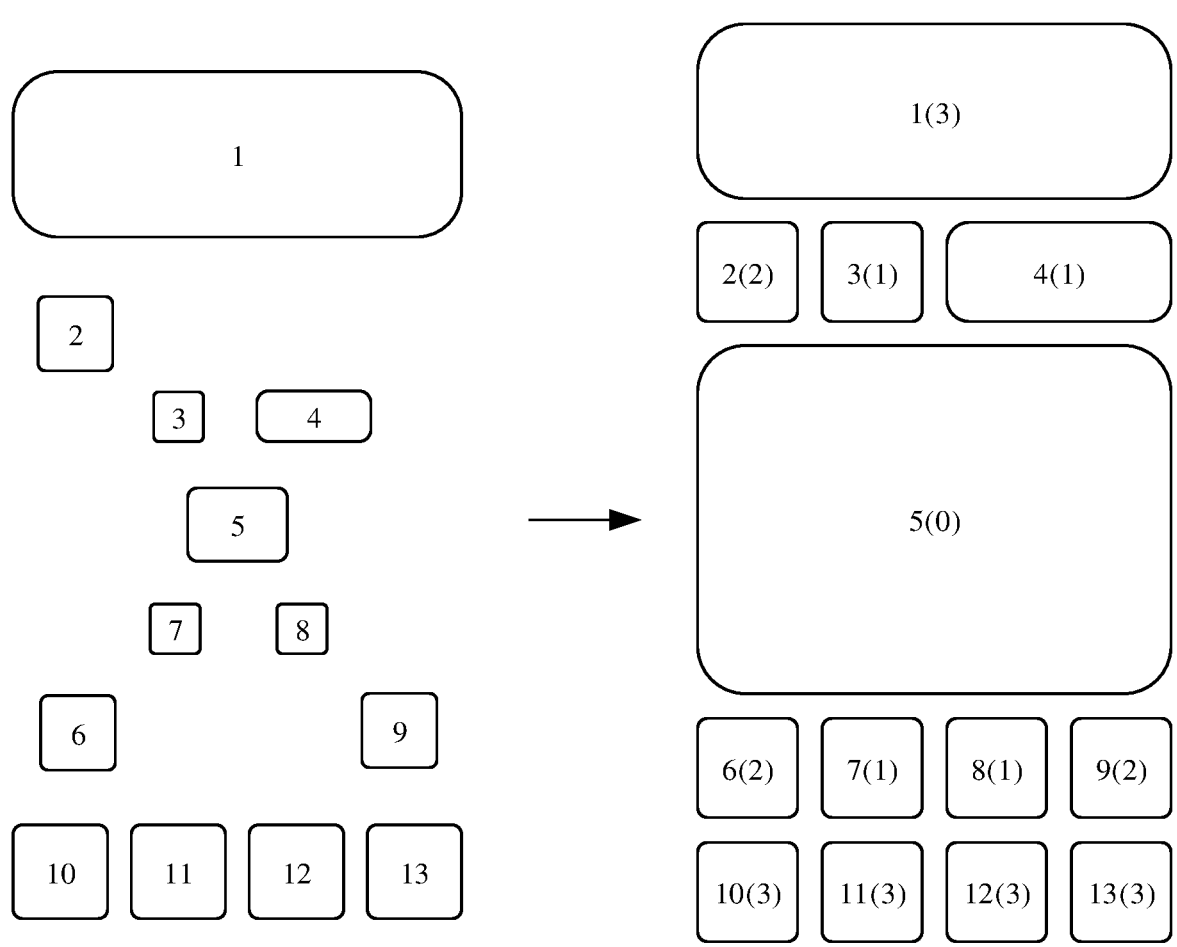

FIG. 32B is a schematic diagram of an example of restoration 3200B of a UI element with a displacement according to an embodiment of this disclosure. As shown in FIG. 32B, a zoomed UI element (for example, the UI elements 1 to 13) that moves is restored to a position used before the movement and a non-zoomed initial size.

In some embodiments, restoration from zooming or restoration from movement may have rebound effect. For example, with respect to restoration from zooming, after a user releases a hand, a size of a UI element may be first increased to be greater than an initial size, and then decreased to the initial size. In addition, with respect to restoration from movement, after a user releases a hand, a UI element that moves in linkage may first move away from a touched UI element to a position farther than an initial position used before the movement, and then return to the initial position.

Figure 33A:
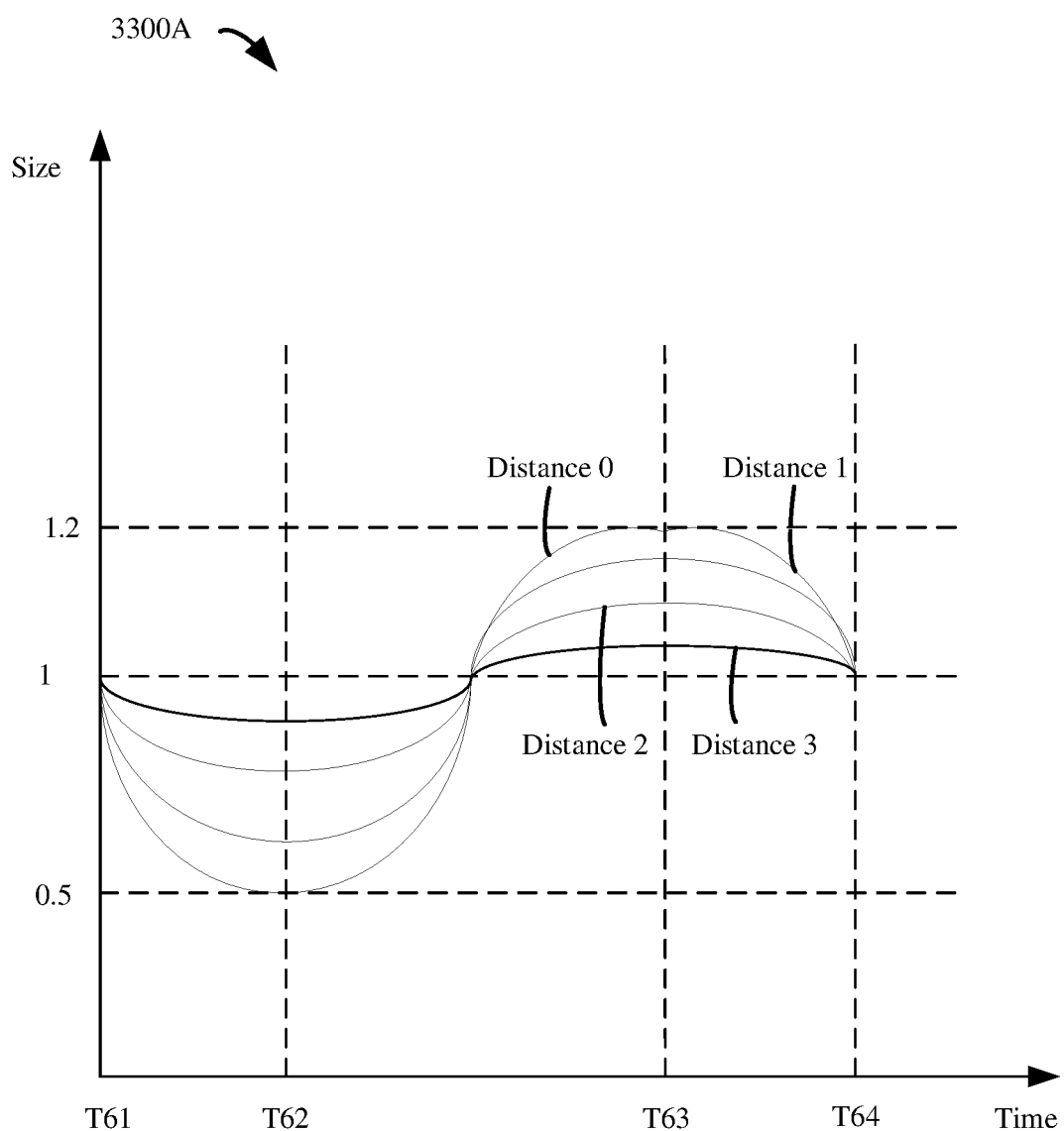
FIG. 33A and FIG. 33B are schematic diagrams of examples of a size-time curve and a displacement-time curve of restoration of a UI element with rebound effect according to an embodiment of this disclosure.
Figure 33B:
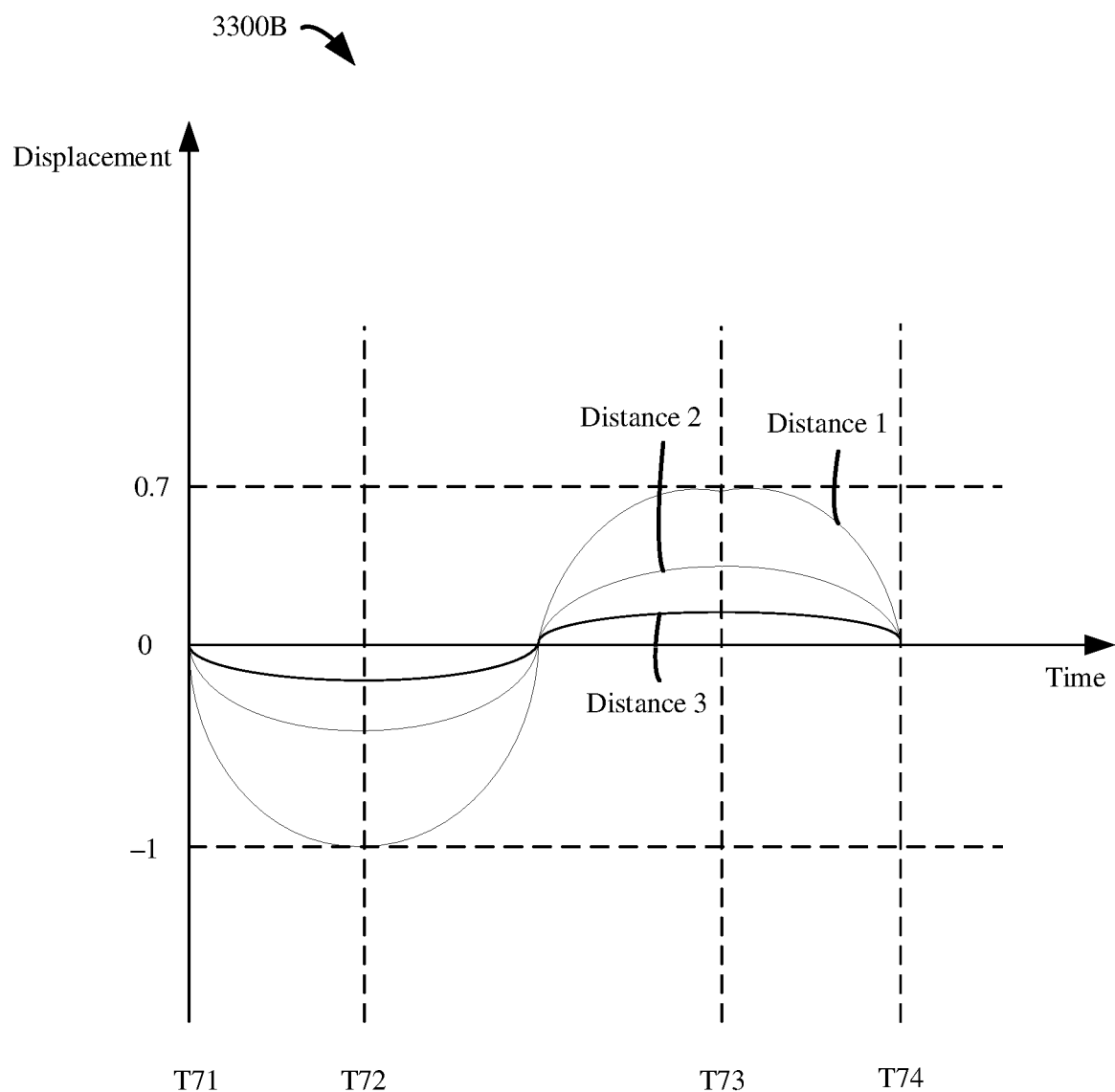

FIG. 33A and FIG. 33B are schematic diagrams of examples of a size-time curve 3300A and a displacement-time curve 3300B of restoration of a UI element with rebound effect according to an embodiment of this disclosure.

With respect to a zoom rebound, as shown in FIG. 33A, at T61, the UI element 5 is touched and zoomed out. In addition, other UI elements (for example, the UI elements 1 to 4 and 6 to 13) are also zoomed out in linkage.

At T62, a user releases a hand. In this case, the UI element 5 is zoomed out to 0.5 times of an initial size. In addition, a UI element (for example, the UI elements 3, 4, 7, and 8) at a distance of 1 is zoomed out in linkage, but a zoom-out range is less than that of the UI element 5. In addition, a UI element (for example, the UI elements 2, 6, and 9) at a distance of 2 is also zoomed out in linkage, but a zoom-out range is less than that of the UI element at a distance of 1. Further, a UI element (for example, the UI elements 1 and 10 to 13) at a distance of 3 is also zoomed out in linkage, but a zoom-out range is less than that of the UI element at a distance of 2.

At T62 to T63, the UI elements start to perform a zoom rebound.

At T63, a size of the UI element 5 is increased to 1.2 times of the initial size. In addition, the UI element (for example, the UI elements 3, 4, 7, and 8) at a distance of 1 is zoomed-in in linkage, but a zoom-in range is less than that of the UI element 5. In addition, the UI element (for example, the UI elements 2, 6, and 9) at a distance of 2 is also zoomed-in in linkage, but a zoom-in range is less than that of the UI element at a distance of 1. Further, the UI element (for example, the UI elements 1 and 10 to 13) at a distance of 3 is also zoomed-in in linkage, but a zoom-in range is less than that of the UI element at a distance of 2.

At T64, sizes of all UI elements are restored to initial sizes.

In addition, with respect to a movement rebound, as shown in FIG. 33B, at T71, the UI element 5 is touched. Other UI elements move toward the UI element 5.

At T72, a user releases a hand. In this case, a displacement of movement of a UI element (for example, the UI elements 3, 4, 7, and 8) at a distance of 1 toward the UI element 5 is −1. In addition, a UI element (for example, the UI elements 2, 6, and 9) at a distance of 2 also moves toward the UI element 5, but a displacement range is less than that of the UI element at a distance of 1. Further, a UI element (for example, the UI elements 1 and 10 to 13) at a distance of 3 also moves toward the UI element 5, but a displacement range is less than that of the UI element at a distance of 2.

At T72 to T73, the UI elements start to perform a movement rebound.

At T73, a displacement of the UI element (for example, the UI elements 3, 4, 7, and 8) at a distance of 1 exceeds an initial position and is +0.7. In addition, a displacement of the UI element (for example, the UI elements 2, 6, and 9) at a distance of 2 also exceeds an initial position, but a displacement range is less than that of the UI element at a distance of 1. Further, a displacement of the UI element (for example, the UI elements 1 and 10 to 13) at a distance of 3 also exceeds an initial position, but a displacement range is less than that of the UI element at a distance of 2.

At T74, positions of all UI elements are restored to initial positions.

It should be understood that the zoom sizes (for example, 0.5 times and 1.2 times) and the movement displacements (for example, the displacement −1 and the displacement 0.7) in FIG. 33A and FIG. 33B are merely examples, and a UI element may be slightly zoomed with any appropriate size or move by any appropriate displacement. Further, although rebound effect is shown in FIG. 33A and FIG. 33B as only one rebound, rebound effect with a plurality of rebounds may be implemented. A quantity of rebounds may be any appropriate quantity of rebounds, and this disclosure is not limited herein. In some embodiments, rebound ranges of the plurality of rebounds may decrease with time.

Figure 33C:
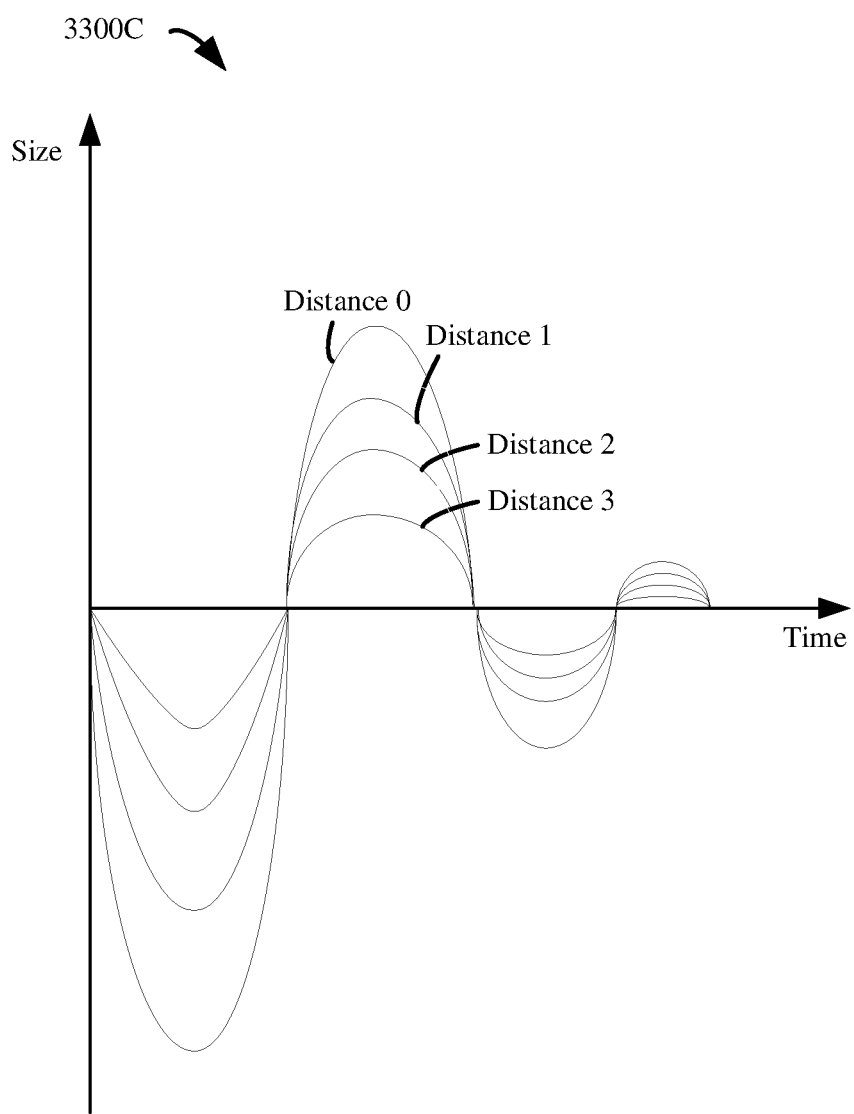
FIG. 33C and FIG. 33D are schematic diagrams of examples of a size-time curve and a displacement-time curve of restoration of a UI element with rebound effect of a plurality of rebounds with a reduced rebound range according to an embodiment of this disclosure.
Figure 33D:
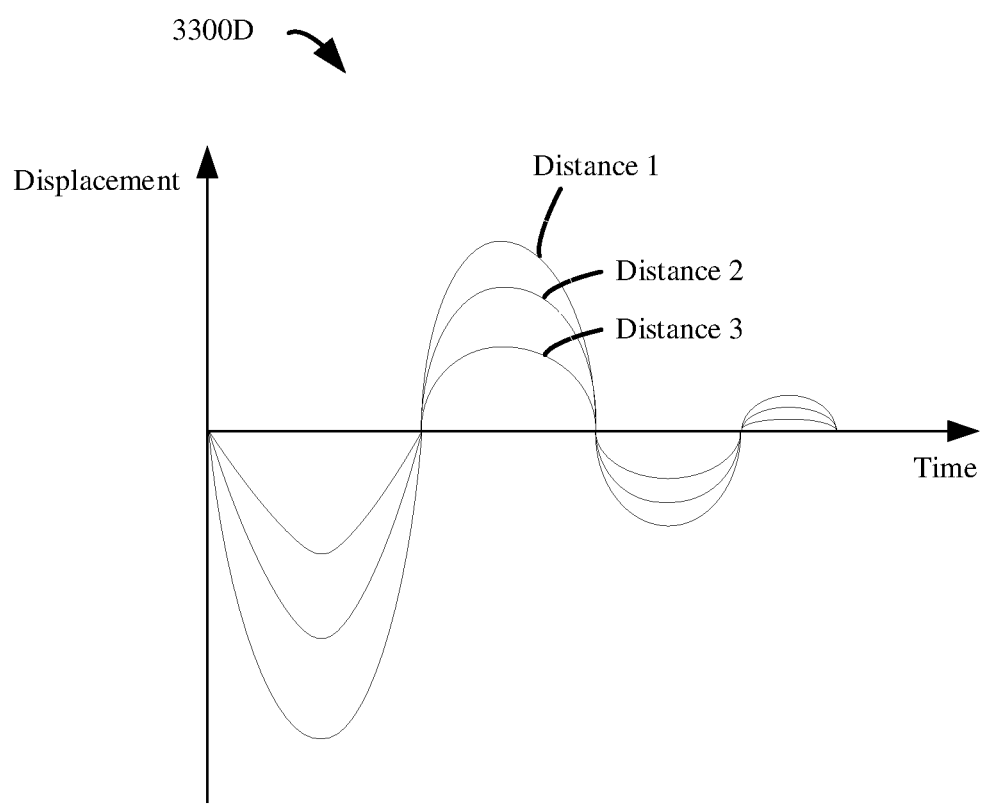

FIG. 33C and FIG. 33D are schematic diagrams of examples of a size-time curve 3300C and a displacement-time curve 3300D of restoration of a UI element with rebound effect of a plurality of rebounds with a reduced rebound range respectively according to an embodiment of this disclosure.

As shown in FIG. 33C, the UI element is restored to an initial size after a plurality of rebounds, where a zoom range of a rebound of a UI element (for example, the UI element 5) at a distance of 0 is greater than that of a UI element (for example, the UI elements 3, 4, 7, and 8) at a distance of 1. The zoom range of the rebound of the UI element at a distance of 1 is greater than that of a UI element (for example, the UI elements 2, 6, and 9) at a distance of 2. The zoom range of the rebound of the UI element at a distance of 2 is greater than that of a UI element (for example, the UI elements 1 and 10 to 13) at a distance of 3.

Similarly, as shown in FIG. 33D, the UI element is restored to an initial position after a plurality of rebounds, where a displacement range of a rebound of the UI element (for example, the UI element 5) at a distance of 0 is greater than that of the UI element (for example, the UI elements 3, 4, 7, and 8) at a distance of 1. The displacement range of the rebound of the UI element at a distance of 1 is greater than that of a UI element (for example, the UI elements 2, 6, and 9) at a distance of 2. The displacement range of the rebound of the UI element at a distance of 2 is greater than that of a UI element (for example, the UI elements 1 and 10 to 13) at a distance of 3.

Further, in some embodiments, rebound effect may alternatively be controlled by a predefined curve (for example, an elastic force curve or a Bezier curve). For example, the UI elements may perform a zoom rebound or a movement rebound with animation effect controlled by the predefined curve.

Pressure Linkage

Embodiments of this disclosure relate to linkage of animation effect in a case in which a UI element on a UI is touched. This is also referred to as pressure linkage. In pressure linkage, a touched target UI element may affect other UI elements that are not touched. Specifically, in the pressure linkage, when animation effect of the target UI element is triggered, animation effect of one or more other UI elements or even other UI elements on the entire UI may be triggered in linkage, so that all other UI elements are affected by the target UI element. For example, in the pressure linkage, when the target UI element is touched, the target UI element presents touch effect with specific animation effect, and other UI elements may also present touch effect with corresponding animation effect, to visually present a linkage touch.

In this way, association between animation effect of different UI elements can be strengthened, and a relationship between independent UI elements can be highlighted. Compared with a conventional animation in which animation effect is simple and each UI element is independent without association, in embodiments of this disclosure, animation effect can better conform to a physical rule, and a real use scenario and a use habit of a user are considered, so that user experience can be significantly improved.

The following describes some example embodiments of pressure linkage with reference to FIG. 34 to FIG. 46D.

Pressure linkage may occur on a UI with any appropriate regular or irregular layout, and a UI element on the UI may have any appropriate size and shape. For example, pressure linkage may occur on the UIs 300A to 300C shown in FIG. 3A to FIG. 3C.

A UI element on a UI may be touched. For example, when a user expects to perform an operation associated with a UI element, the user may touch the UI element. In an example, when a user expects to enter an application represented by a UI element or open a menu associated with a UI element, the user may touch the UI element. When a touch on a UI element is detected, the UI element may change with specific animation effect. For example, the UI element may visually move relative to a touch position in a seesaw (which may alternatively be referred to as rotation below) manner, or visually depress or protrude relative to the touch position, to present a touch action. In this case, the change of the UI element may conform to a point pressure model. In the point pressure model, pressure at the touch position on the UI element is greater than that at other parts.

In some embodiments, the UI element may be considered as a rigid body. In this case, when a touch on the UI element is detected, the UI element may visually move relative to a touch position in a seesaw manner, to present touch effect.

Figure 34:
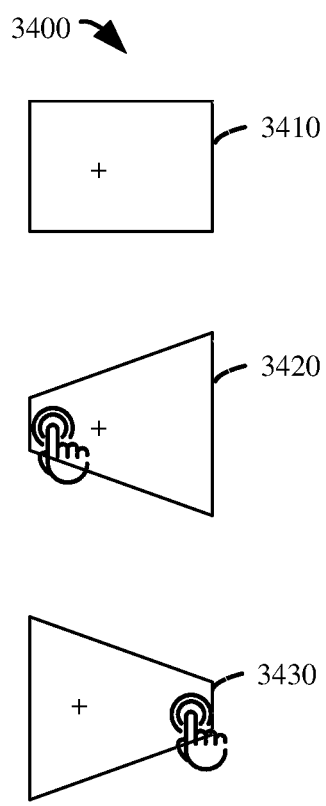
FIG. 34 is a schematic diagram of an example of a change of a UI element as a rigid body when the UI element is touched according to some embodiments of this disclosure.

FIG. 34 is a schematic diagram of an example of a change 3400 of a UI element as a rigid body when the UI element is touched according to some embodiments of this disclosure. As shown in FIG. 34, when a touch on the UI element is detected, the UI element may change from an initial shape 3410 with specific animation effect, to visually move relative to a touch position in a seesaw manner. For example, when the touch position is on the left of the UI element, the UI element visually rotates to the left around a reference point (indicated by "+") of the UI element, to change to a shape 3420. The changed shape 3420 is similar to a seesaw that is pushed down on the left and tilted on the right. In addition, when the touch position is on the right of the UI element, the UI element visually rotates to the right around the reference point of the UI element, to change to a shape 3430. The changed shape 3430 is similar to a seesaw that is tilted on the left and pushed down on the right.

In this case, the UI element may be considered as a seesaw connected to a spring on both sides, and the touch on the UI element may be considered as pressing the spring on one side and stretching the spring on the other side, to achieve overall animation effect that the UI element rotates around the reference point of the UI element.

Figure 35:
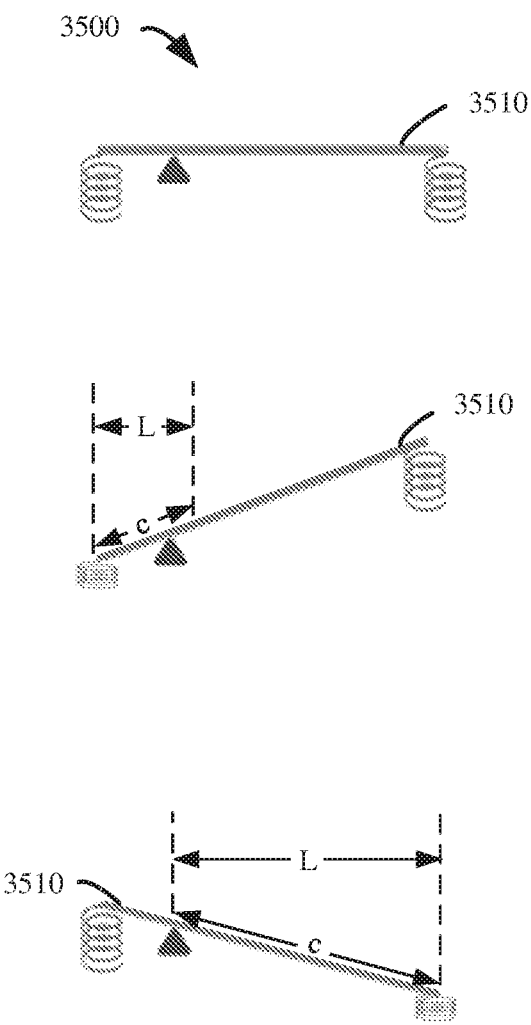
FIG. 35 is a schematic diagram of an example of pressing and stretching a spring for simulating a touch on a UI element according to some embodiments of this disclosure.

FIG. 35 is a schematic diagram of an example of pressing and stretching 3500 a spring for simulating a touch on a UI element according to some embodiments of this disclosure. FIG. 3510 shows springs in initial states on two sides. FIG. 3520 shows that, when a touch position is on the left of the UI element, a spring on the left is pressed, and a spring on the right is stretched. FIG. 3530 shows that, when a touch position is on the right of the UI element, the spring on the right is pressed, and the spring on the left is stretched.

In this case, a model of the spring may be expressed as the following equation (9):

$$k' = \frac{L}{c}, \qquad (9)$$

L indicates a horizontal distance between the touch position and the reference point of the UI element, c indicates a straight-line distance between the touch position and the reference point, and k' indicates an elasticity coefficient of the spring.

Further, the equation (9) may be transformed into the following equation (10):

$$-k'x' - g'\frac{dx'}{dT} = m'\frac{d^2x'}{dT^2}, \qquad (10)$$

k' indicates the elasticity coefficient of the spring, x' indicates a deformation amount of the spring, g' indicates a damping coefficient of the spring, T indicates time in which deformation occurs, and m' indicates a size of the UI element.

In addition, in some embodiments, the UI element may be considered as a non-rigid body. In this case, when a touch on the UI element is detected, the UI element may visually depress or protrude relative to a touch position, to present touch effect.

Figure 36:
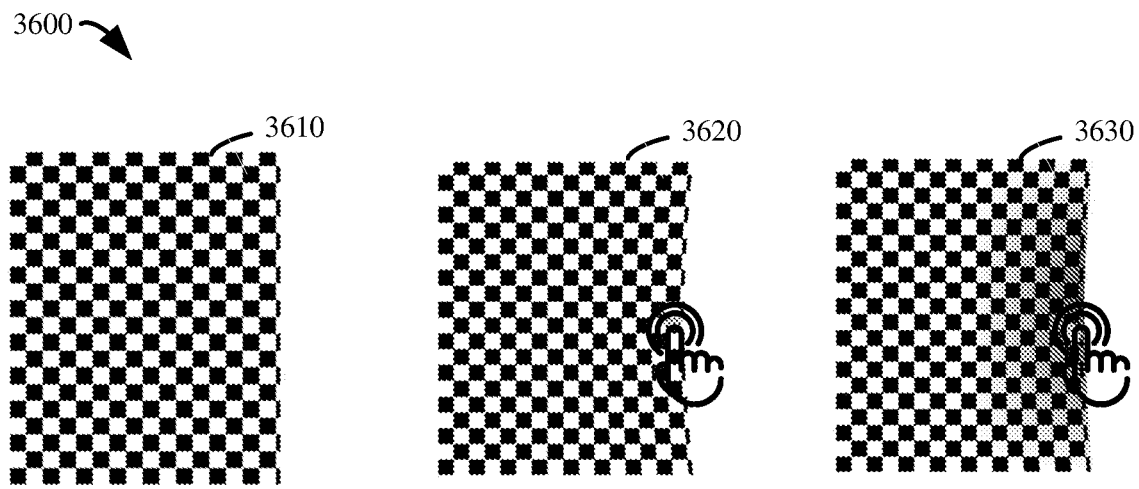
FIG. 36 is a schematic diagram of an example of a change of a UI element as a non-rigid body when the UI element is touched according to some embodiments of this disclosure.

FIG. 36 is a schematic diagram of an example of a change 3600 of a UI element as a non-rigid body when the UI element is touched according to some embodiments of this disclosure. As shown in FIG. 36, the UI element may be considered as a grid pattern. When a touch on the UI element is detected, an initial UI element 3610 may change with specific animation effect, to visually depress or protrude relative to a touch position. For example, coordinates of grids in the initial UI element 3610 may change, so that the initial UI element 3610 changes to a UI element 3620 that is concave relative to the touch position. In addition, in some embodiments, a color (for example, hue, lightness, or saturation) of the UI element may also change to highlight the touch. For example, the initial UI element 3610 may alternatively change to a UI element 3630 that is concave relative to the touch position and that has a deeper color. It should be understood that the color change is also applicable to a UI element as a rigid body.

In some embodiments, after a UI element changes, a touch position may no longer be within a range of a changed UI element. In this case, because the touch position is still within a range of the UI element that has not changed or is within any other appropriate range, the touch may still be detected as a touch on the UI element. Alternatively, because the touch position is no longer within the range of the changed UI element, the touch is not detected as a touch on the UI element. In this case, it can be considered that the touch ends.

Embodiments of this disclosure are described below by using an example in which a UI element visually moves relative to a touch position in a seesaw manner. However, it should be understood that the UI element may alternatively change in another manner, for example, visually depress or protrude relative to the touch position.

In addition, in some embodiments, to enable a change of a UI element to conform to a natural law and a use habit of a user, a change range may depend on a magnitude of a touch force. In the real world, a magnitude of a force is usually a magnitude of a real force. In this case, a larger touch force indicates a larger change of the UI element. In some embodiments, the touch force may be a touch force that is applied by a user and that is detected by an electronic device. Alternatively, the touch force may be a predetermined touch force specified by an electronic device or a user.

Figure 37:
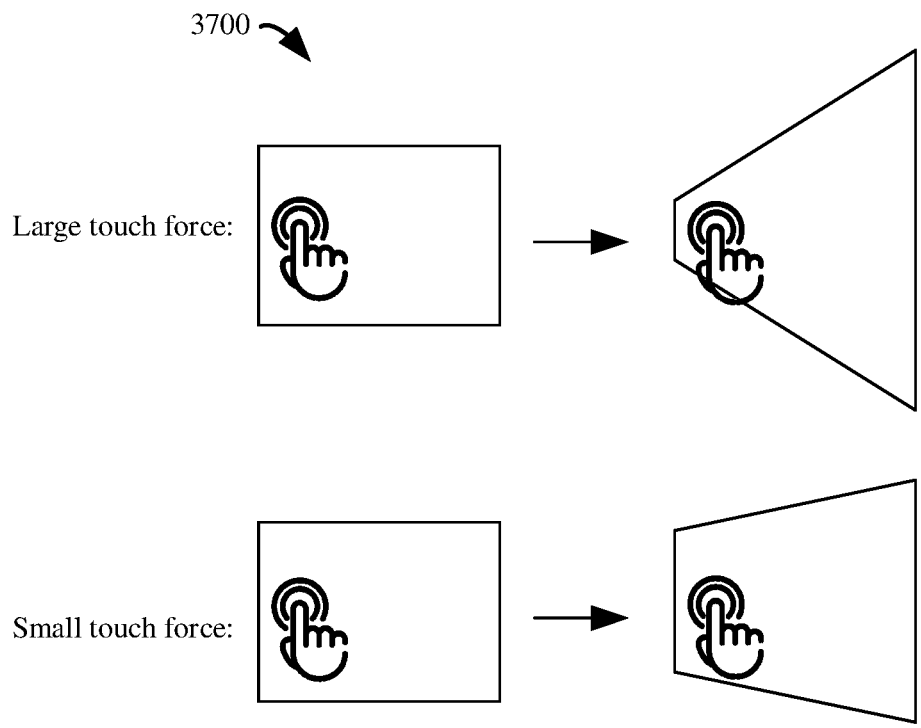
FIG. 37 is a schematic diagram of an example of changes of a UI element under different touch forces according to some embodiments of this disclosure.

FIG. 37 is a schematic diagram of an example of changes 3700 of a UI element under different touch forces according to some embodiments of this disclosure. As shown in FIG. 37, when a touch force is large, the UI element may change (for example, rotate) by a larger range. In comparison, when a touch force is small, the UI element may change by a smaller range. However, embodiments of this disclosure are not limited thereto. Change modes for the UI element in response to different touch forces may be configured by an electronic device or a user. For example, when a touch force is large, the UI element may change by a smaller range; and when a touch force is small, the UI element may change by a larger range.

Further, on an electronic device, performing a change completely based on a real touch force may impose a high user requirement, and the electronic device may need to be equipped with related hardware. Therefore, in some embodiments, a touch force may be simulated by or replaced with touch time. For example, if touch time is longer, it can be considered that a touch force is larger, and therefore a change is larger.

Figure 38:
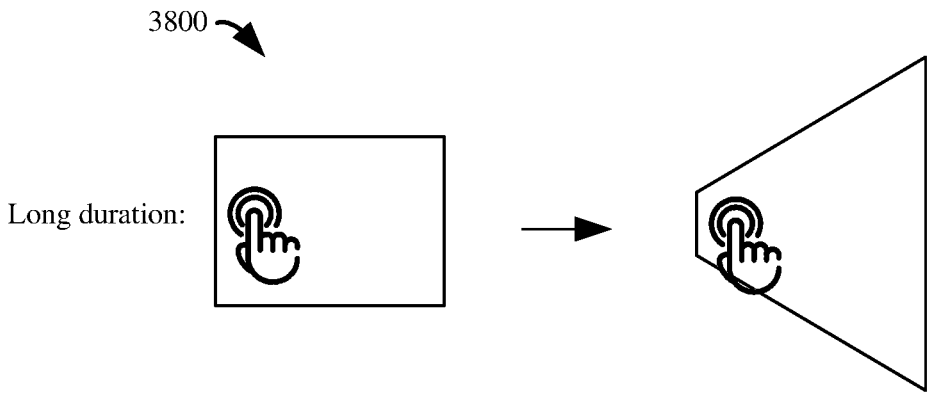
FIG. 38 is a schematic diagram of an example of changes of a UI element in the case of different touch duration according to some embodiments of this disclosure.
Figure 38:
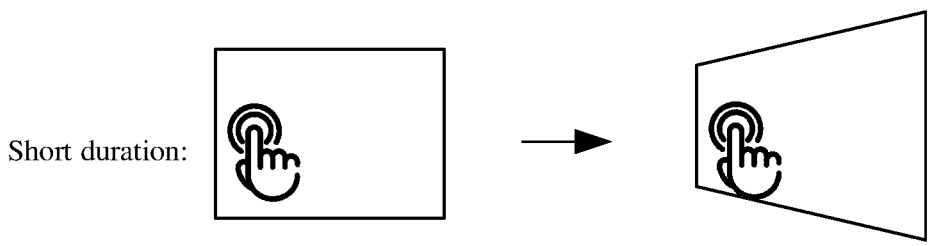

FIG. 38 is a schematic diagram of an example of changes 3800 of a UI element in the case of different touch duration according to some embodiments of this disclosure. As shown in FIG. 38, when touch duration is long, the UI element may change (for example, rotate) by a larger range. In comparison, when touch duration is short, the UI element may change by a smaller range.

However, embodiments of this disclosure are not limited thereto. Change modes for the UI element in response to different touch duration may be configured by an electronic device or a user. For example, when touch duration is long, the UI element may change by a smaller range; and when touch duration is short, the UI element may change by a larger range.

In addition, in some embodiments, to further enable a change of a UI element to conform to a natural law and a use habit of a user, a change range may depend on a size of the UI element. For example, visually, it may be difficult for a same touch to push down a larger UI element, but it may be easier for the same touch to push down a smaller UI element. In this case, a larger UI element may be less affected by the touch, and a smaller UI element may be more affected by the touch.

Figure 39:
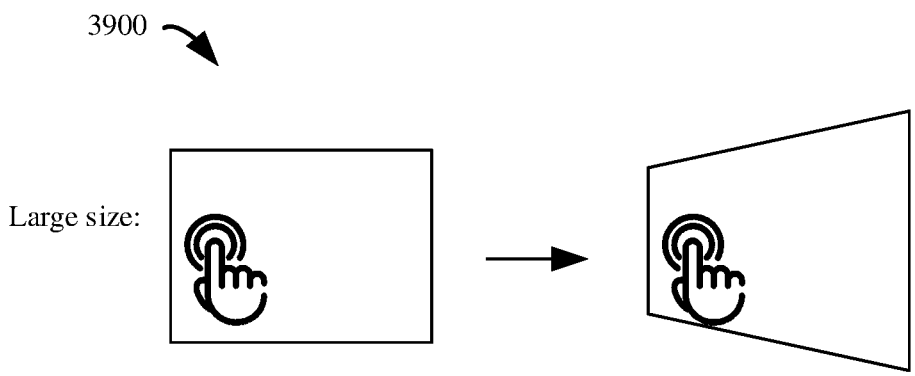
FIG. 39 is a schematic diagram of an example of changes of a UI element in different sizes according to some embodiments of this disclosure.
Figure 39:
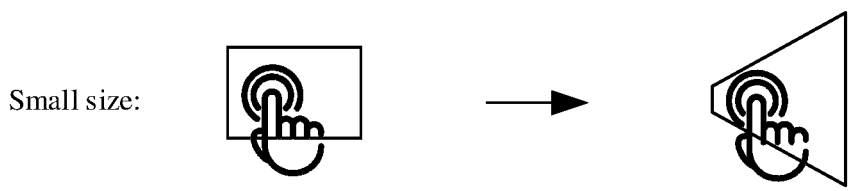

FIG. 39 is a schematic diagram of an example of changes 3900 of a UI element in different sizes according to some embodiments of this disclosure. As shown in FIG. 39, when a size of the UI element is large, the UI element may change by a larger range. In comparison, when a size of the UI element is small, the UI element may change by a smaller range.

However, embodiments of this disclosure are not limited thereto. Change modes for the UI element in different sizes may be configured by an electronic device or a user. For example, when a size of the UI element is large, the UI element may change by a smaller range; and when a size of the UI element is small, the UI element may change by a larger range.

In addition, in some embodiments, to improve user experience, a range by which a UI element can change may be limited, so that the UI element can change only within an allowed range. For example, the range may be any appropriate range. For example, a rotation angle of the UI element ranges from 0 degrees to 60 degrees, a grayscale of a color change of the UI element ranges from 10% to 50%, or a coordinate change of a grid in the UI element ranges from 100 pixels to 10000 pixels. In an example, it is assumed that, the range is that the rotation angle of the UI element ranges from 0 degrees to 60 degrees. In this case, regardless of a magnitude of a predetermined touch force and touch duration, a touched UI element can rotate only by 60 degrees around a reference point at most, and cannot rotate by a larger range.

A change of a touched UI element is described in detail above. As described above, in pressure linkage, a touched target UI element may affect other UI elements that are not touched. Specifically, in the pressure linkage, when animation effect of the target UI element is triggered, animation effect of one or more other UI elements or even other UI elements on the entire UI may be triggered in linkage, so that all other UI elements are affected by the target UI element. For example, in the pressure linkage, when the target UI element is touched within specific duration, the target UI element changes with specific animation effect, and other UI elements may also change with corresponding animation effect, to visually present a linkage touch. Therefore, pressure linkage is described in detail below with reference to FIG. 40 to FIG. 46D.

Figure 40:
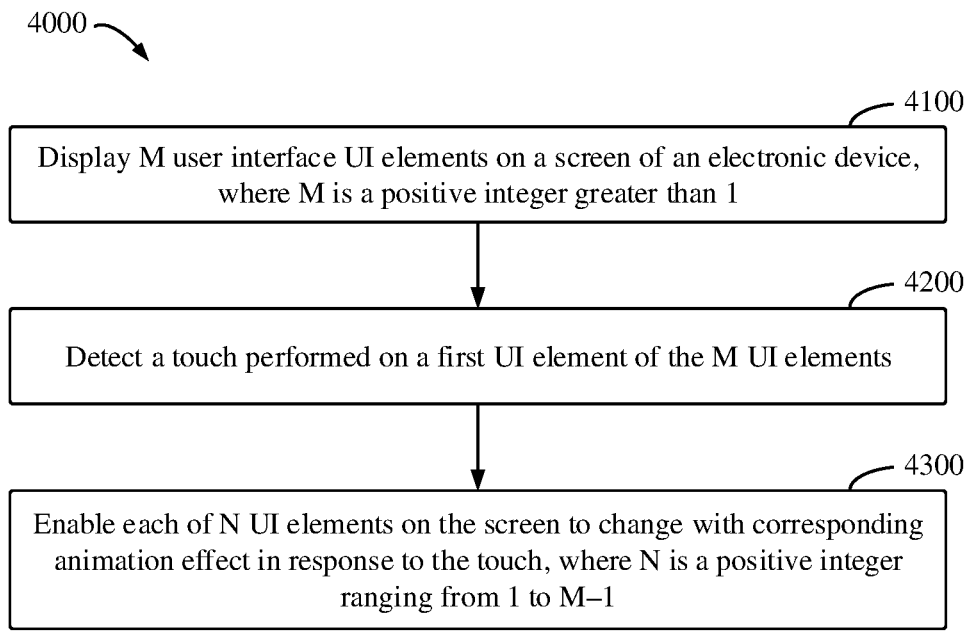
FIG. 40 is a flowchart of a graphical interface display method according to an embodiment of this disclosure.

FIG. 40 is a flowchart of a graphical interface display method 4000 according to an embodiment of this disclosure. It should be understood that the method 4000 may be performed by the electronic device 100 described with reference to FIG. 1A or FIG. 1B or the electronic device 200 described with reference to FIG. 2. The method 4000 is described herein with reference to the UI 300A in FIG. 3A. However, it should be understood that the UI 300A is merely an example, and the method 2500 is applicable to any appropriate interface, including but not limited to the UIs 300B and 300C.

At a block 4010, M user interface UI elements are displayed on a screen of the electronic device. M is a positive integer greater than 1. For example, the M UI elements may be UI elements 1 to 13.

At a block 4020, a touch on a first UI element of the M UI elements is detected. For example, the first UI element may be the UI element 5. As described above, the touch on the first UI element enables the first UI element to rotate, to present touch effect.

At a block 4030, in response to the detected touch on the first UI element, each of the N UI elements on the screen is enabled to change with corresponding animation effect. N is a positive integer ranging from 1 to M−1. Therefore, a linkage touch is visually indicated.

Figure 41:
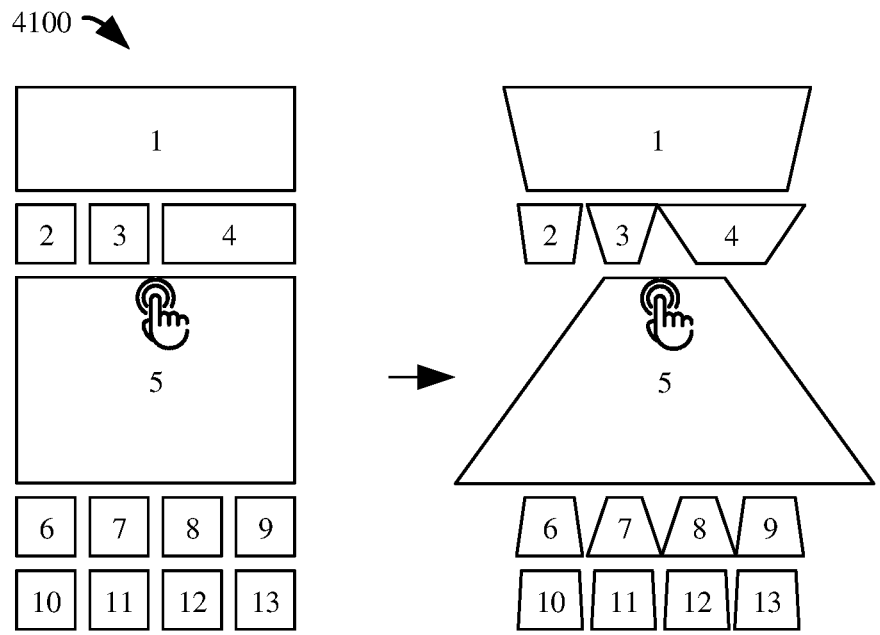
FIG. 41 is a schematic diagram of an example of pressure linkage of N UI elements according to an embodiment of this disclosure.

In some embodiments, a direction in which the N UI elements change relative to a touch position may be a direction from each of the N UI elements to the touch position. In some embodiments, the direction may be a direction from a corresponding reference point of each of the N UI elements to a reference point of the touched UI element. In this case, the touch position is a change reference point for changes of the N elements. To be specific, the touch position is visually indicated as a center of the touch. FIG. 41 is a schematic diagram of an example of pressure linkage 4000 of N UI elements according to an embodiment of this disclosure. As shown in FIG. 41, the UI element 5 is touched, so that the UI element 5 rotates to present touch effect. In addition, other UI elements (for example, the UI elements 1 to 4 and 6 to 13) on the screen also rotate by different ranges relative to a touch position in response to the touch, to present touch effect. Therefore, a linkage touch is visually presented.

Figure 42:
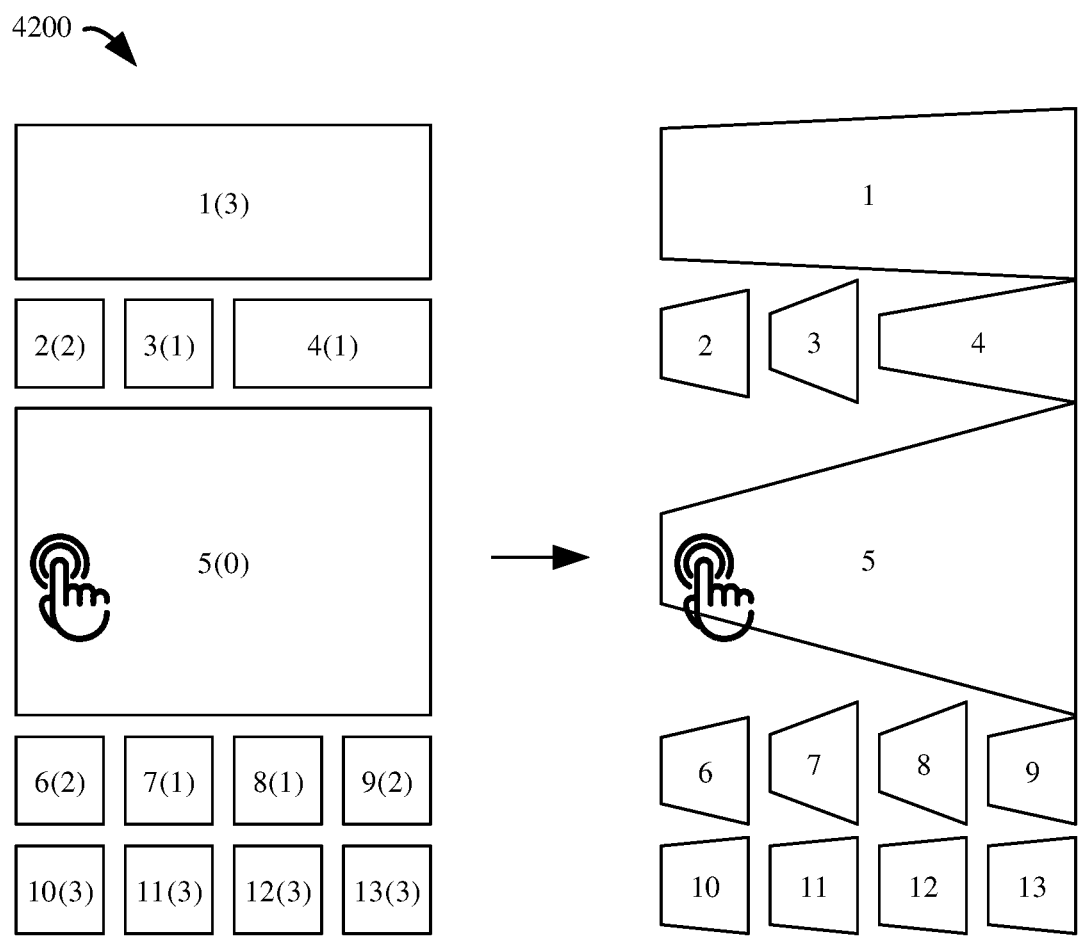
FIG. 42 is a schematic diagram of another example of pressure linkage of N UI elements according to an embodiment of this disclosure.

Alternatively, a direction in which the N UI elements change relative to the touch position may be the same as a change direction of the touched UI element. FIG. 42 is a schematic diagram of another example of pressure linkage 4000 of N UI elements according to an embodiment of this disclosure. As shown in FIG. 42, the UI element 5 is touched, so that the UI element 5 rotates to present touch effect. In addition, other UI elements (for example, the UI elements 1 to 4 and 6 to 13) on the screen also rotate by different ranges in a same direction as the UI element 5 in response to the touch, to present touch effect. In this case, change reference points of the N elements are reference points of the N elements. Therefore, a linkage touch is visually presented.

For clarity, FIG. 41 and FIG. 42 show only pressure linkage of the UI elements 1 to 13 on the UI 300A. It should be understood that the pressure linkage may occur at any at least two UI elements on any UI, for example, at any at least two UI elements on the UIs 300A to 300C.

In some embodiments, the pressure linkage may be applied to all UI elements on the screen. In this case, it may be determined that M−1 UI elements of the M UI elements other than the first UI element are the N UI elements. Alternatively, the pressure linkage may be applied only to some UI elements on the screen. In this case, an affected region of the first UI element may be determined based on a size of the first UI element, and it is determined that a UI element, in the affected region, of the M UI elements is the N UI elements. For example, a larger size of the first UI element may indicate a larger affected region of the first UI element. Alternatively, the affected region may alternatively be narrowed with the size, and this disclosure is not limited herein. For example, the affected region may be a circle that uses a reference point of the first UI element as a center and that has a predetermined radius. It should be understood that the affected region may be any appropriate region in any shape, for example, a rectangular shape or a rhombic shape with a predetermined size. The affected region may be configured by an electronic device and a user, and this disclosure is not limited herein.

In addition, in some embodiments, a UI element that intersects the affected region may be considered to be within the affected region. Alternatively, when the affected region is a circle with a predetermined radius, if a distance between a UI element and the first UI element is less than the predetermined radius of the affected region, the UI element may be considered to be within the affected region.

Figure 43:
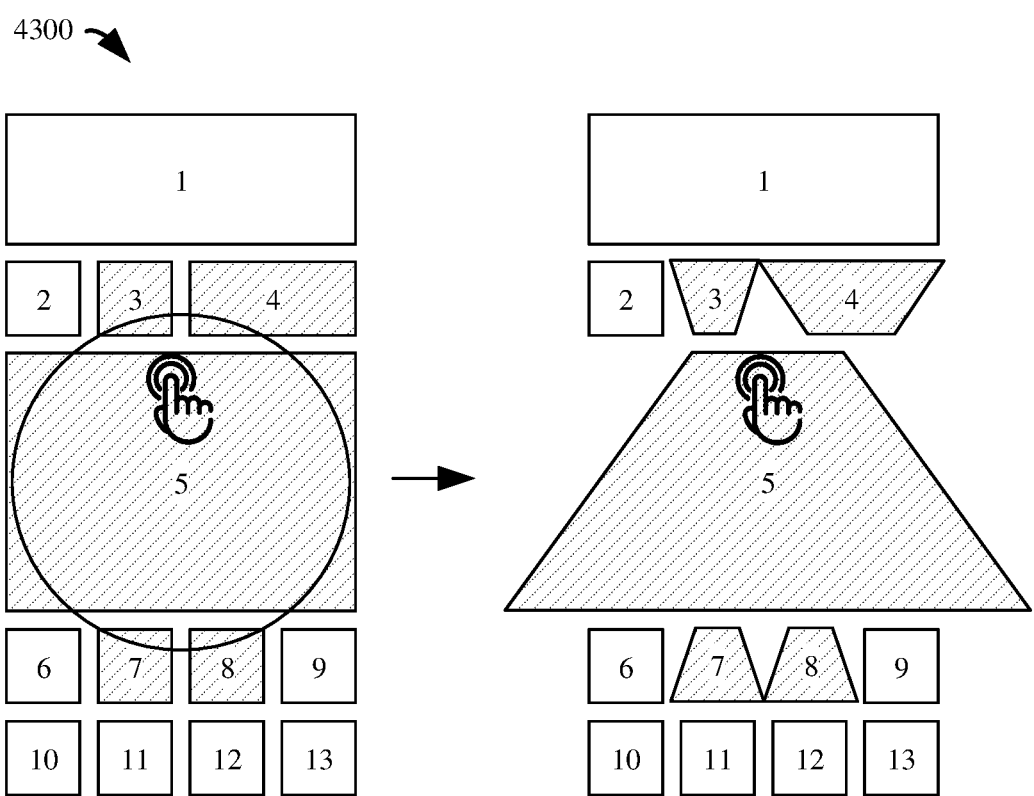
FIG. 43 is a schematic diagram of an example affected region of a UI element according to an embodiment of this disclosure.

FIG. 43 is a schematic diagram of an example affected region 4300 of a UI element according to an embodiment of this disclosure. As shown in FIG. 43, because the UI elements 3, 4, 7, and 8 are in an affected region 4310 of the UI element 5, the UI elements 3, 4, 7, and 8 change in linkage with the UI element 5. In addition, because the UI elements 1, 2, 6, and 9 to 13 are not in the affected region 4310 of the UI element 5, the UI elements 1, 6, and 9 to 13 do not change in linkage with the UI element 5.

Still as shown in FIG. 40, to enable the N UI elements to change with corresponding animation effect, a distance between the first UI element and each of the N UI elements may be determined. As described above, in some embodiments, distances may be classified into a plurality of distance levels based on ranges to which the distances belong. For example, a UI element on which an operation is performed may belong to a distance level 0; UI elements of UI elements in linkage may belong to distance levels 1, 2, 3, . . . , based on corresponding distances between the UI elements and the UI element on which the operation is performed; and UI elements belonging to a same distance level may be considered as having a same distance. Therefore, linkage between UI elements can be simplified based on a distance level, so that UI elements belonging to a same distance level are linked in a same manner, to improve uniformity and coordination of linkage. However, it should be understood that a distance may alternatively be used in linkage, so that UI elements are more precisely linked. A distance level may be interchangeably referred to as a distance.

A manner of determining a distance between the first UI element and a second UI element of the N UI elements is described above with reference to FIG. 10 to FIG. 14B. Therefore, descriptions thereof are omitted herein.

Still as shown in FIG. 40, after the distance between the first UI element and the second UI element is determined, animation effect of a change of the second UI element may be determined based on the distance. For example, a larger distance between the first UI element and the second UI element may indicate a smaller change range of the second UI element, to visually indicate that impact of the touch on a remote UI element decreases. Alternatively, a larger distance between the first UI element and the second UI element may indicate a larger change range of the second UI element, to visually indicate that impact of the touch on a remote UI element increases.

In some embodiments, to determine the change range of the second UI element, a first range by which the first UI element is to change in response to the touch may be determined. In some embodiments, the first range by which the first UI element is to change may be determined based on various factors associated with the first UI element. The factors may include but are not limited to a size of the first UI element, a position of a first reference point of the first UI element, a range within which the first UI element is capable of changing, the touch position, the touch duration, and the predetermined touch force. Impact of the factors on a change range of a UI element is described in detail above. Therefore, descriptions thereof are omitted herein.

Then a range by which the second UI element is to change in response to the touch may be determined based on the first range and the distance between the first UI element and the second UI element. How to transfer the change range of the first UI element to the second UI element to obtain the change range of the second UI element may be implemented in the transfer manner described in detail above. A difference lies in that, in pressure linkage, $x''$ in the transfer equations (7) and (8) indicates a change range of a UI element (for example, the second UI element) that changes in linkage, and x indicates a change range of a touched UI element (for example, the first UI element). Therefore, descriptions thereof are omitted herein.

In this way, because the change range of the second UI element is determined based on the change range of the first UI element and the distance between the second UI element and the first UI element, clear and natural pressure linkage that conforms to a use habit of a user can be implemented.

In addition, in some embodiments, the size of the second UI element may also affect animation effect of a change of the second UI element. In this case, the size of the second UI element may also be considered to determine the animation effect of the change of the second UI element. For example, a larger second UI element may indicate a larger change range of the second UI element. Alternatively, a larger second UI element may indicate a smaller change range of the second UI element. Therefore, in some embodiments, the range by which the second UI element is to change in response to the touch may be determined based on the first range, the distance, and the size of the second UI element.

In addition, in some embodiments, the size of the first UI element may also affect the animation effect of the change of the second UI element. In this case, the size of the first UI element may also be considered to determine the animation effect of the change of the second UI element. For example, a larger size of the first UI element indicates larger linkage impact that may be generated by the first UI element. Therefore, the change range of the second UI element may be directly proportional to the size of the first UI element. Therefore, in some embodiments, the range of the second UI element may be determined based on the first range, the distance, and the size of the first UI element.

Further, as described above, both the size of the first UI element and the size of the second UI element may affect the animation effect of the change of the second UI element. Therefore, in some embodiments, the change range of the second UI element may be determined based on the first range, the distance, the size of the first UI element, and the size of the second UI element.

Still as shown in FIG. 40, after the animation effect of the change of the second UI element is determined, the second UI element may be enabled to change with the animation effect, to visually indicate that the second UI element changes as the first UI element is touched. The N UI elements may change with respective animation effect, to visually indicate a touch on the entire screen or in some regions of the screen, and present touch linkage.

Figure 44:
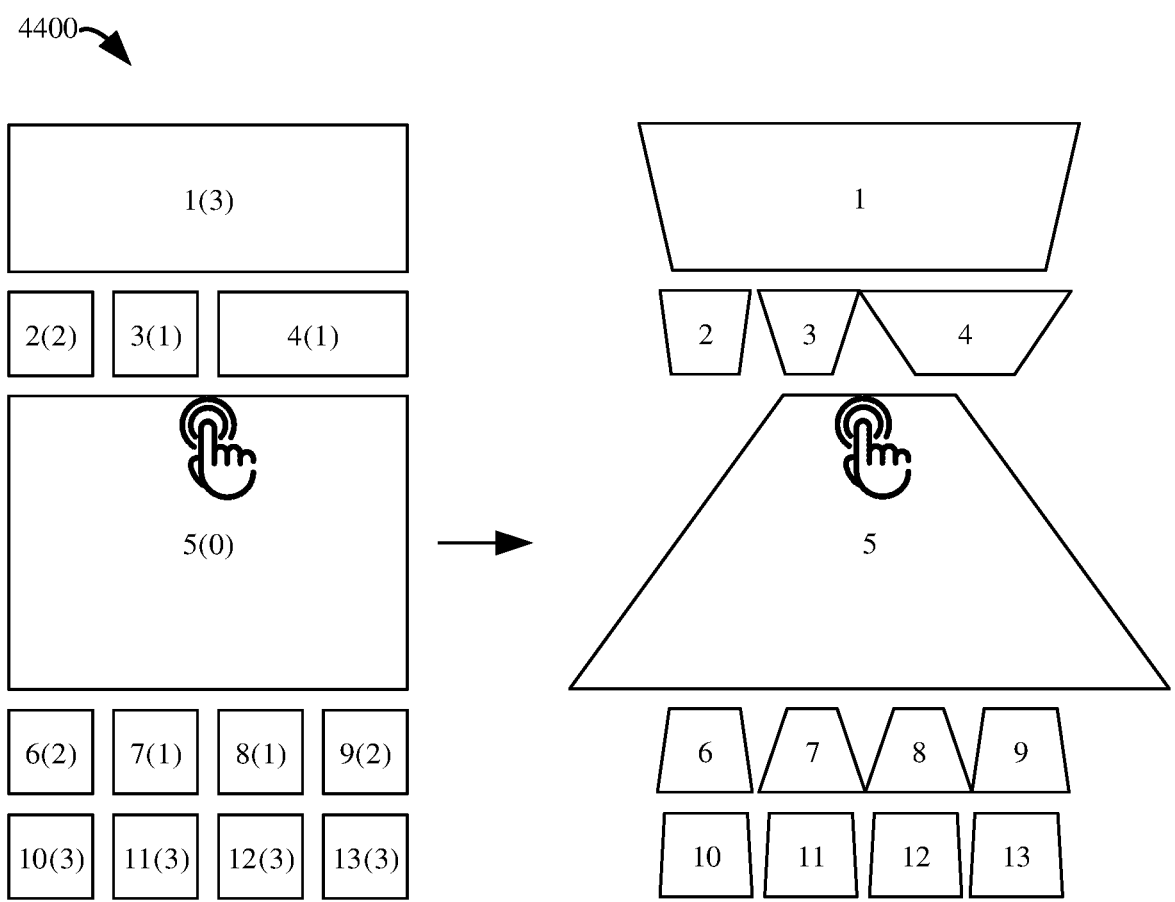
FIG. 44 is a schematic diagram of an example of a change of a UI element based on a distance according to an embodiment of this disclosure.

FIG. 44 is a schematic diagram of an example of a change 4400 of a UI element based on a distance according to an embodiment of this disclosure. As shown in FIG. 4400, a change range of a UI element (for example, the UI element 5) at a distance of 0 is greater than that of a UI element (for example, the UI elements 3, 4, 7, and 8) at a distance of 1, the change range of the UI element at a distance of 1 is greater than that of a UI element (for example, the UI elements 2, 6, and 9) at a distance of 2, and the change range of the UI element at a distance of 2 is greater than that of a UI element (for example, the UI elements 1 and 10 to 13) at a distance of 3.

In addition, in some embodiments, to better present transfer of animation effect and improve user experience, the first UI element and the second UI element do not start to change at the same time. For example, the first UI element may start to change when the touch occurs, and the second UI element may start to change after the touch occurs for a period of time. Therefore, in some embodiments, delay time may be determined based on the distance between the first UI element and the second UI element, and the second UI element is enabled to change in response to that the delay time elapses after the touch occurs. Further, in some embodiments, a delay coefficient may be determined, and delay time is determined based on the distance and the delay coefficient. For example, the delay time may be a quotient obtained by dividing the distance by the delay coefficient. The delay coefficient may be configured by an electronic device or a user.

Figure 45:
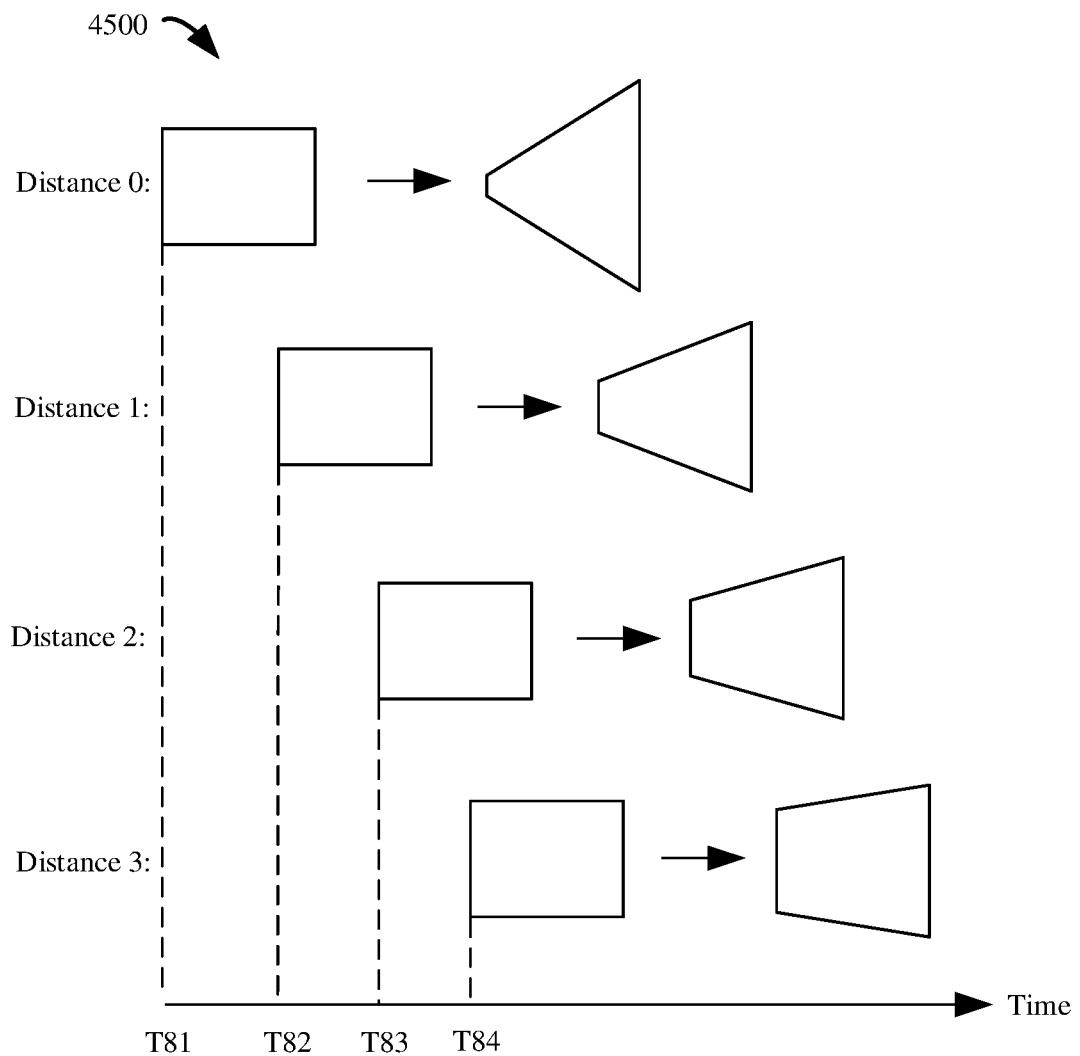
FIG. 45 is a schematic diagram of example delay time according to an embodiment of this disclosure.

FIG. 45 is a schematic diagram of example delay time 4500 according to an embodiment of this disclosure. As shown in FIG. 45, the first UI element (for example, the UI element 5) at a distance of 0 starts to change at time T81 at which the touch occurs, a UI element (for example, the UI elements 3, 4, 7, and 8) at a distance of 1 starts to change at time T82 later than the time T81, a UI element (for example, the UI elements 2, 4, 6, and 9) at a distance of 2 starts to change at later time T83, and a UI element (or example, the UI elements 1 and 10 to 13) at a distance of 3 starts to change at latest T84.

In addition, in some embodiments, a change velocity of a UI element may be controlled by a predefined curve of a range varying with time. For example, the predefined curve may be a Bezier curve or an elastic force curve. When an elastic force curve is used, a change velocity may be controlled by controlling a damping coefficient and a stiffness coefficient of a spring. When a Bezier curve is used, a change velocity may be controlled by controlling coordinates of at least one of at least one control point of the Bezier curve.

In addition, in some embodiments, a changed UI element may be restored after the touch ends (for example, after a user lifts a hand away from the screen). Specifically, both the touched UI element and the N UI elements that change in linkage may be restored. Therefore, in some embodiments, a changed second UI element may be restored to the non-changed second UI element. A restoration process may be an inverse process of changing. Therefore, detailed descriptions thereof are omitted herein.

Figure 46A:
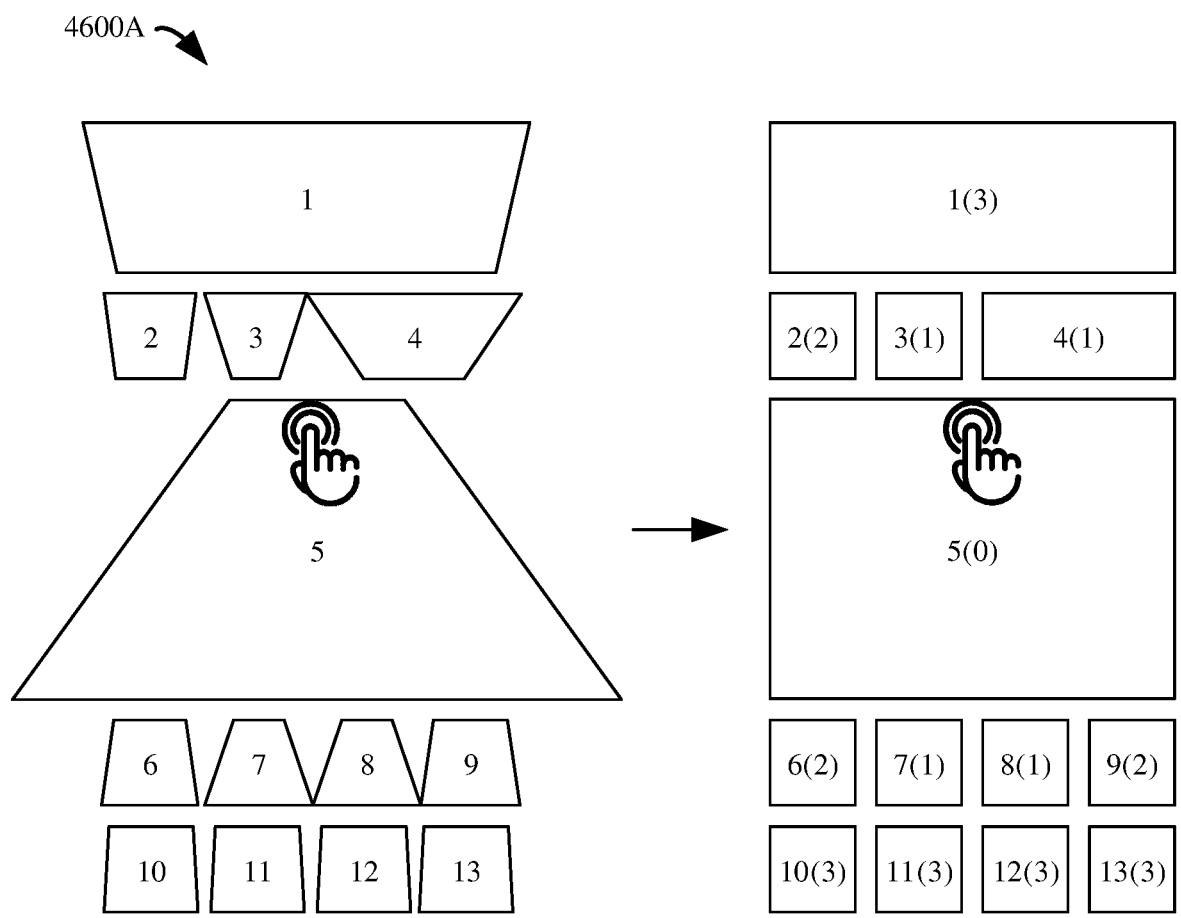
FIG. 46A is a schematic diagram of an example of restoration of a UI element according to an embodiment of this disclosure.

FIG. 46A is a schematic diagram of an example of restoration 4600 of a UI element according to an embodiment of this disclosure. As shown in FIG. 46A, all changed UI elements (for example, UI elements 1 to 13) are restored to non-changed forms.

In some embodiments, restoration from a change may have rebound effect. For example, after the user releases the hand, a change of a UI element may change from being pushed down on the left side and being tilted on the right to being tilted on the left and being pushed down on the right, and then the UI element changes to an initial shape. In other words, after the user releases the hand, effect that the UI element is restored after being flipped is visually presented.

Figure 46B:
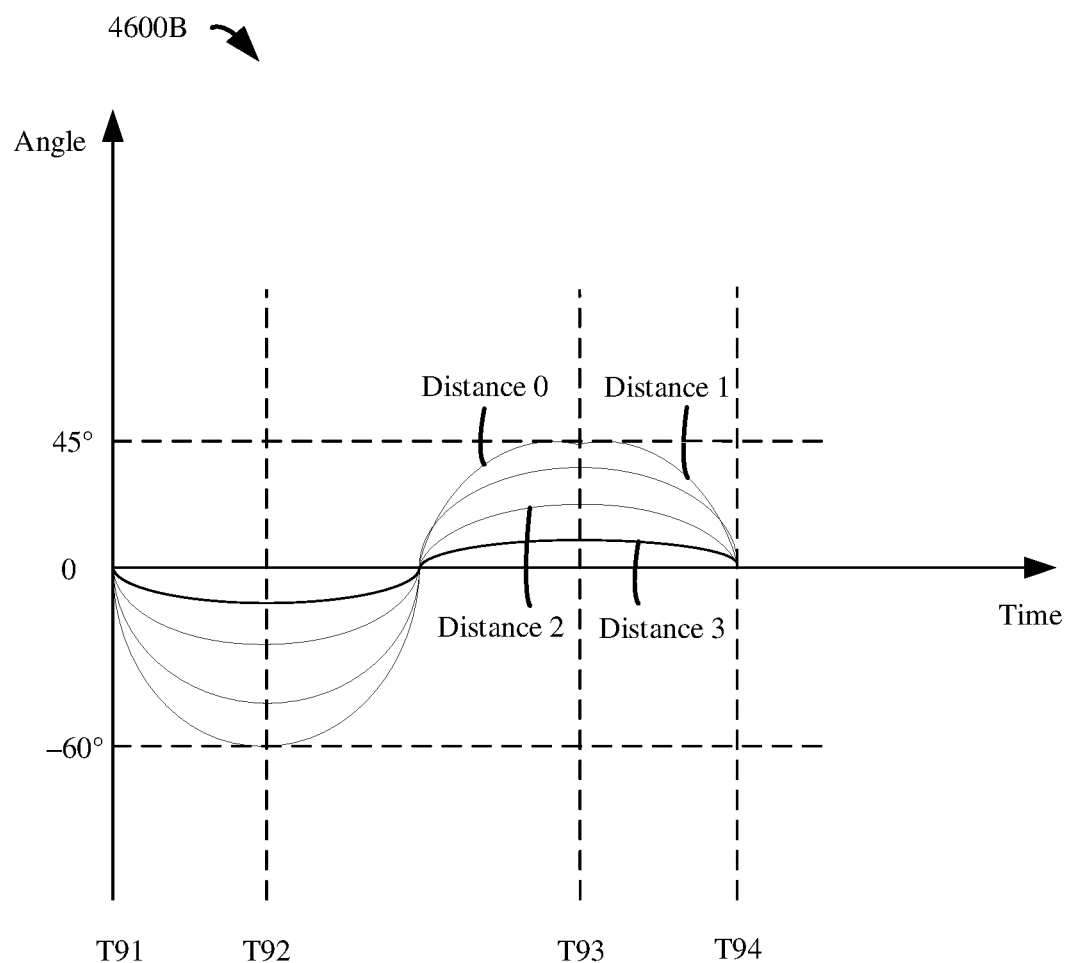
FIG. 46B is a schematic diagram of an example angle-time curve of restoration of a UI element with rebound effect according to an embodiment of this disclosure.

FIG. 46B is a schematic diagram of an example angle-time curve 4600B of restoration of a UI element with rebound effect according to an embodiment of this disclosure.

As shown in FIG. 46B, at T91, the UI element 5 is touched and then changes. For example, the UI element 5 is touched on the left and therefore rotates around a reference point of the UI element 5. Specifically, the UI element 5 is pushed down on the left and is tilted on the right. In addition, other UI elements (for example, the UI elements 1 to 4 and 6 to 13) also change in linkage.

At T92, a user releases a hand. In this case, a rotation angle of the UI element 5 is −60°. In addition, a UI element (for example, the UI elements 3, 4, 7, and 8) at a distance of 1 rotates in linkage, but a rotation range is less than that of the UI element 5. In addition, a UI element (for example, the UI elements 2, 6, and 9) at a distance of 2 also rotates in linkage, but a rotation range is less than that of the UI element at a distance of 1. Further, a UI element (for example, the UI elements 1 and 10 to 13) at a distance of 3 also rotates in linkage, but a rotation range is less than that of the UI element at a distance of 2.

At T92 to T93, the UI elements start to perform a rotation rebound.

At T93, a rotation rebound angle of the UI element 5 is 45°. In addition, the UI element (for example, the UI elements 3, 4, 7, and 8) at a distance of 1 performs a rotation rebound in linkage, but a rotation rebound range is less than that of the UI element 5. In addition, the UI element (for example, the UI elements 2, 6, and 9) at a distance of 2 also performs a rotation rebound in linkage, but a rotation rebound range is less than that of the UI element at a distance of 1. Further, the UI element (for example, the UI elements 1 and 10 to 13) at a distance of 3 also performs a rotation rebound in linkage, but a rotation rebound range is less than that of the UI element at a distance of 2.

At T94, all UI elements are restored to initial shapes. In other words, rotation angles of all the UI elements are restored to 0°.

It should be understood that the rotation angle in FIG. 46B is merely an example, and a UI element may change in any appropriate pattern. Further, although rebound effect is shown in FIG. 46B as only one rebound, rebound effect with a plurality of rebounds may be implemented. A quantity of rebounds may be any appropriate quantity of rebounds, and this disclosure is not limited herein. In some embodiments, rebound ranges of the plurality of rebounds may decrease with time.

Figure 46C:
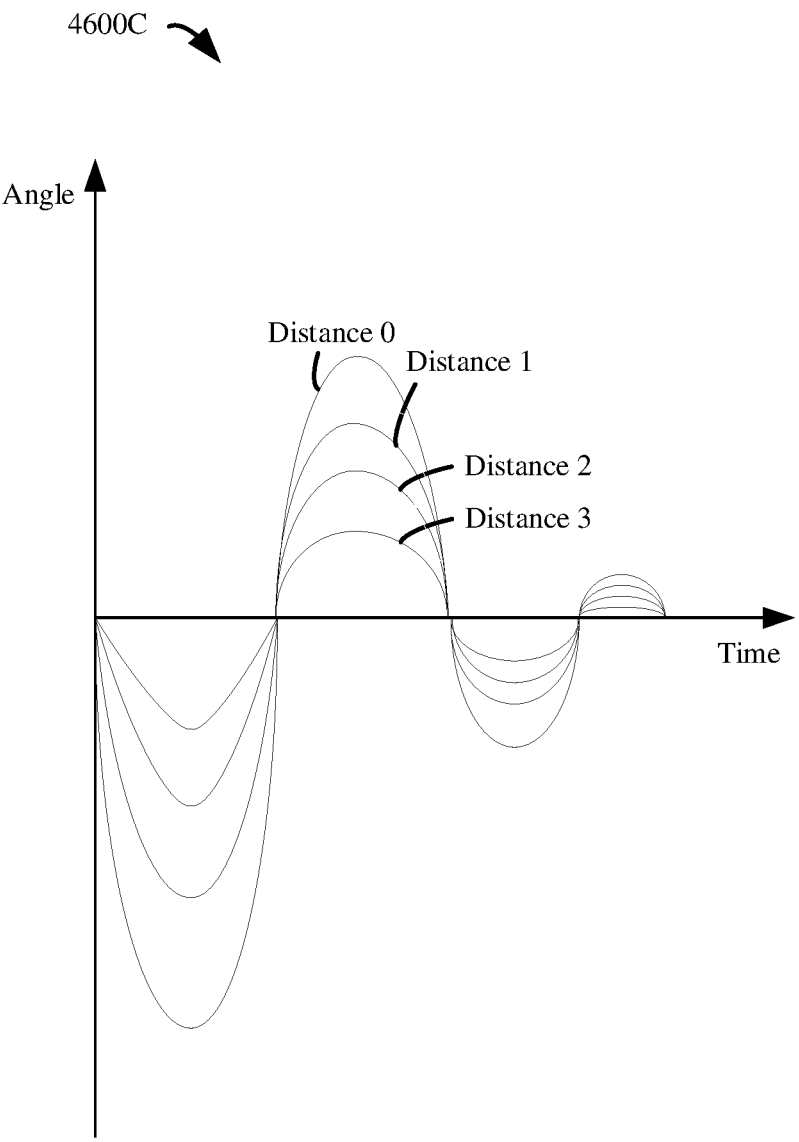
FIG. 46C is a schematic diagram of an example angle-time curve of restoration of a UI element with rebound effect of a plurality of rebounds with a reduced rebound range according to an embodiment of this disclosure.

FIG. 46C is a schematic diagram of an example angle-time curve 4600C of restoration of a UI element with rebound effect of a plurality of rebounds with a reduced rebound range according to an embodiment of this disclosure.

As shown in FIG. 46C, the UI element is restored to an initial shape after a plurality of rebounds, where a rotation range (for example, a rotation angle) of a rebound of a UI element (for example, the UI element 5) at a distance of 0 is greater than that of a UI element (for example, the UI elements 3, 4, 7, and 8) at a distance of 1. The rotation range of the rebound of the UI element at a distance of 1 is greater than that of a UI element (for example, the UI elements 2, 6, and 9) at a distance of 2. The rotation range of the rebound of the UI element at a distance of 2 is greater than that of a UI element (for example, the UI elements 1 and 10 to 13) at a distance of 3.

Further, in some embodiments, rebound effect may alternatively be controlled by a predefined curve (for example, an elastic force curve or a Bezier curve). For example, the UI elements may perform a change rebound with animation effect controlled by the predefined curve.

The following describes an animation implementation principle and a system architecture of linkage provided in embodiments of this disclosure.

Figure 47:
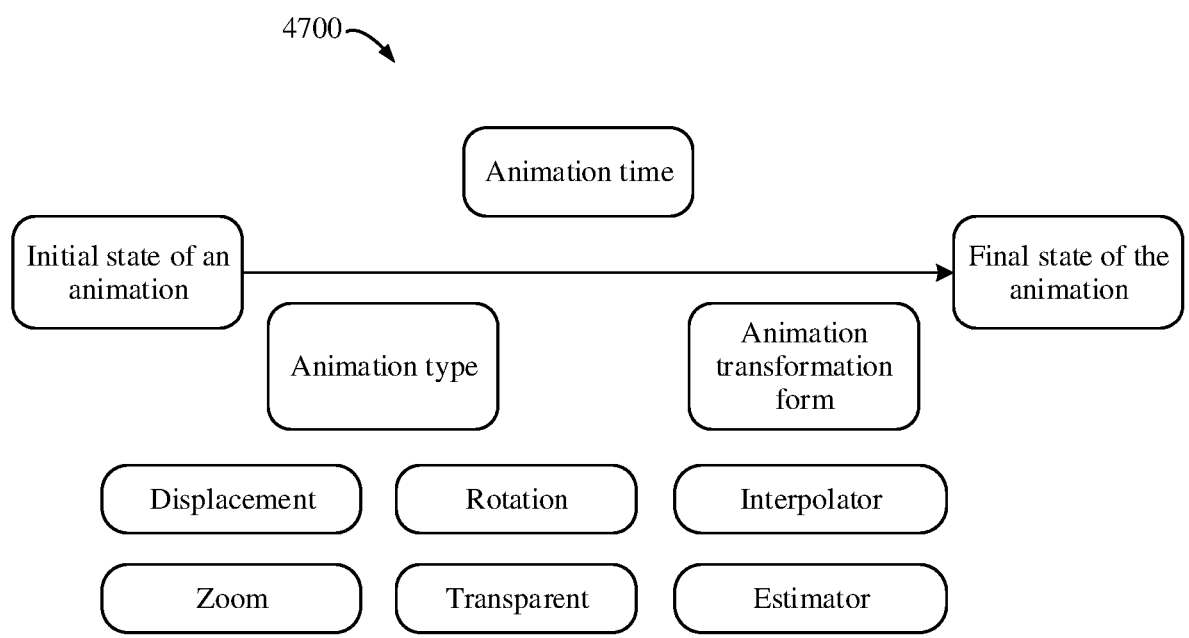
FIG. 47 is a diagram of an animation implementation principle according to an embodiment of this disclosure.

FIG. 47 is a diagram 4700 of an animation implementation principle according to an embodiment of this disclosure. As described above, an animation is essentially real-time display of a UI or a UI element based on a refresh rate. According to a principle of persistence of vision of human beings, a user feels that an image is moving. As shown in FIG. 47, the animation is transformed from an initial state of the animation to a final state of the animation after time of the animation elapses. During the transformation, the animation may be controlled based on an animation type and an animation transformation form. For example, the animation type may include a displacement animation, a rotation animation, a zoom animation, and a transparent animation. The animation transformation form may be controlled by controllers such as an interpolator and an estimator. The controllers may be configured to control a transformation velocity of the animation during the time of the animation.

Specifically, the interpolator is configured to set change logic for a transition of an animation attribute value from an initial state to a final state, to control a change rate of the animation, so that the animation can change at one or more rates of a uniform velocity, an acceleration, a deceleration, a parabolic rate, and the like.

In some embodiments, the electronic device 100 may set the change logic for the animation attribute value based on a system interpolator or a user-defined interpolator (for example, an elastic force interpolator or a friction interpolator). When the animation runs and the electronic device 100 determines, based on the change logic, that the animation attribute value changes, the electronic device 100 draws an image frame based on the animation attribute value, and refreshes a view.

In some embodiments, when the electronic device 100 determines, based on the change logic of the interpolator, that the animation attribute value changes, the electronic device 100 calls an invalidate( ) function to refresh a view based on the animation attribute value, to be specific, calls an onDraw( ) function to re-draw and display a view.

In some embodiments, the electronic device 100 customizes an elastic force interpolator. For example, parameters of a function of the elastic force interpolator include at least a stiffness (stiffness) coefficient and a damping (damping) coefficient. In an example, function code of the elastic force interpolator may be expressed as one of the following: "SpringInterpolator(float stiffness, float damping)", "SpringInterpolator(float stiffness, float damping, float endPos)", "SpringInterpolator(float stiffness, float damping, float endPos, float velocity)", and "SpringInterpolator(float stiffness, float damping, float endPos, float velocity, float valueThreshold)".

The parameter endPos indicates a relative displacement, to be specific, a difference between an initial position and a static position of a spring. In some embodiments, endPos may indicate a relative displacement of a UI element.

The parameter velocity indicates an initial velocity. In some embodiments, velocity may indicate an initial velocity of a UI element.

The parameter valueThreshold indicates a threshold for determining whether an animation stops. When a difference between displacements (or other attributes) of two adjacent frames is less than the threshold, the animation stops running. A larger threshold indicates that an animation is easier to stop and has shorter running time. A smaller threshold indicates that an animation has longer running time. A value of the threshold may be set based on a specific animation attribute. In some embodiments, the parameter FloatValue-Hold of the elastic interpolator is 1/1000 by default, and a value of the threshold is 1 in another construction method. In some embodiments, when the threshold is customized, recommended values shown in Table 1 may be used based on an animation attribute.

TABLE 1

| Animation attribute | valueThreshold |
| --- | --- |
| ROTATION/ROTATION_X/ROTATION_Y | 1/10 |
| ALPHA | 1/256 |
| SCALE_X/SCALE_Y | 1/500 |
| TRANSLATION_Y/TRANSLATION_X | 1 |

In addition, the threshold may alternatively be directly set to the following constants provided by a DynamicAnimation class: MIN_VISIBLE_CHANGE_PIXELS, IN_VISIBLE_CHANGE_ROTATION_DEGREES, MIN_VISIBLE_CHANGE_ALPHA, and MIN_VISIBLE_CHANGE_SCALE.

In an example, specific code for using an animation class of a customized elastic force interpolator may be expressed as follows:

"*PhysicalInterpolatorBase* interpolator = new *SpringInterpolator*(400*F*, 40*F*, 200*F*, 2600*F*, 1*F*);

*ObjectAnimator* animator =

*ObjectAnimator.ofFloat*(*listView*, "*translationY*", 0, 346);

*animator.setDuration*(*interpolator.getDuration*( ));

//Obtain animation time.

*animator.setInterpolator*(interpolator);

//Set the customized interpolator to the animation class.

*animator.start*( ); //Run the animation."

In some embodiments, the electronic device 100 customizes a friction interpolator. In an example, function code of the friction interpolator may be expressed as "FlingInterpolator(float initVelocity, float friction)". initVelocity indicates an initial velocity, and friction indicates a frictional force.

In an example, specific code for using an animation class of a customized friction interpolator may be expressed as follows:

"*PhysicalInterpolatorBase* interpolator = new *FlingInterpolator*(600*F*, 0.5*F*);

*ObjectAnimator* animator =

*ObjectAnimator.ofFloat*(*listView*, "*translationY*", 0,

*interpolator.getEndOffset*( ));

*animator.setDuration*(*interpolator.getDuration*( ));

//Obtain animation time.

*animator.setInterpolator*(interpolator);

//Set the customized interpolator to the animation class.

*animator.start*( );"//Run the animation.

In some embodiments, the electronic device 100 may set animation time (Duration) and a start position; or may call an engine model to obtain animation time (Duration) and an end position, and then set the animation time (Duration) and the end position to an animation class (Animator class).

In an example, code for calling, by the electronic device 100, the engine model to obtain the animation time may be expressed as "com.xxx.dynamicanimation.interpolator.PhysicalInterpolatorBase #getDuration".

In an example, code for calling the engine model to obtain the end position of the spring may be expressed as "com.xxx.dynamicanimation.interpolator.PhysicalInterpolatorBase #getEndOffset".

In an example, code for setting the parameter valueThreshold may be expressed as "com.xxx.dynamicanimation.interpolator.PhysicalInterpolatorBase #setValueThreshold".

In some embodiments, code for using an elastic engine animation class may be expressed as one of the following: "SpringAnimation(K object, FloatPropertyCompat<K>property, float stiffness, float damping, float startValue, float endValue, float velocity)", and "SpringAnimation(K object, FloatPropertyCompat<K>property, float stiffness, float damping, float endValue, float velocity)".

The parameter object indicates an animation object, and Property indicates an attribute object to which the animation class or the interpolator is applied. As shown in Table 1, this parameter may be used to indirectly set valueThreshold. This parameter is optional in an interpolator version. If valueThreshold has been set in another manner, this parameter does not need to be set. To be specific, a construction method without property parameters may be directly used. This parameter is required in an animation class version. The DynamicAnimation class provides the following constants that can be directly used:

"TRANSLATION_X, TRANSLATION_Y TRANSLATION_Z, SCALE_X, SCALE_Y, ROTATION, ROTATION_X, ROTATION_Y, X, Y, Z, ALPHA, SCROLL_X, and SCROLL_Y". The electronic device 100 may alternatively customize a ViewProperty interface.

In an example, specific code for using the spring engine animation class may be expressed as follows:

"*SpringAnimation* animation = *SpringAnimation(listView,*

*DynamicAnimation.*TRANSLATION_Y, 400*F*, 40*F*, 0, 1000*F*);

*animation.start( );* "

In some embodiments, code for using the friction engine animation class may be expressed as "FlingAnimation (K object, FloatPropertyCompat<K>property, float initVelocity, float friction)".

In an example, specific code for using the friction animation class may be expressed as follows:

"*FlingAnimation* animation = *FlingAnimation(listView,*

*DynamicAnimation.*TRANSLATION_Y, 2000*F*, 0.5*F*);

*animation.start( );* ".

Figure 48:
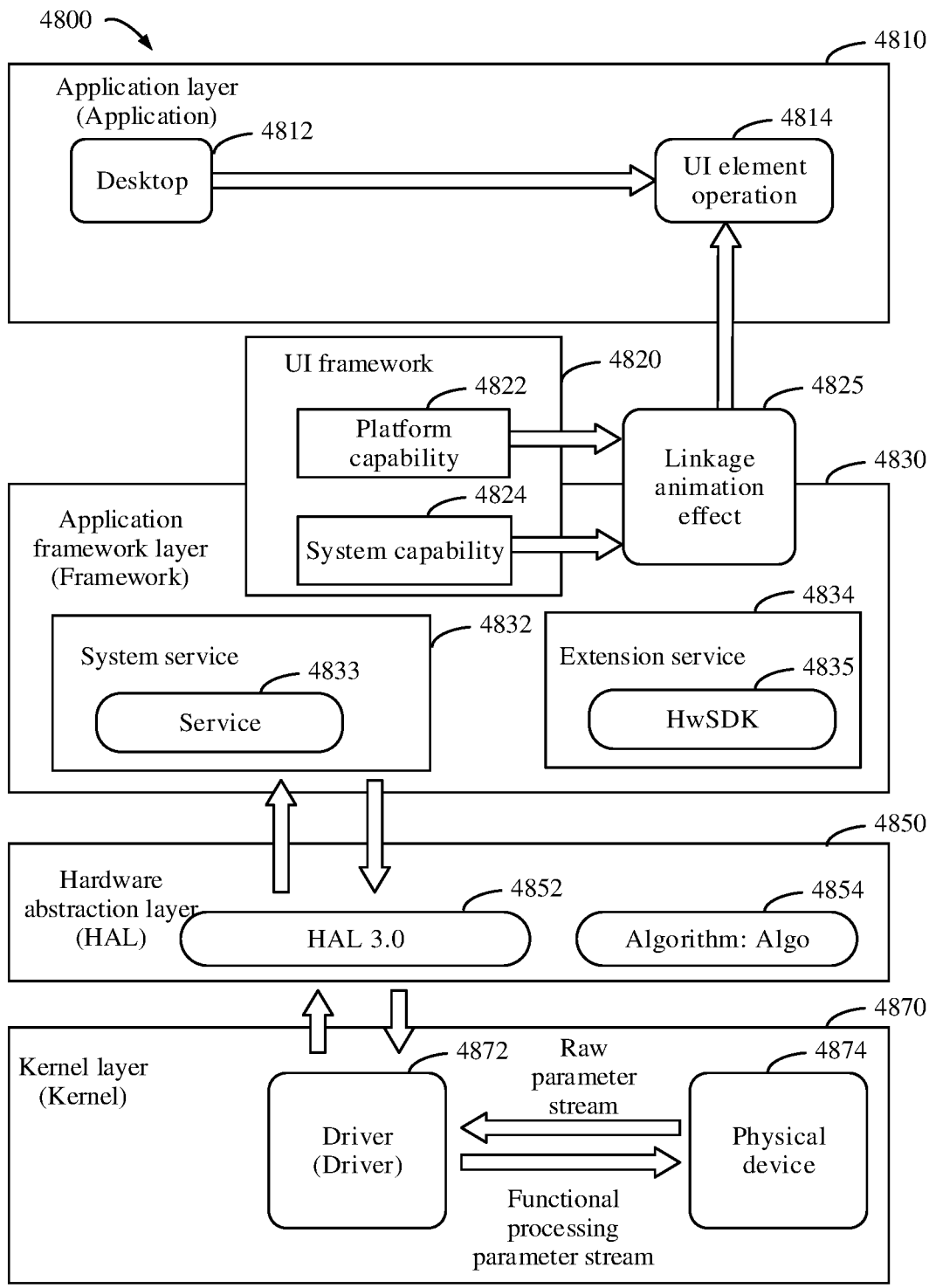
FIG. 48 is a schematic diagram of a system framework for implementing a "linkage" animation effect capability or function according to an embodiment of this disclosure.

FIG. 48 is a schematic diagram of a system framework 4800 for implementing a "linkage" animation effect capability or function according to an embodiment of this disclosure. An animation effect capability of a UI framework is implemented based on an overall architecture of Android® or HarmonyOS®, including mainstream four-layer logic processing. A data processing process is presented to a user from the bottom up. The user mainly uses and experiences an animation effect function at an application layer. In embodiments of this disclosure, a capability interaction relationship between a desktop and the UI framework is shown in FIG. 48. Specifically, as shown in FIG. 48, the system framework 4800 may include an application layer 4810, an application framework layer 4830, a hardware abstraction layer 4850, and a kernel layer 4870. The application layer 4810 may include a desktop 4812. A UI element operation 4814 may be implemented on the desktop 4812. The UI element operation 4814 may include, for example, a drag operation, a touch operation, and a deep touch operation. The application framework layer 4830 may include a system service 4832 and an extension service 4834. The system service 4832 may include various system services, for example, a service 4833. The extension service 4834 may include various extension services, for example, an SDK 4835. The hardware abstraction layer (HAL) 4850 may include an HAL 3.0 4852 and an algorithm Algo 4854. The kernel layer 4870 may include a driver 4872 and a physical device 4874. The physical device 4874 may provide a raw parameter stream to the driver 4872, and the driver 4872 may provide a functional processing parameter stream to the physical device 4874. As further shown in FIG. 48, a UI framework 4820 for implementing a linkage action 4825 may be implemented between the application layer 4810 and the application framework layer 4830. The UI framework 4820 may include a platform capability 4822 and a system capability 4824 that both may be used to provide the linkage action 4825. The linkage action 4825 may be provided for the UI element operation 4814 at the application layer 4810.

Figure 49:
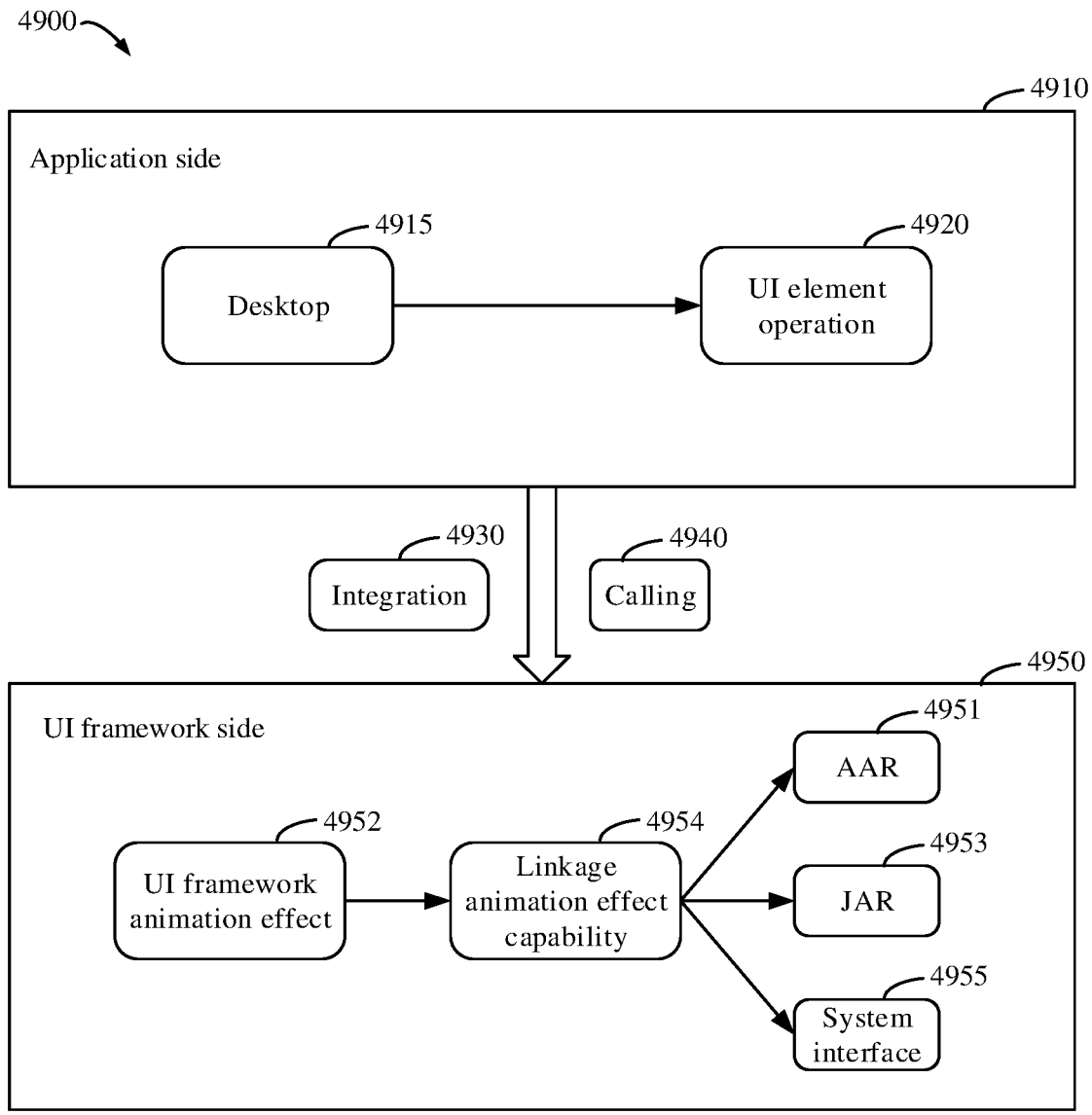
FIG. 49 is a schematic diagram of a relationship between an application side and a UI framework side in a "linkage" animation effect capability or function according to an embodiment of this disclosure.

FIG. 49 is a schematic diagram of a relationship between an application side and a UI framework side in a "linkage" animation effect capability or function according to an embodiment of this disclosure. As shown in FIG. 49, an application side 4910 may include a desktop 4915, and operations such as a drag, a touch, and a deep touch may be implemented on a UI element on the desktop 4915. A UI framework side 4950 may include UI framework animation effect 4952. The UI framework animation effect 4952 may implement a linkage animation effect capability 4954. The linkage animation effect capability 4954 may be implemented in an AAR format 4951 or a JAR format 4953, through a system interface 4955, or the like. The application side 4910 may call, through integration 4930, calling 4940, or the like, the "linkage" animation effect capability or function provided by the UI framework side 4950. Through interaction between the application side 4910 and the UI framework side 4950, embodiments of this disclosure implement new linkage "animation effect", so that originally independent UI elements (for example, icons, cards, and controls) are associated.

Figure 50:
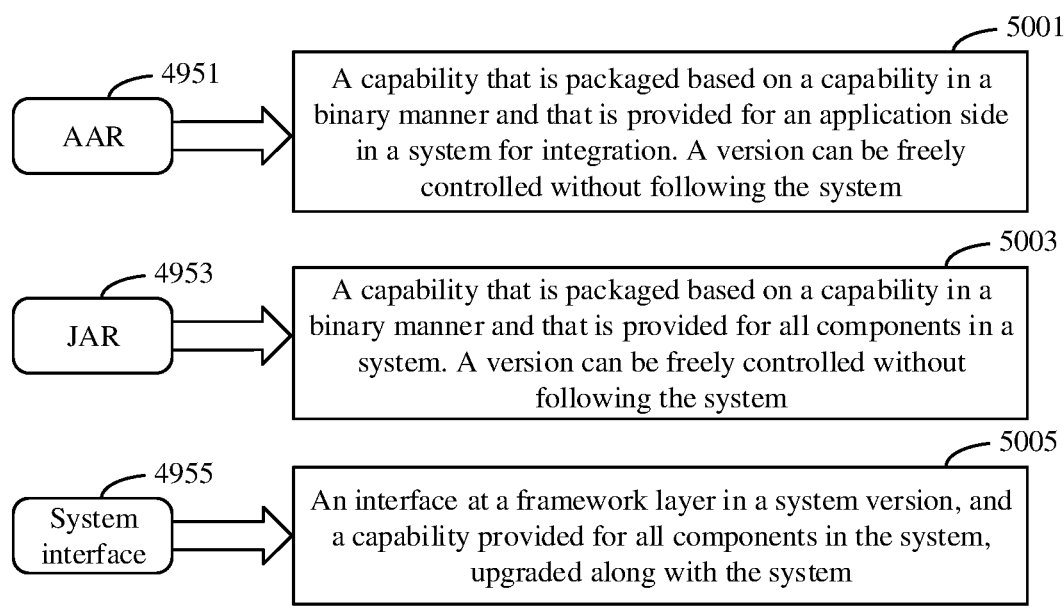
FIG. 50 is a schematic diagram of specific descriptions of three manners of implementing a "linkage" animation effect capability or function according to an embodiment of this disclosure.

FIG. 50 is a schematic diagram of specific descriptions of three manners of implementing a "linkage" animation effect capability or function according to an embodiment of this disclosure. As shown in FIG. 50, a relationship 5001 between the AAR format 4951 and a system of the electronic device 100 is as follows: The AAR format 4951 is a capability that is packaged based on a capability in a binary manner and that is provided for an application side in the system for integration, and a version can be freely controlled without following the system. A relationship 5003 between the JAR format 4953 and the system of the electronic device 100 is as follows: The JAR format 4953 is a capability that is packaged based on a capability in a binary manner and that is provided for all components in the system, and a version can be freely controlled without following the system. A relationship 5005 between the system interface 4955 and the system of the electronic device 100 is as follows: The system interface 4955 is an interface at a framework layer in a system version, is a capability provided for all components in the system, and is upgraded along with the system. This disclosure focuses on implementation of a linkage animation effect capability. The integration indicates the AAR and the JAR are used, and the calling indicates that the system interface is used. Scenarios are not limited, but capability presentation modes are different. In other words, the functions of the methods described above in this disclosure may be implemented by using a file in an AAR format, a file in a JAR format, and/or the system interface of the electronic device 100. In this manner, the "linkage" animation effect capability or function can be simply and conveniently implemented and provided for an application, for example, the desktop, on the electronic device.

What is claimed is:

1. A method, comprising:
    displaying M user interface (UI) elements on a screen of an electronic device, wherein M is a positive integer greater than 1;
    detecting a touch that is performed on a first UI element of the M UI elements and that is held for a specific duration; and
    zooming each of N UI elements on the screen in response to the touch, wherein N is a positive integer ranging from 1 to M−1, and the zooming each of the N UI elements comprises:
        determining a distance between the first UI element and a second UI element of the N UI elements;
        determining, based on the distance, a range between the first UI element and the second UI element by which the second UI element is to be zoomed; and zooming the second UI element based on the range to visually indicate the touch;
    wherein determining the range comprises:
        determining a first range by which the first UI element is to be zoomed in response to the touch; and
        determining the range by which the second UI element is to be zoomed in response to the touch based on:
            the first range and the distance between the first UI element and the second UI element; or a size of the second UI element and the size of the first UI element, the first range, and the distance between the first UI element and the second UI element.

2. The method according to claim 1, wherein determining the distance between the first UI element and the second UI element comprises:
    determining a first reference point of the first UI element and a second reference point of the second UI element; and
    determining a distance between the first reference point and the second reference point as the distance between the first UI element and the second UI element.

3. The method according to claim 1, wherein determining the distance between the first UI element and the second UI element comprises:
    determining a first reference point of the first UI element;
    determining, from a plurality of circles that have the first reference point as a center and that have different radii, a target circle that intersects the second UI element and that has a smallest radius of the plurality of circles; and
    determining a radius of the target circle as the distance between the first UI element and the second UI element.

4. The method according to claim 1, wherein determining the distance between the first UI element and the second UI element comprises:
    determining a horizontal spacing between the first UI element and the second UI element;
    determining a vertical spacing between the first UI element and the second UI element; and
    determining the distance between the first UI element and the second UI element based on:
        the horizontal spacing or the vertical spacing; or a direction from a second reference point of the second UI element to a first reference point of the first UI element in combination with either the horizontal spacing or the vertical spacing.

5. The method according to claim 1, further comprising:
    determining an affected region of the first UI element based on a size of the first UI element; and
    determining one or more UI elements, in the affected region, of the M UI elements as the N UI elements.

6. The method according to claim 1, further comprising:
    determining M−1 UI elements of the M UI elements other than the first UI element as the N UI elements.

7. The method according to claim 1, wherein the first range by which the first UI element is to be zoomed is determined based on at least one of the following items associated with the first UI element:
    a size of the first UI element;
    a range within which the first UI element is capable of changing;
    the specific duration; or
    a predetermined touch force.

8. The method according to claim 1, wherein zooming the second UI element comprises:
    determining delay time based on the distance; and
    zooming the second UI element in response to that the delay time elapsing after the touch occurs.

9. The method according to claim 1, wherein zooming the second UI element comprises:
    determining, based on a predefined curve of a range changing with time, a velocity at which the second UI element is to be zoomed in response to the touch.

10. The method according to claim 1, further comprising:
    determining, based on the distance, the specific duration, a size of the first UI element, or a size of the second UI element, a displacement by which the second UI element is to move; and
    moving the second UI element by the displacement in a direction from a second reference point of the second UI element to a first reference point of the first UI element.

11. An electronic device, comprising:
    one or more processors; and
    a non-transitory memory storing instructions, wherein when the instructions are executed by the one or more processor, the electronic device performs the operations:
        displaying M user interface (UI) elements on a screen of the electronic device, wherein M is a positive integer greater than 1;
        detecting a touch that is performed on a first UI element of the M UI elements and that is held for a specific duration; and
        zooming each of N UI elements on the screen in response to the touch, wherein N is a positive integer ranging from 1 to M−1, and the zooming the N UI elements comprises:
            determining a distance between the first UI element and a second UI element of the N UI elements;

determining, based on the distance between the first UI element and the second UI element, a range by which the second UI element is to be zoomed; and zooming the second UI element based on the range to visually indicate the touch;

wherein determining the range comprises:

determining a first range by which the first UI element is to be zoomed in response to the touch; and determining the range by which the second UI element is to be zoomed in response to the touch based on:

the first range and the distance between the first UI element and the second UI element; or a size of the second UI element and the size of the first UI element, the first range, and the distance between the first UI element and the second UI element.

12. The electronic device according to claim 11, wherein the operations for determining the distance between the first UI element and the second UI element comprise operations for:

determining a first reference point of the first UI element and a second reference point of the second UI element; and determining a distance between the first reference point and the second reference point as the distance.

13. The electronic device according to claim 11, wherein the operations for determining the distance between the first UI element and the second UI element comprise operations for:

determining a first reference point of the first UI element;

determining, from a plurality of circles that have the first reference point as a center and that have different radii, a target circle that intersects the second UI element and that has a smallest radius of the plurality of circles; and determining a radius of the target circle as the distance between the first UI element and the second UI element.

14. The electronic device according to claim 11, wherein the operations for determining the distance between the first UI element and the second UI element comprise operations for:

determining a horizontal spacing between the first UI element and the second UI element;

determining a vertical spacing between the first UI element and the second UI element; and determining the distance based on:

the horizontal spacing and the vertical spacing; or the horizontal spacing and the vertical spacing, and a direction from a second reference point of the second UI element to a first reference point of the first UI element.

15. The electronic device according to claim 11, wherein the operations further comprise operations for:

determining an affected region of the first UI element based on a size of the first UI element; and determining one or more UI elements, in the affected region, of the M UI elements as the N UI elements.

16. A non-transitory computer-readable storage medium, wherein the non-transitory computer-readable storage medium stores instructions, and when the instructions are executed by an electronic device, the electronic device performs operations comprising:

displaying M user interface (UI) elements on a screen of an electronic device, wherein M is a positive integer greater than 1;

detecting a touch that is performed on a first UI element of the M UI elements and that is held for a specific duration; and zooming each of N UI elements on the screen in response to the touch, wherein N is a positive integer ranging from 1 to M−1, and the zooming the N UI elements comprises:

determining a distance between the first UI element and a second UI element of the N UI elements;

determining, based on the distance between the first UI element and the second UI element, a range by which the second UI element is to be zoomed; and zooming the second UI element based on the range to visually indicate the touch;

wherein determining the range comprises:

determining a first range by which the first UI element is to be zoomed in response to the touch; and determining the range by which the second UI element is to be zoomed in response to the touch based on:

the first range and the distance between the first UI element and the second UI element; or a size of the second UI element and the size of the first UI element, the first range, and the distance between the first UI element and the second UI element.

17. The computer-readable storage medium according to claim 16, wherein the operations for determining the distance between the first UI element and the second UI element comprise further operations for:

determining a first reference point of the first UI element and a second reference point of the second UI element; and determining a distance between the first reference point and the second reference point as the distance between the first UI element and the second UI element.

18. The computer-readable storage medium according to claim 16, wherein the operations for determining the distance between the first UI element and the second UI element comprise further operations for:

determining a first reference point of the first UI element;

determining, from a plurality of circles that have the first reference point as a center and that have different radii, a target circle that intersects the second UI element and that has a smallest radius of the plurality of circles; and determining a radius of the target circle as the distance between the first UI element and the second UI element.

19. The computer-readable storage medium according to claim 16, wherein the determining the distance comprises:

determining a horizontal spacing between the first UI element and the second UI element;

determining a vertical spacing between the first UI element and the second UI element; and determining the distance between the first UI element and the second UI element based on:

the horizontal spacing and the vertical spacing; or the horizontal spacing and the vertical spacing, and a direction from a second reference point of the second UI element to a first reference point of the first UI element.

* * * * *